United States Patent
Lee et al.

(10) Patent No.: US 12,287,751 B2
(45) Date of Patent: Apr. 29, 2025

(54) COMPUTING SYSTEM INCLUDING CXL SWITCH, MEMORY DEVICE AND STORAGE DEVICE AND OPERATING METHOD THEREOF

(71) Applicant: Samsung Electronics Co., Ltd., Suwon-si (KR)

(72) Inventors: Kyunghan Lee, Suwon-si (KR); Jae-gon Lee, Suwon-si (KR); Chon Yong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/131,185

(22) Filed: Apr. 5, 2023

(65) Prior Publication Data

US 2023/0359578 A1    Nov. 9, 2023

(30) Foreign Application Priority Data

May 9, 2022    (KR) ........................ 10-2022-0056898

(51) Int. Cl.
*G06F 13/42* (2006.01)
*G06F 12/02* (2006.01)
*G06F 13/16* (2006.01)

(52) U.S. Cl.
CPC ...... *G06F 13/4221* (2013.01); *G06F 12/0238* (2013.01); *G06F 13/1668* (2013.01)

(58) Field of Classification Search
CPC ............. G06F 13/4221; G06F 12/0238; G06F 13/1668

See application file for complete search history.

(56) References Cited

U.S. PATENT DOCUMENTS

| | | | |
|---|---|---|---|
| 7,925,854 B2 | 4/2011 | Oh et al. | |
| 8,250,333 B2 | 8/2012 | Gorobets et al. | |
| 9,852,779 B2 | 12/2017 | Lee | |
| 10,896,089 B2 | 1/2021 | Helmick et al. | |
| 11,132,313 B2 | 9/2021 | Shan et al. | |
| 2005/0027952 A1* | 2/2005 | Mayo | G06F 1/3275 711/158 |
| 2011/0131361 A1* | 6/2011 | Itakura | G06F 11/2033 710/313 |
| 2011/0296106 A1 | 12/2011 | Yen et al. | |

(Continued)

FOREIGN PATENT DOCUMENTS

KR    10-2018-0054394 A    5/2018

*Primary Examiner* — Henry Tsai
*Assistant Examiner* — Harry Z Wang
(74) *Attorney, Agent, or Firm* — Sughrue Mion, PLLC

(57) ABSTRACT

A computing system includes a first storage device, a second storage device, a memory device, and a compute express link (CXL) switch. The memory device stores first map data of the first storage device and second map data of the second storage device. The CXL switch is connected with the first storage device, the second storage device, and an external host through a first interface, and arbitrates communications between the first storage device, the second storage device, and the external host. The first storage device is connected with the memory device through a second interface. The second storage device is connected with the memory device through a third interface. The first interface, the second interface, and the third interface are physically separated from each other.

20 Claims, 23 Drawing Sheets

(56) References Cited

U.S. PATENT DOCUMENTS

| | | | |
|---|---|---|---|
| 2012/0151127 A1 | 6/2012 | Lim | |
| 2014/0289462 A9* | 9/2014 | Malwankar | G06F 3/067 |
| | | | 711/E12.019 |
| 2015/0199221 A1* | 7/2015 | Goodman | G06F 3/0631 |
| | | | 718/104 |
| 2018/0136875 A1 | 5/2018 | Nimmagadda et al. | |
| 2021/0081325 A1* | 3/2021 | Bradshaw | G06F 9/5016 |
| 2021/0279007 A1 | 9/2021 | Trika | |
| 2021/0311871 A1* | 10/2021 | Malladi | G06F 13/4221 |
| 2023/0176744 A1* | 6/2023 | Hahn | G06F 3/0656 |

* cited by examiner

COMPUTING SYSTEM INCLUDING CXL SWITCH, MEMORY DEVICE AND STORAGE DEVICE AND OPERATING METHOD THEREOF

CROSS-REFERENCE TO RELATED APPLICATION

This application claims priority under 35 U.S.C. § 119 to Korean Patent Application No. 10-2022-0056898 filed on May 9, 2022, in the Korean Intellectual Property Office, the disclosure of which being incorporated by reference herein in its entirety.

BACKGROUND

Embodiments of the present disclosure described herein relate to a computing device, and more particularly, relate to a computing device including a compute express link (CXL) switch, a memory device, and a storage device, and an operating method thereof.

A semiconductor memory device is classified as a volatile memory device, in which stored data disappear when a power is turned off, such as a static random access memory (SRAM) or a dynamic random access memory (DRAM), or a nonvolatile memory device, in which stored data are retained even when a power is turned off, such as a flash memory device, a phase-change RAM (PRAM), a magnetic RAM (MRAM), a resistive RAM (RRAM), or a ferroelectric RAM (FRAM).

A storage device such as a solid state drive may include a NAND flash memory. A system of logical block addresses used in a host is different from a system of physical block addresses of the NAND flash memory of the storage device. For this reason, the storage device may perform translation between a logical block address of the host and a physical block address of the NAND flash memory by using map data in which the logical block address and the physical block address are mapped.

As the capacity of the NAND flash memory increases, the capacity of the map data may also increase. As such, there may be required a high-capacity buffer memory to be used in the storage device, thereby causing costs for new research and development.

SUMMARY

It is an aspect to provide a computing device including a compute express link (CXL) switch, a memory device, and a storage device, and an operating method thereof.

According to an aspect of one or more embodiments, there is provided a computing system comprising a first storage device; a second storage device; a memory device configured to store first map data of the first storage device and second map data of the second storage device; and a compute express link (CXL) switch connected with the first storage device, the second storage device, and an external host through a first interface, and configured to arbitrate communications between the first storage device, the second storage device, and the external host, wherein the first storage device is connected with the memory device through a second interface, wherein the second storage device is connected with the memory device through a third interface, and wherein the first interface, the second interface, and the third interface are physically separated from each other.

According to another aspect of one or more embodiments, there is provided an operating method of a computing system which includes a first storage device, a second storage device, a compute express link (CXL) switch, and a memory device, the first storage device and the memory device being connected through a second interface, and the second storage device and the memory device being connected through a third interface, the operating method comprising receiving, by the first storage device, a first read request from an external host; sending, by the first storage device, a second read request to the memory device through the second interface based on the first read request; sending, by the memory device, a second read response including first partial map data to the first storage device through the second interface based on the second read request; reading, by the first storage device, first data from a nonvolatile memory of the first storage device based on the first partial map data; and sending, by the first storage device, a first read response including the first data to the external host through a first interface, wherein the CXL switch is connected with the first storage device and the second storage device and the external host through the first interface and arbitrates communications between the first storage device and the second storage device and the external host, and wherein the first interface, the second interface, and the third interface are based on a CXL protocol and are physically separated from each other.

According to yet another aspect of one or more embodiments, there is provided a computing system comprising a first storage device; a second storage device; a memory device configured to store first map data of the first storage device and second map data of the second storage device; a first compute express link (CXL) switch connected with the first storage device and the second storage device and an external host through a first interface, and configured to arbitrate communications between the first storage device and the second storage device and the external host; and a second CXL switch connected with the first storage device and the second storage device and the memory device through a second interface, and configured to arbitrate communications between the first storage device and the second storage device and the memory device.

BRIEF DESCRIPTION OF THE FIGURES

The above and other aspects will become apparent by describing in detail embodiments thereof with reference to the accompanying drawings, in which.

DETAILED DESCRIPTION

Below, various embodiments will be described in detail and clearly to such an extent that one skilled in the art easily carries out the present disclosure.

Figure 1:
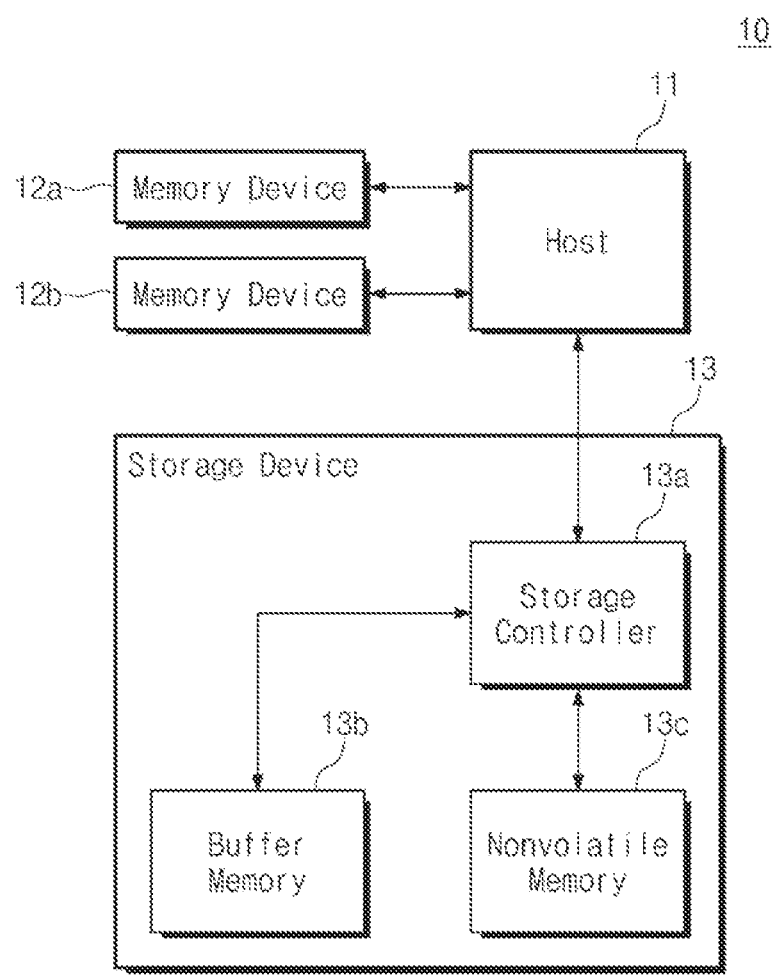
FIG. 1 is a block diagram illustrating a computing system including a storage device.

FIG. 1 is a block diagram illustrating a computing system including a storage device. Referring to FIG. 1, a computing system 10 may include a host 11, a plurality of memory devices 12a and 12b, and a storage device 13. The host 11 may control an overall operation of the computing system 10. The plurality of memory devices 12a and 12b may be used as a working memory or a system memory of the host 11.

The storage device 13 may include a storage controller 13a, a buffer memory 13b, and a nonvolatile memory 13c. Under control of the host 11, the storage controller 13a may store data in the nonvolatile memory 13c or may send data stored in the nonvolatile memory 13c to the host 11.

The buffer memory 13b may store a variety of information for the storage device 13 to operate. For example, the storage controller 13a may manage data stored in the nonvolatile memory 13c by using map data. The map data may include information about relationship between a logical block address managed by the host 11 and a physical block address of the nonvolatile memory 13c.

In an embodiment, the buffer memory 13b may be a high-speed memory such as a DRAM. As described above, as the capacity of the nonvolatile memory 13c increases, the size of map data may increase. However, because the capacity of the buffer memory 13b included in the single storage device 13 is limited, it is impossible to cope with the increase in the size of the map data due to the increase in the capacity of the nonvolatile memory 13c.

Figure 2A:
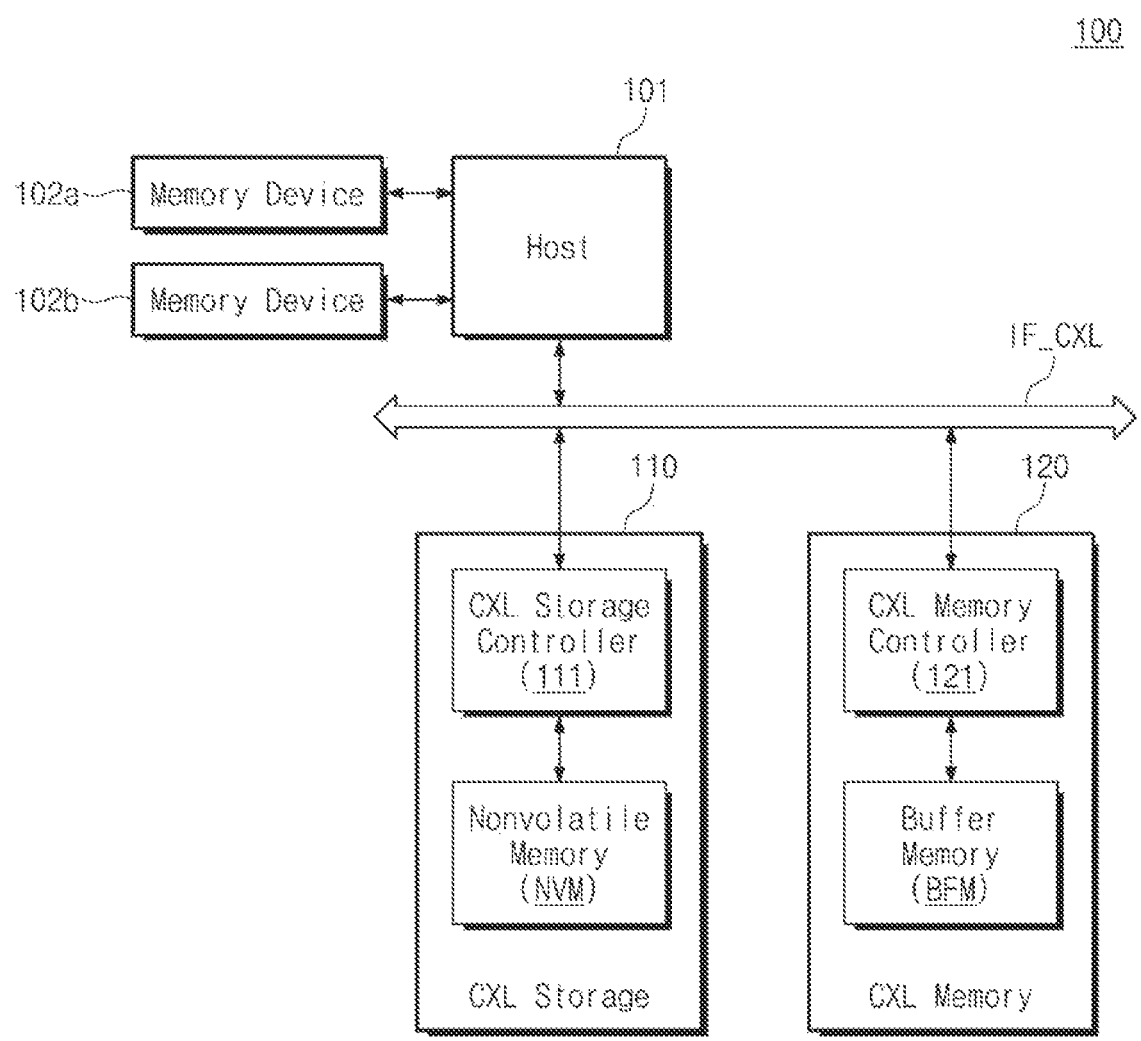
FIG. 2A is a block diagram of a computing system to which a storage system is applied, according to some embodiments.

FIG. 2A is a block diagram of a computing system to which a storage system is applied, according to some embodiments. Referring to FIG. 2A, a computing system 100 may include a host 101, a plurality of memory devices 102a and 102b, a Compute eXpress Link (CXL) storage 110, and a CXL memory 120.

The host 101 may control an overall operation of the computing system 100. In an embodiment, the host 101 may be one of various processors such as a central processing unit (CPU), a graphics processing unit (GPU), a neural processing unit (NPU), and a data processing unit (DPU). In an embodiment, the host 101 may include a single core processor or a multi-core processor.

The plurality of memory devices 102a and 102b may be used as a main memory or a system memory of the computing system 100. In an embodiment, each of the plurality of memory devices 102a and 102b may be a dynamic random access memory (DRAM) device and may have the form factor of the dual in-line memory module (DIMM). However, the present disclosure is not limited thereto. For example, the plurality of memory devices 102a and 102b may include a nonvolatile memory such as a flash memory, a phase change RAM (PRAM), a resistive RAM (RRAM), or a magnetic RAM (MRAM).

The plurality of memory devices 102a and 102b may directly communicate with the host 101 through a double data rate (DDR) interface. In an embodiment, the host 101 may include a memory controller configured to control the plurality of memory devices 102a and 102b. However, the present disclosure is not limited thereto. For example, the plurality of memory devices 102a and 102b may communicate with the host 101 through various interfaces.

The CXL storage 110 may include a CXL storage controller 111 and a nonvolatile memory (NVM). Under control of the host 101, the CXL storage controller 111 may store data in the nonvolatile memory NVM or may send data stored in the nonvolatile memory NVM to the host 101. In an embodiment, the nonvolatile memory NVM may be a NAND flash memory, but the present disclosure is not limited thereto.

The CXL memory 120 may include a CXL memory controller 121 and a buffer memory BFM. Under control of the host 101, the CXL memory controller 121 may store data in the buffer memory BFM or may send data stored in the buffer memory BFM to the host 101. In an embodiment, the buffer memory BFM may be a DRAM, but the present disclosure is not limited thereto.

In an embodiment, the host 101, the CXL storage 110, and the CXL memory 120 may be configured to share the same interface. For example, the host 101, the CXL storage 110, and the CXL memory 120 may communicate with each other through a CXL interface IF_CXL. In the case where the communications between the CXL storage 110 and the CXL memory 120 increase, the communications between the CXL storage 110 and the host 101 may be affected by the increase in the communications between the CXL storage 110 and the CXL memory 120. In other words, the communications between the CXL storage 110 and the CXL memory 120 may cause the reduction of performance of the communications between the CXL storage 110 and the host 101 and an increase in latency.

In an embodiment, unlike the storage device 13 of FIG. 1, the CXL storage 110 may not include a separate buffer memory for storing or managing map data. In this case, the CXL storage 110 may require a buffer memory for storing or managing the map data. In an embodiment, at least a partial area of the CXL memory 120 may be used as a buffer memory of the CXL storage 110. In this case, a mapping table that is managed by the CXL storage controller 111 of the CXL storage 110 may be stored in the CXL memory 120. For example, at least a partial area of the CXL memory 120 may be allocated for a buffer memory of the CXL storage 110 (i.e., for an area dedicated for the CXL storage 110) by the host 101.

In an embodiment, the CXL storage 110 may access the CXL memory 120 through the CXL interface IF_CXL. For example, the CXL storage 110 may store the mapping table in the allocated area of the CXL memory 120 or may read the mapping table from the allocated area of the CXL memory 120. Under control of the CXL storage 110, the CXL memory 120 may store data (e.g., the map data) in the buffer memory BFM or may send the data (e.g., the map data) stored in the buffer memory BFM to the CXL storage 110.

The storage controller 13a of the related art storage device 13 communicates with the host 11 through a host interface such as PCIe or NVMe, and communicates with the buffer memory 13b through a memory interface such as a DDR interface or an LPDDR interface. That is, the storage controller 13a of the related art storage device 13 communicates with the host 11 and the buffer memory 13b included therein, through different interfaces (i.e., heterogeneous interfaces).

In contrast, according to an embodiment of the present disclosure, the CXL storage controller 111 of the CXL storage 110 may communicate with the host 101 and the CXL memory 120 (i.e., a buffer memory) through the CXL interface IF_CXL. In other words, the CXL storage controller 111 of the CXL storage 110 may communicate with the host 101 and the CXL memory 120 through a homogeneous interface or a common interface and may use a partial area of the CXL memory 120 as a buffer memory.

Figure 2B:
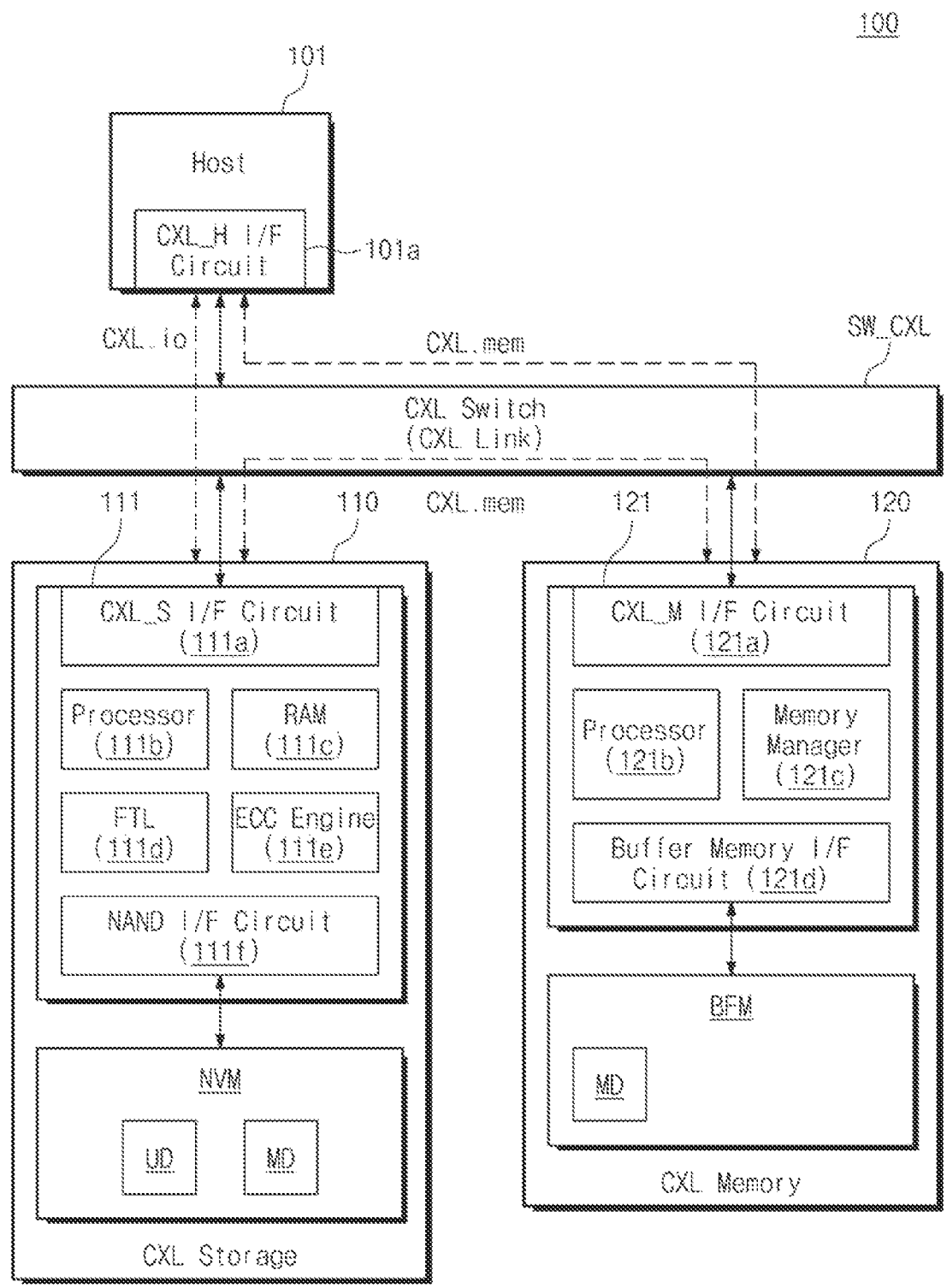
FIG. 2B is a block diagram illustrating components of a computing system of FIG. 2A in detail, according to some embodiments.

FIG. 2B is a block diagram illustrating components of a computing system of FIG. 2A in detail. Referring to FIGS. 2A and 2B, the computing system 100 may include a CXL switch SW_CXL, the host 101, the CXL storage 110, and the CXL memory 120.

The CXL switch SW_CXL may be a component included in the CXL interface IF_CXL. The CXL switch SW_CXL may be configured to arbitrate the communication between the host 101, the CXL storage 110, and the CXL memory 120. For example, when the host 101 and the CXL storage 110 communicate with each other, the CXL switch SW_CXL may be configured to send information, which is provided from the host 101 or the CXL storage 110, such as a request, data, a response, or a signal, to the CXL storage 110 or the host 101. When the host 101 and the CXL memory 120 communicate with each other, the CXL switch SW_CXL may be configured to send information, which is provided from the host 101 or the CXL memory 120, such as a request, data, a response, or a signal, to the CXL memory 120 or the host 101. When the CXL storage 110 and the CXL memory 120 communicate with each other, the CXL switch SW_CXL may be configured to send information, which is provided from the CXL storage 110 or the CXL memory 120, such as a request, data, a response, or a signal, to the CXL memory 120 or the CXL storage 110.

The host 101 may include a CXL host interface circuit 101a. The CXL host interface circuit 101a may communicate with the CXL storage 110 or the CXL memory 120 through the CXL switch SW_CXL.

The CXL storage 110 may include the CXL storage controller 111 and the nonvolatile memory NVM. The CXL storage controller 111 may include a CXL storage interface circuit 111a, a processor 111b, a RAM 111c, a flash translation layer (FTL) 111d, an error correction code (ECC) engine 111e, and a NAND interface (I/F) circuit 111f.

The CXL storage interface circuit 111a may be connected with the CXL switch SW_CXL. The CXL storage interface circuit 111a may communicate with the host 101 or the CXL memory 120 through the CXL switch SW_CXL.

The processor 111b may be configured to control an overall operation of the CXL storage controller 111. The RAM 111c may be used as a working memory or a buffer memory of the CXL storage controller 111. In an embodiment, the RAM 111c may be an SRAM and may be used as a read buffer and a write buffer for the CXL storage 110. In an embodiment, as will be described below, the RAM 111c may be configured to temporarily store map data (MD) read from the CXL memory 120 or a portion of the map data MD.

The FTL 111d may perform various management operations for efficiently using the nonvolatile memory NVM. For example, the FTL 111d may perform address translation between a logical block address managed by the host 101 and a physical block address used in the nonvolatile memory NVM, based on map data (or a mapping table). The FTL 111d may perform a bad block management operation for the nonvolatile memory NVM. The FTL 111d may perform a wear leveling operation for the nonvolatile memory NVM. The FTL 111d may perform a garbage collection operation for the nonvolatile memory NVM.

The ECC engine 111e may perform error detection and correction on data read from the nonvolatile memory NVM. For example, the ECC engine 111e may generate parity bits for user data (UD) to be stored in the nonvolatile memory NVM, and the parity bits thus generated may be stored in the nonvolatile memory NVM together with the user data UD. When the user data UD are read from the nonvolatile memory NVM, the ECC engine 111e may detect and correct an error of the user data UD by using the parity bits read from the nonvolatile memory NVM together with the user data UD.

The NAND interface circuit 111f may control the nonvolatile memory NVM such that data are stored in the nonvolatile memory NVM or data are read from the nonvolatile memory NVM. In an embodiment, the NAND interface circuit 111f may be implemented to comply with the standard protocol such as a toggle interface or ONFI. For example, the nonvolatile memory NVM may include a plurality of NAND flash devices; in the case where the NAND interface circuit 111f is implemented based on the toggle interface, the NAND interface circuit 111f communicates with the plurality of NAND flash devices through a plurality of channels. The plurality of NAND flash devices may be connected with the plurality of channels through a multi-channel, multi-way structure.

The nonvolatile memory NVM may store or output the user data UD under control of the CXL storage controller 111. The nonvolatile memory NVM may store or output the map data MD under control of the CXL storage controller 111. In an embodiment, the map data MD stored in the nonvolatile memory NVM may include mapping information corresponding to the entire user data UD stored in the nonvolatile memory NVM. The map data MD present in the nonvolatile memory NVM may be stored in the CXL memory 120 in the initialization operation of the CXL storage 110.

The CXL memory 120 may include the CXL memory controller 121 and the buffer memory BFM. The CXL memory controller 121 may include a CXL memory interface circuit 121a, a processor 121b, a memory manager 121c, and a buffer memory interface (I/F) circuit 121d.

The CXL memory interface circuit 121a may be connected with the CXL switch SW_CXL. The CXL memory interface circuit 121a may communicate with the host 101 or the CXL storage 110 through the CXL switch SW_CXL.

The processor 121b may be configured to control an overall operation of the CXL memory controller 121. The memory manager 121c may be configured to manage the buffer memory BFM. For example, the memory manager 121c may be configured to translate a memory address (e.g., a logical address or a virtual address) from the host 101 or the CXL storage 110 into a physical address for the buffer memory BFM. In an embodiment, the memory address that is an address for managing a storage area of the CXL memory 120 may be a logical address or a virtual address that is designated and managed by the host 101.

The buffer memory interface circuit 121d may control the buffer memory BFM such that data are stored in the buffer memory BFM or data are read from the buffer memory BFM. In an embodiment, the buffer memory interface circuit 121d may be implemented to comply with the standard protocol such as a DDR interface or an LPDDR interface.

Under control of the CXL memory controller 121, the buffer memory BFM may store data or may output the stored data. In an embodiment, the buffer memory BFM may be configured to store the map data MD that are used in the CXL storage 110. The map data MD may be transferred from the CXL storage 110 to the CXL memory 120 when the computing system 100 is initialized or the CXL storage 110 is initialized.

As described above, the CXL storage 110 according to an embodiment of the present disclosure may store the map data MD, which are used to manage the nonvolatile memory NVM, in the CXL memory 120 connected through the CXL switch SW_CXL (or the CXL interface IF_CXL). Afterwards, when the CXL storage 110 performs the read operation depending on a request of the host 101, the CXL storage 110 may read at least a portion of the map data MD from the CXL memory 120 through the CXL switch SW_CXL (or the CXL interface IF_CXL) and may perform the read operation based on the map data MD thus read. In some embodiments, when the CXL storage 110 performs the write operation depending on a request of the host 101, the CXL storage 110 may perform the write operation on the nonvolatile memory NVM and may update the map data MD. In this case, the updated map data MD may be first stored in the RAM 111c of the CXL storage controller 111, and the map data MD stored in the RAM 111c may be transferred to the buffer memory BFM of the CXL memory 120 through the CXL switch SW_CXL (or the CXL interface IF_CXL), so as to be updated in the buffer memory BFM.

In an embodiment, at least a partial area of the buffer memory BFM of the CXL memory 120 may be allocated as a dedicated area for the CXL storage 110, and the remaining area other than the dedicated area for the CXL storage 110 may be used as an area that is capable of being accessed by the host 101.

In an embodiment, the host 101 and the CXL storage 110 may communicate with each other by using CXL.io being an input/output protocol. The CXL.io may have a PCIe-based non-coherency input/output protocol. The host 101 and the CXL storage 110 may exchange user data or variety of information with each other by using the CXL.io.

In an embodiment, the CXL storage 110 and the CXL memory 120 may communicate with each other by using CXL.mem being a memory access protocol. The CXL.mem may be a memory access protocol that supports memory access. The CXL storage 110 may access a partial area (e.g., an area where the map data MD are stored or a CXL storage-dedicated area) of the CXL memory 120 by using the CXL.mem.

In an embodiment, the host 101 and the CXL memory 120 may communicate with each other by using CXL.mem being a memory access protocol. The host 101 may access, as a system memory, the remaining area (e.g., the remaining area other than the area where the map data MD are stored or the remaining area other than the CXL storage-dedicated area) of the CXL memory 120 by using the CXL.mem. The above access types including CXL.io and CXL.mem are provided as an example, and the present disclosure is not limited thereto.

Figure 3A:
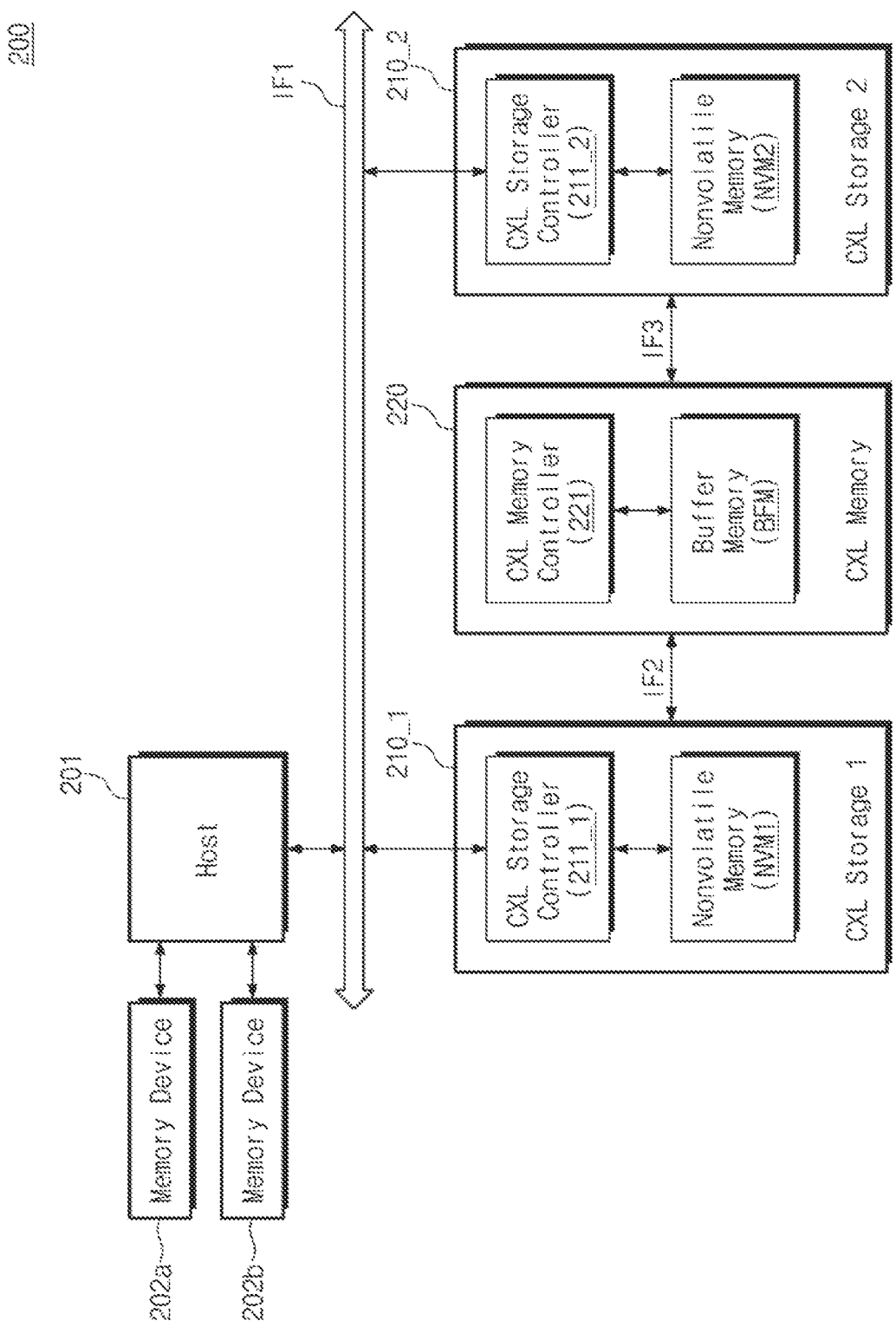
FIG. 3A is a block diagram illustrating a computing system to which a storage system according to some embodiments is applied.

FIG. 3A is a block diagram illustrating a computing system to which a storage system according to some embodiments is applied. Referring to FIG. 3A, a computing system 200 may include a host 201, a plurality of memory devices 202a and 202b, first CXL storage 210_1, a second CXL storage 210_2, and a CXL memory 220. In an embodiment, the computing system 200 may be included in user devices such as a personal computer, a laptop computer, a server, a media player, and a digital camera or automotive devices such as a navigation system, a black box, and an automotive electronic device/part. In some embodiments, the computing system 200 may be a mobile system such as a mobile phone, a smartphone, a tablet personal computer (PC), a wearable device, a health care device, or an Internet of things (IoT) device.

The host 201 may control an overall operation of the computing system 200. In an embodiment, the host 201 may be one of various processors such as a central processing unit (CPU), a graphics processing unit (GPU), a neural processing unit (NPU), and a data processing unit (DPU). In an embodiment, the host 201 may include a single core processor or a multi-core processor.

The plurality of memory devices 202a and 202b may be used as a main memory or a system memory of the computing system 200. In an embodiment, each of the plurality of memory devices 202a and 202b may be a dynamic random access memory (DRAM) device and may have the form factor of the dual in-line memory module (DIMM). However, the present disclosure is not limited thereto. For example, the plurality of memory devices 202a and 202b may include a nonvolatile memory such as a flash memory, a phase change RAM (PRAM), a resistive RAM (RRAM), or a magnetic RAM (MRAM).

The plurality of memory devices 202a and 202b may directly communicate with the host 201 through the DDR interface. In an embodiment, the host 201 may include a memory controller configured to control the plurality of memory devices 202a and 202b. However, the present disclosure is not limited thereto. For example, the plurality of memory devices 202a and 202b may communicate with the host 201 through various interfaces.

The first CXL storage 210_1 may include a CXL storage controller 211_1 and a nonvolatile memory NVM1. Under control of the host 201, the CXL storage controller 211_1 may store data in the nonvolatile memory NVM1 or may send data stored in the nonvolatile memory NVM1 to the host 201. In an embodiment, the nonvolatile memory NVM1 may be a NAND flash memory, but the present disclosure is not limited thereto.

The second CXL storage 210_2 may include a CXL storage controller 211_2 and a nonvolatile memory NVM2. Under control of the host 201, the CXL storage controller 211_2 may store data in the nonvolatile memory NVM2 or may send data stored in the nonvolatile memory NVM2 to the host 201. In an embodiment, the nonvolatile memory NVM2 may be a NAND flash memory, but the present disclosure is not limited thereto.

The CXL memory 220 may include a CXL memory controller 221 and the buffer memory BFM. Under control of the first and second CXL storages 210_1 and 210_2, the CXL memory controller 221 may store data in the buffer memory BFM or may send data stored in the buffer memory BFM to the first and second CXL storages 210_1 and 210_2. In an embodiment, the buffer memory BFM may be a DRAM, but the present disclosure is not limited thereto.

In an embodiment, the CXL memory 220 may determine priorities of the first and second CXL storages 210_1 and 210_2. The priorities of the first and second CXL storages 210_1 and 210_2 may be determined in advance. In some embodiments, in the initialization operation, the CXL memory 220 may determine the priorities based on characteristic information received from the first and second CXL storages 210_1 and 210_2 (e.g., a type and importance of data stored in each of the first and second CXL storages 210_1 and 210_2). For example, memory allocation requests received from the first and second CXL storages 210_1 and 210_2 may include the characteristic information.

In an embodiment, the CXL memory 220 may determine a first priority for the first and second CXL storages 210_1 and 210_2, and the first priority may be used when an area is allocated during the initialization operation, when scheduling for an input/output request is made, and when scheduling is made during the power-off operation.

In an embodiment, the CXL memory 220 may determine the first priority for the first and second CXL storages 210_1 and 210_2, which is used when an area is allocated during the initialization operation, may determine a second priority for the first and second CXL storages 210_1 and 210_2, which is used when scheduling for an input/output request is made, and may determine a third priority for the first and second CXL storages 210_1 and 210_2, which is used when scheduling is made during the power-off operation. The first to third priorities may be different from each other.

In an embodiment, unlike the storage device 13 of FIG. 1, the first and second CXL storages 210_1 and 210_2 may not include a separate buffer memory for storing or managing map data. In this case, the first and second CXL storages 210_1 and 210_2 may require a buffer memory for storing or managing the map data. In an embodiment, at least a partial area or the entire area of the CXL memory 220 may be used as a buffer memory of the first and second CXL storages 210_1 and 210_2. In this case, the mapping tables that are managed by the CXL storage controllers 211_1 and 211_2 of the first and second CXL storages 210_1 and 210_2 may be stored in the CXL memory 220. For example, at least a partial area or the entire area of the CXL memory 220 may be allocated for a buffer memory of the first and second CXL storages 210_1 and 210_2 (i.e., an area dedicated for the first and second CXL storages 210_1 and 210_2).

In an embodiment, the host 201, all of the first CXL storage 210_1, the second CXL storage 210_2, and the CXL memory 220 may not be configured not to share the same interface. The host 201, the first CXL storage 210_1, and the second CXL storage 210_2 may be configured to share the same interface. For example, the host 201, the first CXL storage 210_1, and the second CXL storage 210_2 may communicate with each other through a first interface IF1. However, each of the first and second CXL storages 210_1 and 210_2 may not access the CXL memory 220 through the first interface IF1.

In an embodiment, the first CXL storage 210_1 may communicate with the CXL memory 220 through a second interface IF2, and the second CXL storage 210_2 may communicate with the CXL memory 220 through a third interface IF3. That is, the communications between the first CXL storage 210_1, the second CXL storage 210_2, and the host 201 may be separated from the communications between the first CXL storage 210_1 and the CXL memory 220, and between the second CXL storage 210_2 and the CXL memory 220. As such, the communications between the first CXL storage 210_1, the second CXL storage 210_2, and the CXL memory 220 may not affect the communications between the first CXL storage 210_1, the second CXL storage 210_2, and the host 201. The communications between the first CXL storage 210_1, the second CXL storage 210_2, and the CXL memory 220 may be performed to be independent of the communications between the first CXL storage 210_1, the second CXL storage 210_2, and the host 201. As the independent link is used between the first CXL storage 210_1 and the CXL memory 220 and the independent link is used between the second CXL storage 210_2 and the CXL memory 220, the computing system with improved performance is provided.

The first to third interfaces IF1 to IF3 may be physically separated from each other. For example, the first and second interfaces IF1 and IF2 may be physically separated from each other; the second and third interfaces IF2 and IF3 may be physically separated from each other; the first and third interfaces IF1 and IF3 may be physically separated from each other. All the first to third interfaces IF1 to IF3 may be implemented with the CXL interface. In an embodiment, the CXL interface IF_CXL may indicate a low-latency and high-bandwidth link that supports coherency, memory access, and dynamic protocol muxing of IO protocols such that various connections between accelerators, memory devices, or various electronic devices are possible.

In an embodiment, the first CXL storage 210_1 may access the CXL memory 220 through the second interface IF2. The second CXL storage 210_2 may access the CXL memory 220 through the third interface IF3. For example, the first and second CXL storages 210_1 and 210_2 may store the mapping table in the allocated area of the CXL memory 220 or may read the mapping table from the allocated area of the CXL memory 220. Under control of the first and second CXL storages 210_1 and 210_2, the CXL memory 220 may store data (e.g., map data) in the buffer memory BFM or may send data (e.g., map data) stored in the buffer memory BFM to the first and second CXL storages 210_1 and 210_2.

As described with reference to FIG. 1, the related art storage device 13 stores and manages the map data by using the buffer memory 13b included therein. As the capacity of the storage device 13 increases, the size of the map data increase, thereby causing an increase in the capacity of the buffer memory 13b included in the storage device 13. However, there is a limitation on an increase in capacity due to the structure and physical characteristic of the buffer memory 13b included in the storage device 13; in this case, the design change or additional integration of the buffer memory 13b is required.

In contrast, according to an embodiment of the present disclosure, the first and second CXL storages 210_1 and 210_2 may use at least a partial area of the CXL memory 220 placed outside the first and second CXL storages 210_1 and 210_2 as a buffer memory. In this case, because the CXL memory 220 is implemented independently of the first and second CXL storages 210_1 and 210_2, the CXL memory 220 may be implemented with the a high-capacity memory. As such, even though the size of the map data increases due to an increase in the capacity of the first and second CXL storages 210_1 and 210_2, the map data may be managed normally by the CXL memory 220.

In an embodiment, the storage controller 13a of the related art storage device 13 communicates with the host 11 through the host interface such as PCIe or NVMe, and communicates with the buffer memory 13b through the memory interface such as a DDR interface or an LPDDR interface. That is, the storage controller 13a of the related art storage device 13 communicates with the host 11 placed outside and the buffer memory 13b included therein, through different interfaces (i.e., heterogeneous interfaces).

In contrast, according to an embodiment of the present disclosure, the CXL storage controllers 211_1 and 211_2 of the first and second CXL storages 210_1 and 210_2 may communicate with the host 201 through the first interface IF1 and may communicate with the CXL memory 220 (i.e., a buffer memory) through the second interface IF2 and the third interface IF3, respectively. In other words, the CXL storage controllers 211_1 and 211_2 of the first and second CXL storages 210_1 and 210_2 may communicate with the host 201 and the CXL memory 220 based on the homogeneous or common CXL protocol and may use a partial area or the entire area of the CXL memory 220 as a buffer memory.

However, different interfaces (links) may be used such that the communication between each of the first and second CXL storages 210_1 and 210_2 and the host 201 does not conflict with the communication between each of the first and second CXL storages 210_1 and 210_2 and the CXL memory 220. As such, the communication between each of the first and second CXL storages 210_1 and 210_2 and the CXL memory 220 may not affect the communication between each of the first and second CXL storages 210_1 and 210_2 and the host 201.

As described above, each of the first and second CXL storages 210_1 and 210_2 may be directly connected with the CXL memory 220. As such, the overhead of the host 201 may not occur due to the communications between the first and second CXL storages 210_1 and 210_2 and the CXL memory 220. The host 201 may not directly recognize the CXL memory 220. The host 201 may not directly access the CXL memory 220. The host 201 may not control or manage the CXL memory 220. In these cases, the first and second CXL storages 210_1 and 210_2 may control or manage the CXL memory 220. The first and second CXL storages 210_1 and 210_2 may be configured to control an overall operation of the CXL memory 220. For example, the first and second CXL storages 210_1 and 210_2 may direct the CXL memory 220 to perform the initialization operation or the power-off operation.

Below, for convenience of description, it is assumed that the host 201, the first CXL storage 210_1, and the second CXL storage 210_2 communicate with each other through the first interface IF1, the first CXL storage 210_1 and the CXL memory 220 communicate with each other through the second interface IF2, and the second CXL storage 210_2 and the CXL memory 220 communicate with each other through the third interface IF3. Also, it is assumed that all the first to third interfaces IF1 to IF3 are implemented with the CXL interface. However, the present disclosure is not limited thereto. For example, the host 201, the first CXL storage 210_1, the second CXL storage 210_2, and the CXL memory 220 may communicate with each other based on various computing interfaces complying with the following: GEN-Z protocol, NVLink protocol, CCIX protocol, and Open CAPI protocol.

Figure 3B:
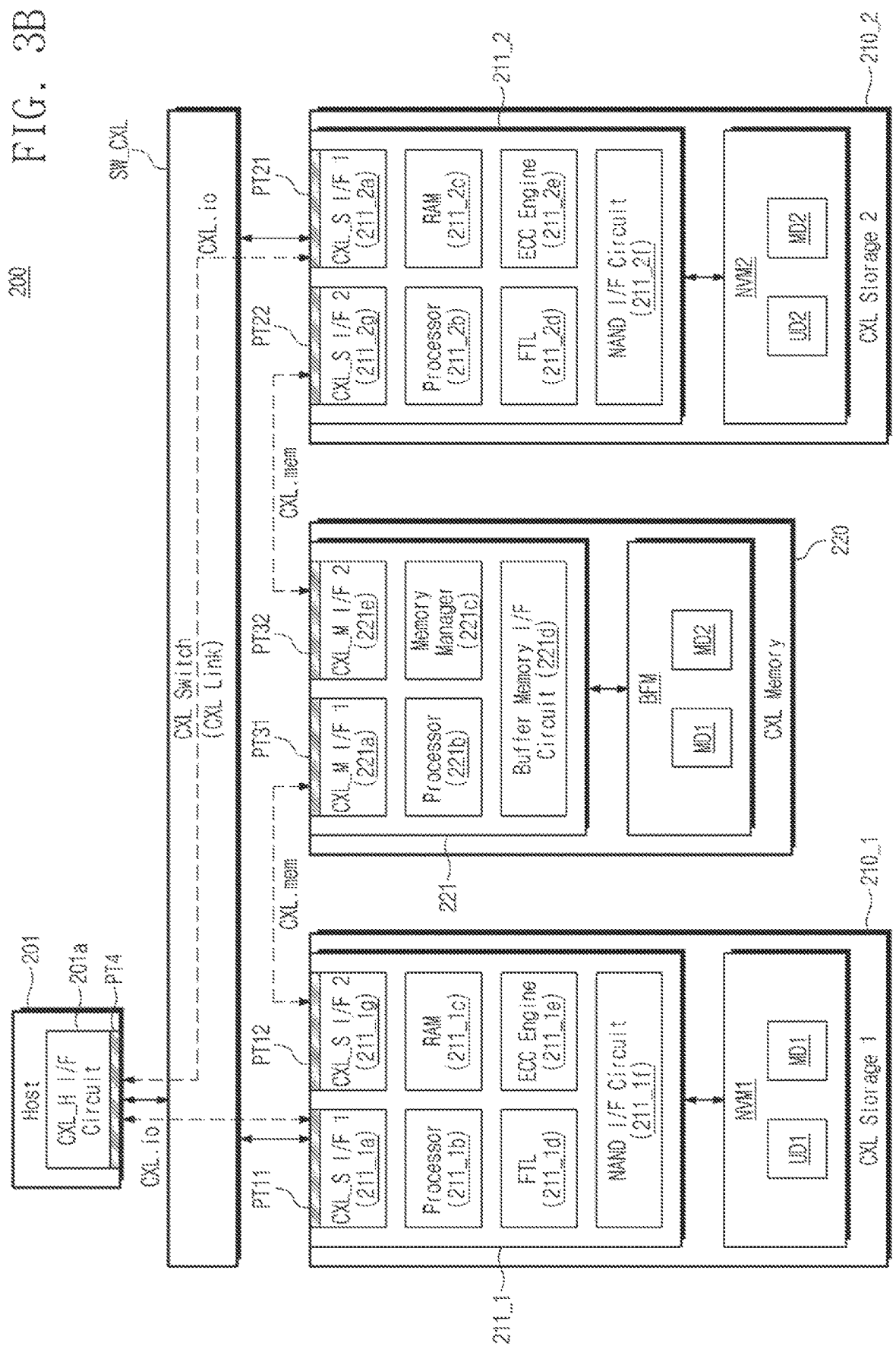
FIG. 3B is a block diagram illustrating components of a computing system of FIG. 3A in detail, according to some embodiments.

FIG. 3B is a block diagram illustrating components of a computing system of FIG. 3A in detail, according to some embodiments. Referring to FIGS. 3A and 3B, the computing system 200 may include the CXL switch SW_CXL, the host 201, the first CXL storage 210_1, the second CXL storage 210_2, and the CXL memory 220.

The CXL switch SW_CXL may be a component included in the first interface IF1. The CXL switch SW_CXL may be configured to arbitrate the communications between the host 201, the first CXL storage 210_1, the second CXL storage 210_2, and the CXL memory 220. For example, when the host 201, the first CXL storage 210_1, and the second CXL storage 210_2 communicate with each other, the CXL switch SW_CXL may be configured to transfer information, which is transferred from the host 201, the first CXL storage 210_1, or the second CXL storage 210_2, such as a request, data, a response, or a signal, to the first CXL storage 210_1, the second CXL storage 210_2, or the host 201.

The host 201 may include a CXL host interface circuit 201a. The CXL host interface circuit 201a may include a port PT4. The CXL host interface circuit 201a may send and receive information, such as a request, data, a response, or a signal, through the port PT4. The port PT4 may be a circuit or a physical layer configured to send and receive a physical signal complying with the CXL or PCIe protocol. The CXL host interface circuit 201a may communicate with the first and second CXL storages 210_1 and 210_2 through the first interface IF1. The CXL host interface circuit 201a may communicate with the first and second CXL storages 210_1 and 210_2 through the CXL switch SW_CXL. Because the CXL memory 220 is not connected with the CXL switch SW_CXL, the host 201 may not communicate with the CXL memory 220.

In an embodiment, the first and second CXL storages 210_1 and 210_2 may be different in configuration from the related art storages. For example, the related art storage device (e.g., an SSD including a DRAM buffer) stores and manages map data in the DRAM buffer included in the related art storage device. In this case, a high-capacity DRAM buffer for storing the map data should be included in the related art storage device. In some embodiments, another type of related art storage device (e.g., a DRAM-less SSD or a DRAM-less memory card) stores the entire map data in a nonvolatile memory (e.g., a NAND flash memory) included in the related art storage device and loads and uses a portion of the map data onto an SRAM buffer. In this case, to load the map data, the access to the nonvolatile memory whose operating speed is lower than that of the DRAM buffer is frequently performed, thereby reducing the performance of operation.

In contrast, each of the first and second CXL storages 210_1 and 210_2 according to an embodiment of the present disclosure may not include a separate DRAM buffer configured to store the map data. In this case, each of first map data MD1 of the first CXL storage 210_1 and second map data MD2 of the second CXL storage 210_2 may be stored and managed in the CXL memory 220 placed outside the first and second CXL storages 210_1 and 210_2. As will be described below, because the CXL memory 220 supports a fast operating speed, the first and second CXL storages 210_1 and 210_2 may have the same performance as the related art storage device (e.g., a storage device including a DRAM). In addition, because the CXL memory 220 are placed outside the first and second CXL storages 210_1 and 210_2, it may be possible to easily cope with a large amount of map data of each of the first and second CXL storages 210_1 and 210_2. As such, the computing system 200 may support a high-capacity storage area.

The first CXL storage 210_1 may include the CXL storage controller 211_1 and the nonvolatile memory NVM1. The CXL storage controller 211_1 may include a first CXL storage interface (I/F) circuit 211_1a, a processor 211_1b, a RAM 211_1c, a flash translation layer (FTL) 211_1d, an error correction code (ECC) engine 211_1e, a NAND interface (I/F) circuit 211_1f, and a second CXL storage interface (I/F) circuit 211_1g.

The first CXL storage interface circuit 211_1a may be connected with the host 201. The first CXL storage interface circuit 211_1a may include a first port PT11. The first CXL storage interface circuit 211_1a may send and receive information, such a request, data, a response, or a signal, to and from the host 11 through the first port PT11. The first port PT11 may be a circuit or a physical layer configured to send and receive a physical signal complying with the CXL or PCIe protocol. The first CXL storage interface circuit 211_1a may communicate with the host 201 through the first interface IF1. The first CXL storage interface circuit 211_1a may be connected with the CXL switch SW_CXL. The first CXL storage interface circuit 211_1a may communicate with the host 201 through the CXL switch SW_CXL.

The second CXL storage interface circuit 211_1g may be connected with the CXL memory 220. The second CXL storage interface circuit 211_1g may include a second port PT12. The second port PT12 may be a dedicated port for the communication of the CXL memory 220. The second CXL storage interface circuit 211_1g may send and receive information, such a request, data, a response, or a signal, to and from the CXL memory 220 through the second port PT12. The second port PT12 may be a circuit or a physical layer configured to send and receive a physical signal complying with the CXL or PCIe protocol. The second CXL storage interface circuit 211_1g may communicate with the CXL memory 220 through the second interface IF2. The second CXL storage interface circuit 211_1g may be connected with the CXL switch SW_CXL. The second CXL storage interface circuit 211_1g may communicate with the host 201 through the CXL switch SW_CXL.

The processor 211_1b may be configured to control an overall operation of the CXL storage controller 211_1. The RAM 211_1c may be used as a working memory or a buffer memory of the CXL storage controller 211_1. In an embodiment, the RAM 211_1c may be an SRAM and may be used as a read buffer and a write buffer for the first CXL storage 210_1. In an embodiment, as will be described below, the RAM 211_1c may be configured to temporarily store the map data MD1 read from the CXL memory 220 or a portion of the map data MD1.

The FTL 211_1d may perform various management operations for efficiently using the nonvolatile memory NVM1. For example, the FTL 211_1d may perform address translation between a logical block address managed by the host 201 and a physical block address used in the nonvolatile memory NVM1, based on map data (or a mapping table). The FTL 211_1d may perform a bad block management operation for the nonvolatile memory NVM1. The FTL 211_1d may perform a wear leveling operation for the nonvolatile memory NVM1. The FTL 211_1d may perform a garbage collection operation for the nonvolatile memory NVM1.

In an embodiment, the FTL 211_1d may be implemented in the form of hardware, firmware, or software, or in the form of a combination thereof. In the case where the FTL 211_1d is implemented in the form of firmware or software, program codes associated with the FTL 211_1d may be stored in the RAM 211_1c and may be driven by the processor 211_1b. In the case where the FTL 211_1d is implemented with hardware, hardware components configured to perform the above management operations may be implemented in the CXL storage controller 211_1.

The ECC engine 211_1e may perform error detection and correction on data read from the nonvolatile memory NVM1. For example, the ECC engine 211_1e may generate parity bits for user data UD1 to be stored in the nonvolatile memory NVM1, and the parity bits thus generated may be stored in the nonvolatile memory NVM1 together with the user data UD1. When the user data UD1 are read from the nonvolatile memory NVM1, the ECC engine 211_1e may detect and correct an error of the user data UD1 by using the parity bits read from the nonvolatile memory NVM1 together with the user data UD1.

The NAND interface circuit 211_1f may control the nonvolatile memory NVM1 such that data are stored in the nonvolatile memory NVM1 or data are read from the nonvolatile memory NVM1. In an embodiment, the NAND interface circuit 211_1f may be implemented to comply with the standard protocol such as a toggle interface or ONFI. For example, the nonvolatile memory NVM1 may include a plurality of NAND flash devices; in the case where the NAND interface circuit 211_1f is implemented based on the toggle interface, the NAND interface circuit 211_1f communicates with the plurality of NAND flash devices through a plurality of channels. The plurality of NAND flash devices may be connected with the plurality of channels through a multi-channel, multi-way structure.

The NAND interface circuit 211_1f may send a chip enable signal /CE, a command latch enable signal CLE, an address latch enable signal ALE, a read enable signal /RE and a write enable signal /WE to the plurality of NAND flash devices through the plurality of channels. The NAND interface circuit 211_1f and each NAN flash device may exchange a data signal DQ and a data strobe signal DQS through each channel.

TABLE 1

| /CE | CLE | ALE | /WE | /RE | DQS | DQx | MODE |
|---|---|---|---|---|---|---|---|
| L | H | L | ↑ | H | X | CMD | Command Input |
| L | L | H | ↑ | H | X | ADDR | Address Input |
| L | L | L | H | H | ↑↓ | DATA_in | Data Input |
| L | L | L | H | ↑↓ | ↑↓ | DATA_out | Data Output |

Table 1 shows operating modes of a NAND flash device according to a state of each signal. Referring to Table 1, while the NAND flash device receives a command CMD or an address ADDR or receives/outputs data "DATA", the chip enable signal /CE maintains a low state "L". During a command input mode, the NAND interface circuit 211_1f may control signal lines such that the command latch enable signal CLE has a high level "H", the address latch enable signal ALE has the low level "L", the write enable signal /WE toggles between the high level "H" and the low level "L" and the read enable signal /RE has the high level "H". During the command input mode, the NAND interface circuit 211_1f may send the command CMD to the NAND flash device through data signals DQx in synchronization with the rising edge ↑ of the write enable signal /WE. The NAND flash device may identify the command CMD from the data signals DQx in response to the rising edge ↑ of the write enable signal /WE. During an address input mode, the NAND interface circuit 211_1f may control signal lines such that the command latch enable signal CLE has the low level "L", the address latch enable signal ALE has the high level "H", the write enable signal /WE toggles between the high level "H" and the low level "L", and the read enable signal /RE has the high level "H". During the address input mode, the NAND interface circuit 211_1f may send the address ADDR to the NAND flash device through the data signals DQx in synchronization with the rising edge ↑ of the write enable signal /WE. The NAND flash device may identify the address ADDR from the data signals DQx in response to the rising edge ↑ of the write enable signal /WE. In an embodiment, the address ADDR may be a value corresponding to a physical block address of the NAND flash device.

During a data input mode, the NAND interface circuit 211_1f may control signal lines such that the command latch enable signal CLE has the low level "L", the address latch enable signal ALE has the low level "L", the write enable signal /WE has the high level "H", the read enable signal /RE has the high level "H", and the data strobe signal DQS toggles between the high level "H" and the low level "L". During the data input mode, the NAND interface circuit 211_1f may send the data "DATA" to the NAND flash device through the data signals DQx in synchronization with the rising edge ↑ and the falling edge ↓ of the data strobe signal DQS. The NAND flash device may identify the data "DATA" from the data signals DQx in response to the rising edge ↑ and the falling edge ↓ of the data strobe signal DQS.

During a data output mode, the NAND interface circuit 211_1f may control signal lines that the command latch enable signal CLE has the low level "L", the address latch enable signal ALE has the low level "L", the write enable signal /WE has the high level "H", and the read enable signal /RE toggles between the high level "H" and the low level "L". During the data output mode, the NAND flash device may generate the data strobe signal DQS toggling between the high level "H" and the low level "L" in response to the read enable signal /RE. The NAND flash device may send the data "DATA" to the NAND interface circuit 211_1f through the data signals DQx in synchronization with the rising edge ↑ and the falling edge ↓ of the data strobe signal DQS. The NAND interface circuit 211_1f may identify the data "DATA" from the data signals DQx in response to the rising edge ↑ and the falling edge ↓ of the data strobe signal DQS.

The toggle interface described above is an example, and the present disclosure is not limited thereto.

The nonvolatile memory NVM1 may store or output the user data UD1 under control of the CXL storage controller 211_1. The nonvolatile memory NVM1 may store or output the map data MD1 under control of the CXL storage controller 211_1. In an embodiment, the map data MD1 stored in the nonvolatile memory NVM1 may include mapping information corresponding to the entire user data UD1 stored in the nonvolatile memory NVM1. The map data MD1 present in the nonvolatile memory NVM1 may be stored in the CXL memory 220 in the initialization operation of the first CXL storage 210_1.

The first CXL storage 210_1 may perform direct communication with the CXL memory 220. The first CXL storage 210_1 may send and receive information, such a request, data, a response, or a signal, through the second port PT12. For example, the first CXL storage 210_1 and the CXL memory 220 may be directly connected without using an intermediate device such as a switch or a router.

The second CXL storage 210_2 may include the CXL storage controller 211_2 and the nonvolatile memory NVM2. The CXL storage controller 211_2 may include a first CXL storage interface (I/F) circuit 211_2a, a processor 211_2b, a RAM 211_2c, a flash translation layer (FTL) 211_2d, an error correction code (ECC) engine 211_2e, a NAND interface circuit 211_2f, and a second CXL storage (I/F) interface circuit 211_2g.

The first CXL storage interface circuit 211_2a may be connected with the host 201. The first CXL storage interface circuit 211_2a may include a first port PT21. The first CXL storage interface circuit 211_2a may send and receive information, such a request, data, a response, or a signal, to and from the host 201 through the first port PT21. The first port PT21 may be a circuit or a physical layer configured to send and receive a physical signal complying with the CXL or PCIe protocol. The first CXL storage interface circuit 211_2a may communicate with the host 201 through the first interface IF1. The first CXL storage interface circuit 211_2a may be connected with the CXL switch SW_CXL. The first CXL storage interface circuit 211_2a may communicate with the host 201 through the CXL switch SW_CXL.

The second CXL storage interface circuit 211_2g may be connected with the CXL memory 220. The second CXL storage interface circuit 211_2g may include a second port PT22. The second port PT22 may be a dedicated port for the communication of the CXL memory 220. The second CXL storage interface circuit 211_2g may send and receive information, such a request, data, a response, or a signal, to and from the CXL memory 220 through the second port PT22. The second port PT22 may be a circuit or a physical layer configured to send and receive a physical signal complying with the CXL or PCIe protocol. The second CXL storage interface circuit 211_2g may communicate with the CXL memory 220 through the third interface IF3.

The RAM 211_2c may be configured to temporarily store the map data MD2 read from the CXL memory 220 or a portion of the map data MD2. The ECC engine 211_2e may generate parity bits for the user data UD2 to be stored in the nonvolatile memory NVM2, and the parity bits thus generated may be stored in the nonvolatile memory NVM2 together with the user data UD2. When the user data UD2 are read from the nonvolatile memory NVM2, the ECC engine 211_2e may detect and correct an error of the user data UD2 by using the parity bits read from the nonvolatile memory NVM2 together with the user data UD2.

The nonvolatile memory NVM2 may store or output the user data UD2 under control of the CXL storage controller 211_2. The nonvolatile memory NVM2 may store or output the map data MD2 under control of the CXL storage controller 211_2. In an embodiment, the map data MD2 stored in the nonvolatile memory NVM2 may include mapping information corresponding to the entire user data UD2 stored in the nonvolatile memory NVM2. The map data MD2 present in the nonvolatile memory NVM2 may be stored in the CXL memory 220 in the initialization operation of the second CXL storage 210_2.

The second CXL storage 210_2 may perform direct communication with the CXL memory 220. The second CXL storage 210_2 may send and receive information, such a request, data, a response, or a signal, through the second port PT22. For example, the second CXL storage 210_2 and the CXL memory 220 may be directly connected without using an intermediate device such as a switch or a router.

The processor 211_2b, the RAM 211_2c, the FTL 211_2d, the ECC engine 211_2e, and the NAND interface circuit 211_2f illustrated in FIG. 3B are similar or identical to the processor 211_1b, the RAM 211_1c, the FTL 211_1d, the ECC engine 211_1e, and the NAND interface circuit 211_1f illustrated in FIG. 3B, and thus, additional description will be omitted to avoid redundancy.

The CXL memory 220 may include the CXL memory controller 221 and the buffer memory BFM. The CXL memory controller 221 may include a first CXL memory interface (I/F) circuit 221a, a processor 221b, a memory manager 221c, a buffer memory interface circuit 221d, and a second CXL memory (I/F) interface circuit 221e.

The first CXL memory interface circuit 221a may be connected with the first CXL storage 210_1. The first CXL memory interface circuit 221a may include a first port PT31. The first port PT31 may be a dedicated port for the communication of the first CXL storage 210_1. The first CXL memory interface circuit 221a may send and receive information, such as a request, data, a response, or a signal, to and from the first CXL storage 210_1 through the first port PT31. The first port PT31 may be a circuit or a physical layer configured to send and receive a physical signal complying with the CXL or PCIe protocol.

The first CXL memory interface circuit 221a may directly communicate with the first CXL storage 210_1. The first CXL memory interface circuit 221a may communicate with the first CXL storage 210_1 through the second interface IF2. The first CXL memory interface circuit 221a may not communicate with any other devices of the computing system 200 other than the first CXL storage 210_1. For example, the first CXL memory interface circuit 221a may not communicate with the host 201.

The second CXL memory interface circuit 221e may be connected with the second CXL storage 210_2. The second CXL memory interface circuit 221e may include a second port PT32. The second port PT32 may be a dedicated port for the communication of the second CXL storage 210_2. The second CXL memory interface circuit 221e may send and receive information, such as a request, data, a response, or a signal, to and from the second CXL storage 210_2 through the second port PT32. The second port PT32 may be a circuit or a physical layer configured to send and receive a physical signal complying with the CXL or PCIe protocol.

The second CXL memory interface circuit 221e may perform the direct communication with the second CXL storage 210_2. The second CXL memory interface circuit 221e may communicate with the second CXL storage 210_2 through the third interface IF3. The second CXL memory interface circuit 221e may not communicate with any other devices of the computing system 200 other than the second CXL storage 210_2. For example, the second CXL memory interface circuit 221e may not communicate with the host 201.

The processor 221b may be configured to control an overall operation of the CXL memory controller 221. The memory manager 221c may be configured to manage the buffer memory BFM. For example, the memory manager 221c may be configured to translate a memory address (e.g., a logical address or a virtual address) from the first and second CXL storages 210_1 and 210_2 into a physical address for the buffer memory BFM. In an embodiment, the memory address that is an address for managing a storage area of the CXL memory 220 may be a logical address or a virtual address that is designated and managed by the first and second CXL storages 210_1 and 210_2.

The buffer memory interface circuit 221d may control the buffer memory BFM such that data are stored in the buffer memory BFM or data are read from the buffer memory BFM. In an embodiment, the buffer memory interface circuit 221d may be implemented to comply with the standard protocol such as a DDR interface or an LPDDR interface.

Under control of the CXL memory controller 221, the buffer memory BFM may store data or may output the stored data. In an embodiment, the buffer memory BFM may be configured to store the map data MD1 used in the first CXL storage 210_1 or the map data MD2 used in the second CXL storage 210_2. When the computing system 200 or the first and second CXL storages 210_1 and 210_2 are initialized, the map data MD1 and MD2 may be transferred from the first and second CXL storages 210_1 and 210_2 to the CXL memory 220.

The CXL memory 220 may be controlled or managed by the first CXL storage 210_1 and the second CXL storage 210_2. For example, the first and second CXL storages 210_1 and 210_2 may operate as a master device with regard to the CXL memory 220, and the CXL memory 220 may operate as a slave device.

As described above, the first and second CXL storages 210_1 and 210_2 according to an embodiment of the present disclosure may store the map data MD1 and MD2, which are used to manage the nonvolatile memories NVM1 and NVM2, in the CXL memory 220 directly connected therewith. Afterwards, when the first or second CXL storages 210_1 or 210_2 performs the read operation depending on a request of the host 201, the first or second CXL storages 210_1 or 210_2 may read at least a portion of the map data MD1 or MD2 from the CXL memory 220 through the second or third interface IF2 or IF3 and may perform the read operation based on the read portion of the map data MD1 or MD2. In some embodiments, when the first or second CXL storage 210_1 or 210_2 performs the write operation depending on a request of the host 201, the first or second CXL storages 210_1 or 210_2 may perform the write operation on the nonvolatile memory NVM1 or NVM2 and may update the map data MD1 or MD2. In this case, the updated map data MD1 or MD2 may be first stored in the RAM 211_1c or 211_2c of the CXL storage controller 211_1 or 211_2, and the map data MD1 or MD2 stored in the RAM 211_1c or 211_2c may be transferred to the buffer memory BFM of the CXL memory 220 through the second or third interface IF2 or IF3, so as to be updated in the buffer memory BFM.

In an embodiment, at least a partial area or the entire area of the buffer memory BFM in the CXL memory 220 may be allocated for a dedicated area of the first and second CXL storages 210_1 and 210_2. The entire area of the CXL memory 220 may be an area that is incapable of being accessed by the host 201.

In an embodiment, the host 201 and the first CXL storage 210_1 may communicate with each other by using CXL.io being an input/output protocol. The host 201 and the second CXL storage 210_2 may communicate with each other by using the CXL.io being the input/output protocol. The CXL.io may have a PCIe-based non-coherency input/output protocol. The host 201 and the first CXL storage 210_1 may exchange user data or a variety of information with each other by using the CXL.io. The host 201 and the second CXL storage 210_2 may exchange user data or a variety of information with each other by using the CXL.io.

In an embodiment, the first CXL storage 210_1 and the CXL memory 220 may communicate with each other by using CXL.mem being a memory access protocol. The second CXL storage 210_2 and the CXL memory 220 may communicate with each other by using the CXL.mem. The CXL.mem may be a memory access protocol that supports memory access. Each of the first and second CXL storages 210_1 and 210_2 may access a partial area (e.g., an area where the map data MD1 and MD2 are stored or a CXL storage-dedicated area) of the CXL memory 220 by using the CXL.mem. That is, each of the first and second CXL storages 210_1 and 210_2 may access data stored in the CXL memory 220 in a unit smaller than a block or page unit (e.g., in a byte unit or in a cache line unit) by using the CXL.mem. As such, the read performance of the CXL memory 220 may be improved. The above access types including CXL.io and CXL.mem are provided as an example, and the present disclosure is not limited thereto.

In an embodiment, the first CXL storage 210_1, the second CXL storage 210_2, and the CXL memory 220 may be installed in a CXL interface-based physical port (e.g., a PCIe physical port). In an embodiment, the first CXL storage 210_1, the second CXL storage 210_2, and the CXL memory 220 may be implemented based on the E1.S, E1.L, E3.S, E3.L, or PCIe AIC (CEM) form factor. In some embodiments, the first CXL storage 210_1, the second CXL storage 210_2, and the CXL memory 220 may be implemented based on the U.2 form factor, the M.2 form factor, various different types of PCIe-based form factors, or various different types of small form factors. The first CXL storage 210_1, the second CXL storage 210_2, and the CXL memory 220 may be implemented with various types of form factors, and may support a function of a hot-plug capable of being installed in (or added to) or removed from the physical port.

As described above, the first CXL storage 210_1 may include the first port PT11 and the second port PT12, and the second CXL storage 210_2 may include the first port PT21 and the second port PT22. The CXL memory 220 may include the first port PT31 and the second port PT32. That is, each of the first CXL storage 210_1, the second CXL storage 210_2, and the CXL memory 220 may have a multi-port. Each of the first and second CXL storages 210_1 and 210_2 may communicate with the CXL memory 220 through the second ports PT12 and PT22. The first CXL storage 210_1, the second CXL storage 210_2, and the CXL memory 220 may be connected by using the CXL Direct. The first CXL storage 210_1, the second CXL storage 210_2, and the CXL memory 220 may improve performance by using a CXL-dedicated lane (or an exclusive link).

Figure 4:
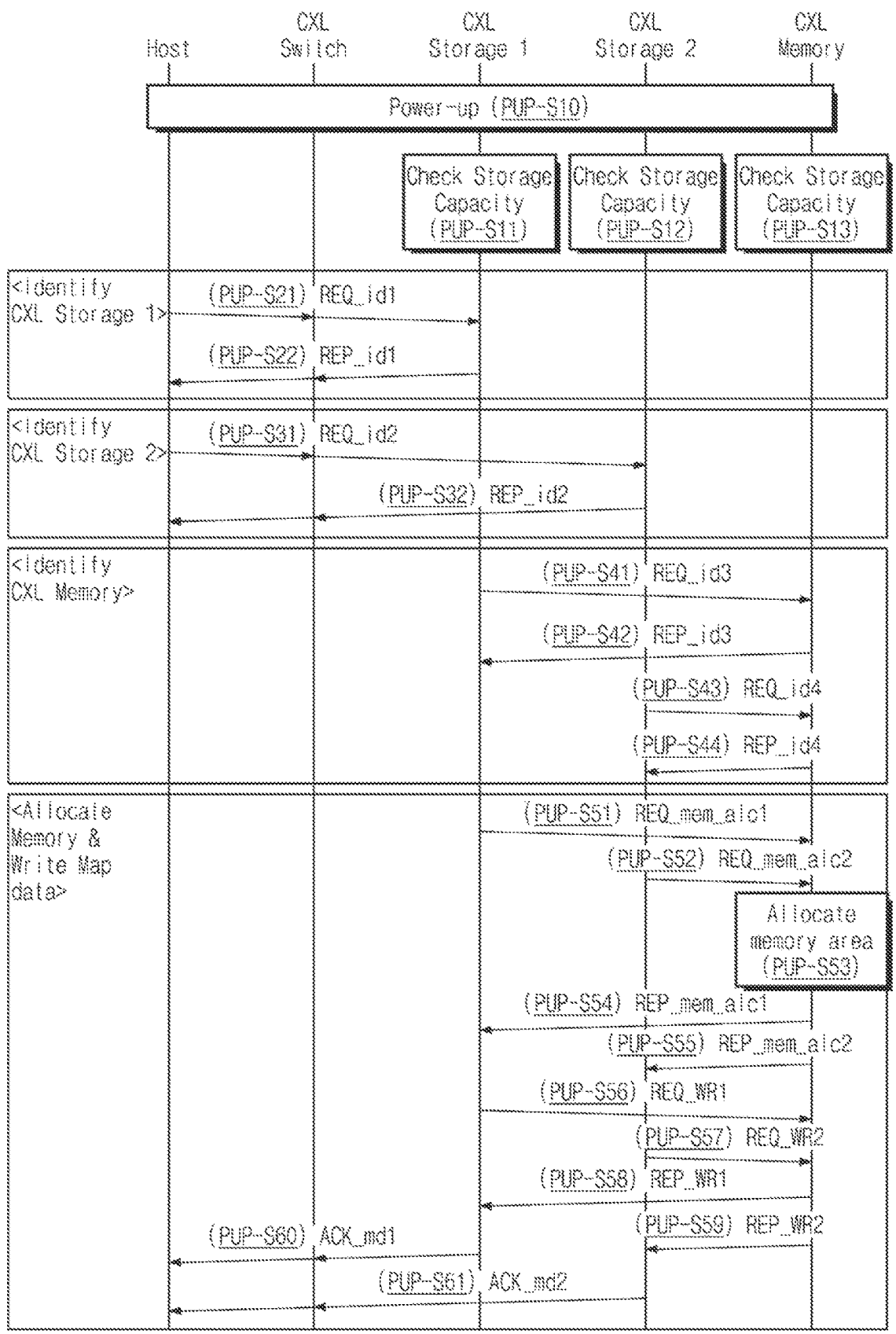
FIG. 4 is a flowchart illustrating an initialization operation or a power-up operation of a computing system of FIG. 3B, according to some embodiments.

FIG. 4 is a flowchart illustrating an initialization operation or a power-up operation of a computing system of FIG. 3B, according to some embodiments. Referring to FIGS. 3B and 4, in operation PUP-S10, the computing system 200 may be powered up. When the computing system 200 is powered up, the host 201 may send information about power-up or initialization start to the first and second CXL storages 210_1 and 210_2. Each of the first and second CXL storages 210_1 and 210_2 may perform the initialization operation in response to the information about power-up or initialization start. Each of the first and second CXL storages 210_1 and 210_2 may send the information about power-up or initialization start to the CXL memory 220. The CXL memory 220 may perform the initialization operation in response to the power-up or initialization start information.

In operation PUP-S11, the first CXL storage 210_1 may check a storage capacity (i.e., a capacity of the nonvolatile memory NVM1). For example, the first CXL storage 210_1 may check the storage capacity of the nonvolatile memory NVM1 in response to the power-up or initialization start information in operation PUP-S10.

In an embodiment, the first CXL storage 210_1 may check a connected state of a physical port. For example, the first CXL storage 210_1 may determine whether the second port PT12 is connected with an external device. The first CXL storage 210_1 may check a connected state of the second port PT12 (e.g., a connected state with the CXL memory 220).

In operation PUP-S12, the second CXL storage 210_2 may check a storage capacity (i.e., a capacity of the nonvolatile memory NVM2). For example, the second CXL storage 210_2 may check the storage capacity of the nonvolatile memory NVM2 in response to the power-up or initialization start information in operation PUP-S10.

In an embodiment, the second CXL storage 210_2 may check a connected state of a physical port. For example, the second CXL storage 210_2 may determine whether the second port PT22 is connected with an external device. The second CXL storage 210_2 may check a connected state of the second port PT22 (e.g., a connected state with the CXL memory 220).

In operation PUP-S13, the CXL memory 220 may check a memory capacity (i.e., a capacity of the buffer memory BFM). For example, the CXL memory 220 may check the capacity of the buffer memory BFM in response to the power-up or initialization start information.

In an embodiment, the CXL memory 220 may check information about a port of the CXL interface that is capable of being supported. For example, the CXL memory 220 may check a physical port, which is based on the CXL interface capable of being supported, the number of physical ports, and the like. The CXL memory 220 may check the first and second ports PT31 and PT32.

In an embodiment, the CXL memory 220 may check connected states of a plurality of physical ports. For example, the CXL memory 220 may determine whether external devices are respectively connected with the physical ports. The CXL memory 220 may check the connected state of the first port PT31 (e.g., the connected state with the first CXL storage 210_1) and the connected state of the second port PT32 (e.g., the connected state with the second CXL storage 210_2). In some embodiments, the operations PUP-S11, PUP-S12, and PUP-S13 may be performed substantially simultaneously. In some embodiments, the operations PUP-S11, PUP-S12, and PUP-S13 may be performed in parallel. However, the present disclosure is not limited to this.

The host 201 may recognize information of the first CXL storage 210_1 through operation PUP-S21 and operation PUP-S22. For example, in operation PUP-S21, the host 201 may issue a first device information request REQ_id1 for recognizing device information of the first CXL storage 210_1 through the CXL host interface circuit 201a (or the port PT4). The host 201 may send the first device information request REQ_id1 to the first CXL storage 210_1 through the first interface IF1. The first device information request REQ_id1 may be transferred to the CXL switch SW_CXL. The CXL switch SW_CXL may transfer the first device information request REQ_id1 to the first CXL storage 210_1 targeted for the first device information request REQ_id1. The first CXL storage 210_1 may receive the first device information request REQ_id1 through the first port PT11 (or the first CXL storage interface circuit 211_1a).

In operation PUP-S22, the first CXL storage 210_1 may output and the host 201 may receive a first device information response REP_id1 through the first CXL storage interface circuit 211_1a (or the first port PT11) in response to the first device information request REQ_id1 thus received. The first CXL storage 210_1 may send the first device information response REP_id1 to the host 201 through the first interface IF1. The first device information response REP_id1 may be transferred to the CXL switch SW_CXL. The CXL switch SW_CXL may transfer the first device information response REP_id1 to the host 201 targeted for the first device information response REP_id1.

The host 201 may identify the device information of the first CXL storage 210_1 in response to the first device information response REP_id1 thus received. In an embodiment, the first device information response REP_id1 may include information about a device type and a storage capacity of the first CXL storage 210_1.

The host 201 may recognize information of the second CXL storage 210_2 through operation PUP-S31 and operation PUP-S32. For example, in operation PUP-S31, the host 201 may issue a second device information request REQ_id2 for recognizing device information of the second CXL storage 210_2 through the CXL host interface circuit 201a (or the port PT4). The host 201 may send the second device information request REQ_id2 to the second CXL storage 210_2 through the first interface IF1. The second device information request REQ_id2 may be transferred to the CXL switch SW_CXL. The CXL switch SW_CXL may transfer the second device information request REQ_id2 to the second CXL storage 210_2 targeted for the second device information request REQ_id2. The second CXL storage 210_2 may receive the second device information request REQ_id2 through the first port PT21 (or the first CXL storage interface circuit 211_2a).

In operation PUP-S32, the second CXL storage 210_2 may output and the host 201 may receive a second device information response REP_id2 through the first CXL storage interface circuit 211_2a (or the first port PT21) in response to the second device information request REQ_id2 thus received. The second CXL storage 210_2 may send the second device information response REP_id2 to the host 201 through the first interface IF1. The second device information response REP_id2 may be transferred to the CXL switch SW_CXL. The CXL switch SW_CXL may transfer the second device information response REP_id2 to the host 201 targeted for the second device information response REP_id2.

The host 201 may identify the device information of the second CXL storage 210_2 in response to the second device information response REP_id2 thus received. In an embodiment, the second device information response REP_id2 may include information about a device type and a storage capacity of the second CXL storage 210_2.

Each of the first and second CXL storages 210_1 and 210_2 may recognize information of the CXL memory 220 through operation PUP-S41 to operation PUP-S44. For example, in operation PUP-S41, the first CXL storage 210_1 may issue a third device information request REQ_id3 for recognizing device information of the CXL memory 220 through the second CXL storage interface circuit 211_1g (or the second port PT12). The first CXL storage 210_1 may send the third device information request REQ_id3 to the CXL memory 220 through the second interface IF2. The CXL memory 220 may receive the third device information request REQ_id3 through the first port PT31 (or the first CXL memory interface circuit 221a).

In operation PUP-S42, the CXL memory 220 may output and the first CXL storage 210_1 may receive a third device information response REP_id3 through the first CXL memory interface circuit 221a in response to the third device information request REQ_id3 thus received. The CXL memory 220 may send the third device information response REP_id3 to the first CXL storage 210_1 through the second interface IF2. The first CXL storage 210_1 may receive the third device information response REP_id3 through the second CXL storage interface circuit 211_1g (or the second port PT12).

The first CXL storage 210_1 may identify the device information of the CXL memory 220 in response to the third device information response REP_id3 thus received. In an embodiment, the third device information response REP_id3 may include information about a device type and a storage capacity of the CXL memory 220.

For example, in operation PUP-S43, the second CXL storage 210_2 may issue a fourth device information request REQ_id4 for recognizing the device information of the CXL memory 220 through the second CXL storage interface circuit 211_2g (or the second port PT22). The second CXL storage 210_2 may send the fourth device information request REQ_id4 to the CXL memory 220 through the third interface IF3. The CXL memory 220 may receive the fourth device information request REQ_id4 through the second port PT32 (or the second CXL memory interface circuit 221e).

In operation PUP-S44, the CXL memory 220 may output and the second CXL storage 210_2 may receive a fourth device information response REP_id4 through the second CXL memory interface circuit 221e in response to the fourth device information request REQ_id4 thus received. The CXL memory 220 may send the fourth device information response REP_id4 to the second CXL storage 210_2 through the third interface IF3. The second CXL storage 210_2 may receive the fourth device information response REP_id4 through the second CXL storage interface circuit 211_2g (or the second port PT22).

The second CXL storage 210_2 may identify the device information of the CXL memory 220 in response to the fourth device information response REP_id4 thus received. In an embodiment, the fourth device information response REP_id4 may include information about the device type and the storage capacity of the CXL memory 220.

As described above, the host 201 may identify the information about the device type (e.g., whether it is storage) of the first CXL storage 210_1 through operation PUP-S21 and operation PUP-S22. The host 201 may identify the information about the device type (e.g., whether it is storage) of the second CXL storage 210_2 through operation PUP-S31 and operation PUP-S32. The first CXL storage 210_1 may identify the information about the device type (e.g., whether it is a memory) and the capacity of the CXL memory 220 through operation PUP-S41 and operation PUP-S42. The second CXL storage 210_2 may identify the information about the device type (e.g., whether it is a memory) and the capacity of the CXL memory 220 through operation PUP-S43 and operation PUP-S44. As described above, the host 201 may recognize only the first and second CXL storages 210_1 and 210_2. That is, the host 201 may not recognize the CXL memory 220. The CXL memory 220 may not directly communicate with the host 201. The CXL memory 220 may be a device that is independent of the host 201.

The first and second CXL storages 210_1 and 210_2 may allocate at least a partial area of the CXL memory 220 for a dedicated area of the first and second CXL storages 210_1 and 210_2 through operation PUP-S51 to operation PUP-S61. In some embodiments, the entire area of the CXL memory 220 may be allocated for the dedicated area of the first and second CXL storages 210_1 and 210_2.

For example, in operation PUP-S51, the first CXL storage 210_1 may issue a first memory allocation request REQ_mem_alc1 through the second CXL storage interface circuit 211_1g (or the second port PT12). The first CXL storage 210_1 may send the first memory allocation request REQ_mem_alc1 to the CXL memory 220 through the second interface IF2. The CXL memory 220 may receive the first memory allocation request REQ_mem_alc1 through the first CXL memory interface circuit 221a (or the first port PT31). In an embodiment, the first memory allocation request REQ_mem_alc1 may refer to an allocation request for an area of the CXL memory 220, which is to be used as a dedicated area of the first CXL storage 210_1.

In operation PUP-S52, the second CXL storage 210_2 may issue a second memory allocation request REQ_mem_alc2 through the second CXL storage interface circuit 211_2g (or the second port PT22). The second CXL storage 210_2 may send the second memory allocation request REQ_mem_alc2 to the CXL memory 220 through the third interface IF3. The CXL memory 220 may receive the second memory allocation request REQ_mem_alc2 through the second CXL memory interface circuit 221e (or the second port PT32). In an embodiment, the second memory allocation request REQ_mem_alc2 may refer to an allocation request for an area of the CXL memory 220, which is to be used as a dedicated area of the second CXL storage 210_2.

In operation PUP-S53, the CXL memory 220 may allocate at least a partial area of the CXL memory 220 for the dedicated area of the first and second CXL storages 210_1 and 210_2 in response to the first and second memory allocation requests REQ_mem_alc1 and REQ_mem_alc2, respectively. For example, the CXL memory 220 may allocate at least a partial area of the CXL memory 220 for the dedicated area of the first and second CXL storages 210_1 and 210_2 based on the priority determined in advance.

In an embodiment, the CXL memory 220 may determine buffer capacities to be used by the first and second CXL storages 210_1 and 210_2 based on storage capacities of the first and second CXL storages 210_1 and 210_2. The CXL memory 220 may allocate the area of the CXL memory 220, which corresponds to the determined buffer capacity, for the dedicated area of the first and second CXL storages 210_1 and 210_2.

In an embodiment, the CXL memory 220 may set address information for each physical port based on the determined buffer capacity. For example, the CXL memory 220 may determine a first buffer capacity as a capacity for the dedicated area of the first CXL storage 210_1 and may determine a second buffer capacity as a capacity for the dedicated area of the second CXL storage 210_2. The CXL memory 220 may allocate a first address range corresponding to the first buffer capacity to the first port PT31 and may allocate a second address range corresponding to the second buffer capacity to the second port PT32.

In operation PUP-S54, the CXL memory 220 may output a first memory allocation response REP_mem_alc1 through the first CXL memory interface circuit 221a (or the first port PT31). The CXL memory 220 may send the first memory allocation response REP_mem_alc1 to the first CXL storage 210_1 through the second interface IF2. The first CXL storage 210_1 may receive the first memory allocation response REP_mem_alc1 through the second CXL storage interface circuit 211_1g (or the second port PT12). In an embodiment, the first memory allocation response REP_mem_alc1 may include information about a device identifier of the CXL memory 220 and a memory address (e.g., a logical address range or a virtual address range) of an area of the CXL memory 220, which is allocated for the dedicated area of the first CXL storage 210_1. For example, the first CXL storage 210_1 may exclusively possess the dedicated area of the first CXL storage 210_1, which corresponds to the allocated area of the CXL memory 220. That is, only the first CXL storage 210_1 may access the dedicated area of the first CXL storage 210_1, which corresponds to the allocated area of the CXL memory 220.

The first CXL storage 210_1 may identify the area of the CXL memory 220, which corresponds to the dedicated area of the first CXL storage 210_1, based on the first memory allocation response REP_mem_alc1.

In operation PUP-S55, the CXL memory 220 may output a second memory allocation response REP_mem_alc2 through the second CXL memory interface circuit 221e (or the second port PT32). The CXL memory 220 may send the second memory allocation response REP_mem_alc2 to the second CXL storage 210_2 through the third interface IF3. The second CXL storage 210_2 may receive the second memory allocation response REP_mem_alc2 through the second CXL storage interface circuit 211_2g (or the second port PT22). In an embodiment, the second memory allocation response REP_mem_alc2 may include information about the device identifier of the CXL memory 220 and a memory address (e.g., a logical address range or a virtual address range) of an area of the CXL memory 220, which is allocated for the dedicated area of the second CXL storage 210_2. For example, the second CXL storage 210_2 may exclusively possess the dedicated area of the second CXL storage 210_2, which corresponds to the allocated area of the CXL memory 220. That is, only the second CXL storage 210_2 may access the dedicated area of the second CXL storage 210_2, which corresponds to the allocated area of the CXL memory 220.

The second CXL storage 210_2 may identify the area of the CXL memory 220, which corresponds to the dedicated area of the second CXL storage 210_2, based on the second memory allocation response REP_mem_alc2.

In operation PUP-S56, the first CXL storage 210_1 may output a first write request REQ_WR1 through the second CXL storage interface circuit 211_1g (or the second port PT12). The first CXL storage 210_1 may send the first write request REQ_WR1 to the CXL memory 220 through the second interface IF2. The CXL memory 220 may receive the first write request REQ_WR1 through the first CXL memory interface circuit 221a (or the first port PT31). The CXL memory 220 may perform the write operation in the first write request REQ_WR1.

In operation PUP-S57, the second CXL storage 210_2 may output a second write request REQ_WR2 through the second CXL storage interface circuit 211_2g (or the second port PT22). The second CXL storage 210_2 may send the second write request REQ_WR2 to the CXL memory 220 through the third interface IF3. The CXL memory 220 may receive the second write request REQ_WR2 through the second CXL memory interface circuit 221e (or the second port PT32). The CXL memory 220 may perform the write operation in the second write request REQ_WR2.

In operation PUP-S58, the CXL memory 220 may output a first write response REP_WR1, which provides notification that the write operation is completed, through the first CXL memory interface circuit 221a (or the first port PT31). The CXL memory 220 may send the first write response REP_WR1 to the first CXL storage 210_1 through the second interface IF2. The first CXL storage 210_1 may receive the first write response REP_WR1 through the second CXL storage interface circuit 211_1g (or the second port PT12). The first CXL storage 210_1 may recognize that the write operation is completely performed on the CXL memory 220, in response to the first write response REP_WR1.

In an embodiment, the first write request REQ_WR1 may refer to a request for storing the map data MD1 present in the nonvolatile memory NVM1 of the first CXL storage 210_1 in the dedicated area of the CXL memory 220. That is, the first write request REQ_WR1 may include the map data MD1 and address information about the dedicated area. Through operation PUP-S56 and operation PUP-S58, the map data MD1 present in the first CXL storage 210_1 may be stored in the dedicated area of the CXL memory 220.

In operation PUP-S59, the CXL memory 220 may output a second write response REP_WR2, which provides notification that the write operation is completed, through the second CXL memory interface circuit 221e (or the second port PT32). The CXL memory 220 may send the second write response REP_WR2 to the second CXL storage 210_2 through the third interface IF3. The second CXL storage 210_2 may receive the second write response REP_WR2 through the second CXL storage interface circuit 211_2g (or the second port PT22). The second CXL storage 210_2 may recognize that the write operation is completely performed on the CXL memory 220, in response to the second write response REP_WR2.

In an embodiment, the second write request REQ_WR2 may refer to a request for storing the map data MD2 present in the nonvolatile memory NVM2 of the second CXL storage 210_2 in the dedicated area of the CXL memory 220. That is, the second write request REQ_WR2 may include the map data MD2 and address information about the dedicated area. Through operation PUP-S57 and operation PUP-S59, the map data MD2 present in the second CXL storage 210_2 may be stored in the dedicated area of the CXL memory 220.

In operation PUP-S60, the first CXL storage 210_1 may output first acknowledge information ACK_md1 through the first CXL storage interface circuit 211_1a (or the first port PT11). The CXL switch SW_CXL may transfer the first acknowledge information ACK_md1 to the host 201, which may receive the first acknowledge information ACK_md1. In response to the first acknowledge information ACK_md1, the host 201 may recognize that the first CXL storage 210_1 completely stores the map data MD1 in the CXL memory 220.

In operation PUP-S61, the second CXL storage 210_2 may output second acknowledge information ACK_md2 through the first CXL storage interface circuit 211_2a (or the first port PT21). The CXL switch SW_CXL may transfer the second acknowledge information ACK_md2 to the host 201, which may receive the second acknowledge information ACK_md2. In response to the second acknowledge information ACK_md2, the host 201 may recognize that the second CXL storage 210_2 completely stores the map data MD2 in the CXL memory 220. Afterwards, the host 201, the first CXL storage 210_1, the second CXL storage 210_2, and the CXL memory 220 may perform a normal operation (e.g., a read operation or a write operation).

As described above, the CXL memory 220 may allocate at least a partial area of the CXL memory 220 for the dedicated area of the first and second CXL storages 210_1 and 210_2. In an embodiment, the CXL memory 220 may allocate a buffer capacity based on the priority determined in advance. The CXL memory 220 may set the priority for the first and second CXL storages 210_1 and 210_2. For example, the CXL memory 220 may assign a high priority to the first CXL storage 210_1 and may assign a middle priority to the second CXL storage 210_2.

The first memory allocation request REQ_mem_alc1 may include information about the first buffer capacity to be used by the first CXL storage 210_1. The second memory allocation request REQ_mem_alc2 may include information about the second buffer capacity to be used by the second CXL storage 210_2.

For example, because the first CXL storage 210_1 has the high priority, an area corresponding to the first buffer capacity information may be first allocated for a first dedicated area of the first CXL storage 210_1. Afterwards, the CXL memory 220 may allocate a portion of the remaining area of the CXL memory 220 other than the area allocated for the first dedicated area as much as the second buffer capacity, for the dedicated area of the second CXL storage 210_2.

When the capacity of the CXL memory 220 is greater than a sum of the first buffer capacity and the second buffer capacity, the CXL memory 220 may allocate an area corresponding to the buffer capacities required by the first CXL storage 210_1 and the second CXL storage 210_2, for the first and second dedicated areas. However, when the capacity of the CXL memory 220 is smaller than the sum of the first buffer capacity and the second buffer capacity, because the priority of the first CXL storage 210_1 is high, the CXL memory 220 may allocate an area corresponding to the first buffer capacity for the first dedicated area, and may allocate an area whose capacity is smaller than the second buffer capacity, for the second dedicated area.

Figure 5:
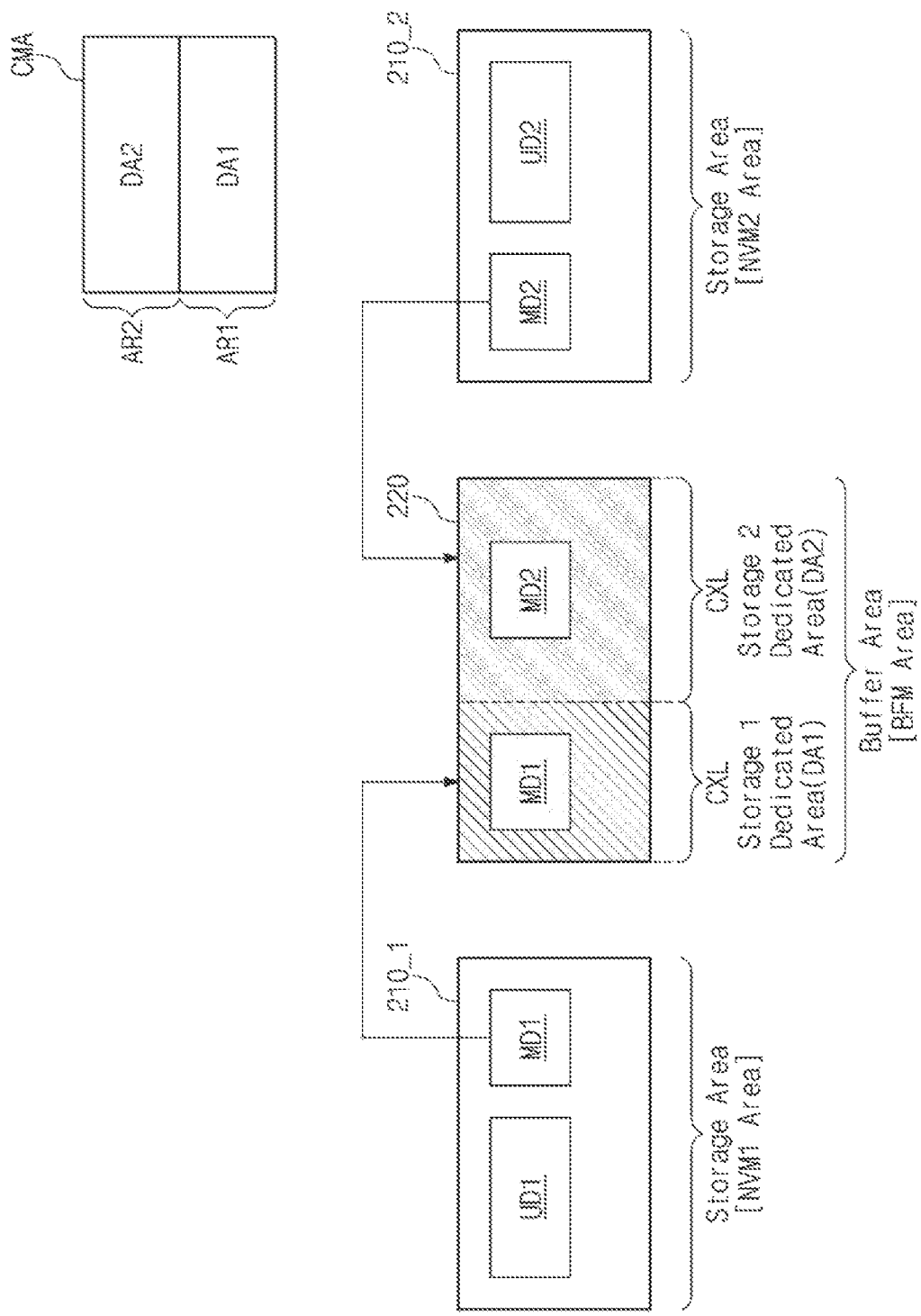
FIG. 5 is a diagram for describing an operation in which a computing system of FIG. 3B stores map data, according to some embodiments.

FIG. 5 is a diagram for describing an operation in which a computing system of FIG. 3B stores map data, according to some embodiments. For convenience of description and for brevity of drawing, components such as the host 201, the first CXL storage 210_1, the second CXL storage 210_2, and the CXL memory 220 are conceptually illustrated, and some unnecessary components are omitted.

Referring to FIGS. 3B to 5, the CXL memory 220 may allocate a least partial area of the CXL memory 220 for dedicated areas of the first CXL storage 210_1 and the second CXL storage 210_2. In this case, a first dedicated area DA1 of the CXL memory 120 may be accessed by the first CXL storage 210_1 and may be used to store the map data MD1 of the first CXL storage 210_1. A second dedicated area DA2 of the CXL memory 220 may be accessed by the second CXL storage 210_2 and may be used to store the map data MD2 of the second CXL storage 210_2.

For example, as illustrated in FIG. 5, the nonvolatile memory NVM1 of the first CXL storage 210_1 may store the user data UD1 and the map data MD1, and the nonvolatile memory NVM2 of the second CXL storage 210_2 may store the user data UD2 and the map data MD2. As described above, because the first and second CXL storages 210_1 and 210_2 do not include a separate buffer memory, the first and second CXL storage 210_1 and 210_2 require a buffer area where the map data MD1 and MD2 are to be stored. According to an embodiment of the present disclosure, the map data MD1 of the first CXL storage 210_1 may be stored in the first dedicated area DA1 of the CXL memory 220, and the map data MD2 of the second CXL storage 210_2 may be stored in the second dedicated area DA2 of the CXL memory 220. In this case, the first dedicated area DA1 of the CXL memory 220 may be accessed by the first CXL storage 210_1 through the second interface IF2. The second dedicated area DA2 of the CXL memory 220 may be accessed by the second CXL storage 210_2 through the third interface IF3.

In an embodiment, a CXL memory area CMA is illustrated as a storage space of the CXL memory 220. The first dedicated area DA1 may have the first buffer capacity, and the second dedicated area DA2 may have the second buffer capacity. The CXL memory 220 may assign a first address range AR1 corresponding to the first buffer capacity to the first dedicated area DA1 and may assign a second address range AR2 corresponding to the second buffer capacity to the second dedicated area DA2. The CXL memory 220 may assign the first address range AR1 to the first port PT31 and may assign the second address range AR2 to the second port PT32.

The CXL memory 220 may send the first memory allocation response REP_mem_alc1 including the first address range AR1 to the first CXL storage 210_1 and may send the second memory allocation response REP_mem_alc2 including the second address range AR2 to the second CXL storage 210_2 (see FIG. 4). The first CXL storage 210_1 may access the first dedicated area DA1 by using the first address range AR1 through the second interface IF2 based on the first memory allocation response REP_mem_alc1; the second CXL storage 210_2 may access the second dedicated area DA2 by using the second address range AR2 through the third interface IF3.

In an embodiment, at least a partial area of the CXL memory 220 may be an area that is accessible by the first and second CXL storages 210_1 and 210_2 or may be an area that is managed by the first and second CXL storages 210_1 and 210_2. The entire area of the CXL memory 220 may be an area that is incapable of being accessed by the host 201 or may be an area that is not managed by the host 201. In this case, the first and second CXL storages 210_1 and 210_2 may access the area of the CXL memory 220 through the second ports PT12 and PT22. The first CXL storage 210_1 may access the area of the CXL memory 220 through the second interface IF2, and the second CXL storage 210_2 may access the area of the CXL memory 220 through the third interface IF3.

Because the CXL memory 220 is directly connected with the first and second CXL storages 210_1 and 210_2 and the CXL memory 220 is not connected with the CXL switch SW_CXL, the host 201 may not access the area of the CXL memory 220 through the first interface IF1. That is, the first CXL storage 210_1 may access the CXL memory 220 through the second interface IF2, and the second CXL storage 210_2 may access the CXL memory 220 through the third interface IF3. In contrast, the host 201 is incapable of accessing the CXL memory 220.

As described above, at least a partial area of the CXL memory 220 may be allocated for the dedicated area of the first and second CXL storages 210_1 and 210_2. In this case, the first and second CXL storages 210_1 and 210_2 may perform the access to the area of the CXL memory 220, and the host 201 may not perform an access to the entire area of the CXL memory 220. In an embodiment, the access of the first CXL storage 210_1 to the CXL memory 220 may be performed through the second interface IF2, and the access of the second CXL storage 210_2 to the CXL memory 220 may be performed through the third interface IF3.

Figure 6:
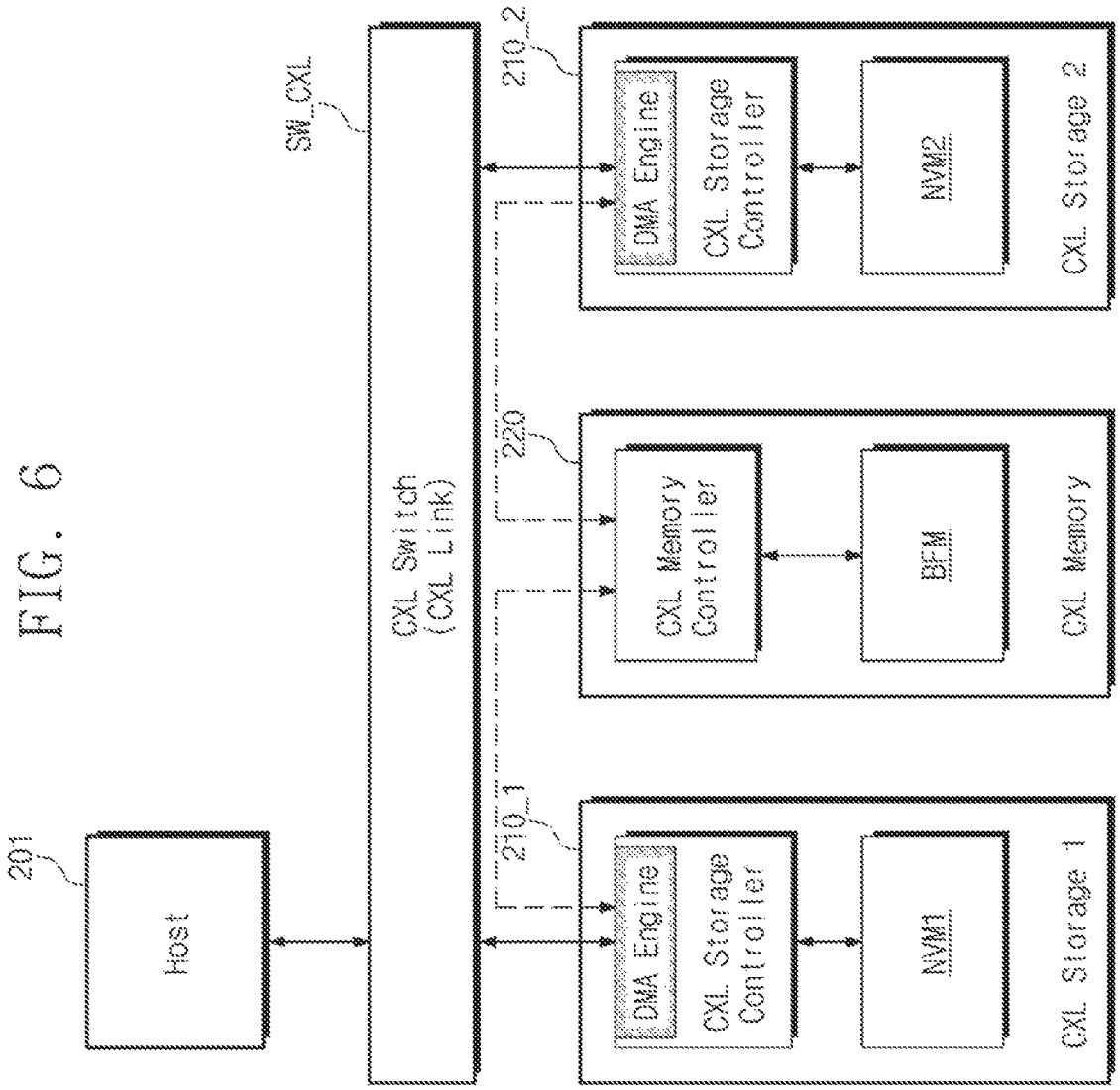
FIG. 6 is a diagram describing an operation in which map data are stored in a compute express link (CXL) memory, according to some embodiments.

FIG. 6 is a diagram describing an operation in which map data are stored in a CXL memory, according to some embodiments. In an embodiment, the map data MD1 and MD2 stored in the first and second CXL storages 210_1 and 210_2 may be transferred and stored to the CXL memory 220 from the first and second CXL storages 210_1 and 210_2 through various manners.

For example, the first CXL storage 210_1 and the CXL memory 220 may exchange the map data MD1 based on the peer-to-peer (P2P) manner, and the second CXL storage 210_2 and the CXL memory 220 may exchange the map data MD2 based on the peer-to-peer (P2P) manner. For example, as illustrated in FIG. 6, each of the CXL storage controllers 211_1 and 211_2 of the first and second CXL storages 210_1 and 210_2 may include a direct memory access (DMA) engine. The DMA engine included in each of the CXL storage controllers 211_1 and 211_2 may transfer the map data MD1 and MD2 present in the nonvolatile memories NVM1 and NVM2 to the CXL memory 220 without the interference or control of the host 201. That is, the map data MD1 and MD2 may be transferred from the first and second CXL storages 210_1 and 210_2 to the CXL memory 220 based on the P2P manner.

The above manner in which the map data are transferred from the plurality of CXL storages 210_1 and 210_2 to the CXL memory 220 is provided as an example, and the present disclosure is not limited thereto. It may be understood that the transfer of map data from the first CXL storage 210_1 to the CXL memory 220 is implemented in various manners using the second interface IF2 and the transfer of map data from the second CXL storage 210_2 to the CXL memory 220 is implemented in various manners using the third interface IF3. In an embodiment, the transfer (i.e., the backup or flush) of map data from the CXL memory 220 to the first and second CXL storages 210_1 and 210_2 may also be implemented in a manner similar to the above manner.

Figure 7:
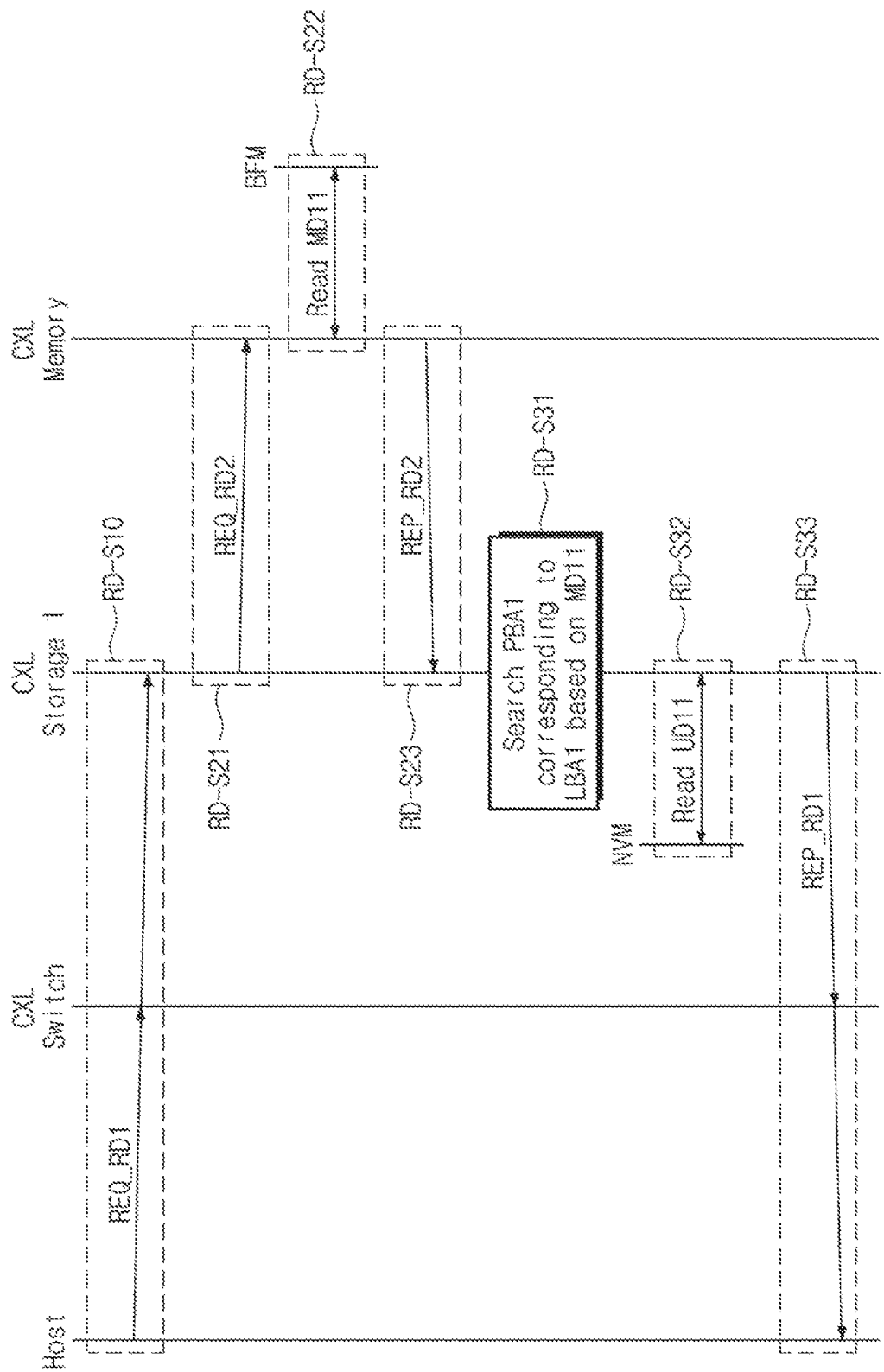
FIG. 7 is a flowchart illustrating a read operation for first CXL storage of FIG. 3A, according to some embodiments.

FIG. 7 is a flowchart illustrating a read operation for first CXL storage of FIG. 3A. In an embodiment, the read operation for the first CXL storage 210_1 according to the flowchart of FIG. 7 may be performed after the initialization operation of FIG. 4 is performed (i.e., after the map data MD1 of the first CXL storage 210_1 are stored in the area of the CXL memory 220). Below, for brevity of drawing and for convenience of description, components (e.g., the second CXL storage 210_2) that are unnecessary to describe the operation of the first CXL storage 210_1 are omitted.

Referring to FIGS. 3A, 3B, and 7, in operation RD-S10, the host 201 may output a first read request REQ_RD1 through the CXL host interface circuit 201a. The host 201 may send the first read request REQ_RD1 to the first CXL storage 210_1 through the first interface IF1. The CXL switch SW_CXL may transfer the first read request REQ_RD1 to the first CXL storage 210_1 targeted for the first read request REQ_RD1. In an embodiment, the first read request REQ_RD1 may refer to a request for reading first user data UD11 stored in the first CXL storage 210_1 and may include a first logical block address LBA1 corresponding to the first user data UD11. The first CXL storage 210_1 may receive the first read request REQ_RD1 through the first CXL storage interface circuit 211_1a (or the first port PT11).

In operation RD-S21, the first CXL storage 210_1 may output a second read request REQ_RD2 through the second CXL storage interface circuit 211_1g (or the second port PT12) in response to the first read request REQ_RD1. The first CXL storage 210_1 may send the second read request REQ_RD2 to the CXL memory 220 through the second interface IF2. In an embodiment, the second read request REQ_RD2 may refer to a request for reading first map data MD11 corresponding to the first logical block address LBA1. That is, the second read request REQ_RD2 may refer to a request for reading the first map data MD11 from the CXL memory 220. The second read request REQ_RD2 may include information about a memory address (e.g., a logical address or a virtual address) of the CXL memory 220, which indicates an area where the first map data MD11 are stored.

In operation RD-S22, the CXL memory 220 may read the first map data MD11 in response to the second read request REQ_RD2. For example, the CXL memory controller 221 of the CXL memory 220 may read the first map data MD11 from the area corresponding to the memory address (e.g., a logical address or a virtual address) included in the second read request REQ_RD2. In an embodiment, the CXL memory controller 221 may read the first map data MD11 from the buffer memory BFM by using the buffer memory interface circuit 221d.

In an embodiment, the first map data MD11 read in operation RD-S22 may be a portion of the entire map data MD and may be map data corresponding to the first logical block address LBA1. That is, the first map data MD11 may include information about a first physical block address PBA1 corresponding to the first logical block address LBA1.

In operation RD-S23, the CXL memory 220 may output a second read response REP_RD2 including the first map data MD11 through the first CXL memory interface circuit 221a (or the first port PT31). The CXL memory 220 may send the second read response REP_RD2 to the first CXL storage 210_1 through the second interface IF2.

In an embodiment, when the first map data MD11 corresponding to the first logical block address LBA1 is already present in the RAM 211_1c of the CXL storage controller 211_1, operation RD-S21 to operation RD-S23 (i.e., operations for loading the first map data MD11 from the CXL memory 220) may be omitted.

In operation RD-S31, the first CXL storage 210_1 may search for the first physical block address PBA1 corresponding to the first logical block address LBA1 based on the first map data MD11. For example, the FTL 211_1d of the CXL storage controller 211_1 may search for the first physical block address PBA1 corresponding to the first logical block address LBA1 based on the first map data MD11.

In operation RD-S32, the first CXL storage 210_1 may read the first user data UD11 present in an area of the nonvolatile memory NVM1, which corresponds to the first physical block address PBA1. For example, the CXL storage controller 211_1 may read the first user data UD11 from the area of the nonvolatile memory NVM1, which corresponds to the first physical block address PBA1. In an embodiment, the CXL storage controller 211_1 may read the first user data UD11 from the nonvolatile memory NVM1 by using the NAND interface circuit 211_1f.

In operation RD-S33, the first CXL storage 210_1 may output a first read response REP_RD1 to the first read request REQ_RD1 through the first CXL storage interface circuit 211_1a (or the first port PT11). The first CXL storage 210_1 may send the first read response REP_RD1 to the host 201 through the first interface IF1. The CXL switch SW_CXL may transfer the first read response REP_RD1 to the host 201. In an embodiment, the first read response REP_RD1 may include the first user data UD11 requested through the first read request REQ_RD1. The host 201 may obtain the first user data UD11 through the first read response REP_RD1.

In an embodiment, operation RD-S10 and operation RD-S33, that is, the communications between the host 201 and the first CXL storage 210_1 may be performed based on the CXL.io, and operation RD-S21 and operation RD-S23, that is, the communications between the first CXL storage 210_1 and the CXL memory 220 may be performed based on the CXL.mem. However, the present disclosure is not limited thereto. For example, the communications between the first CXL storage 210_1 and the CXL memory 220 and the communications between the host 201 and the first CXL storage 210_1 may be performed independently of each other. That is, the communications between the host 201, the first CXL storage 210_1, and the CXL memory 220 may not be performed through the common interface (or a common link or a common switch).

The above embodiments are described based on the first CXL storage 210_1, but the present disclosure is not limited thereto. For example, the second CXL storage 210_2 may perform the read operation in a manner that is identical or similar to the manner described with reference to FIG. 7 and a repeated description thereof is omitted for conciseness.

Figure 8:
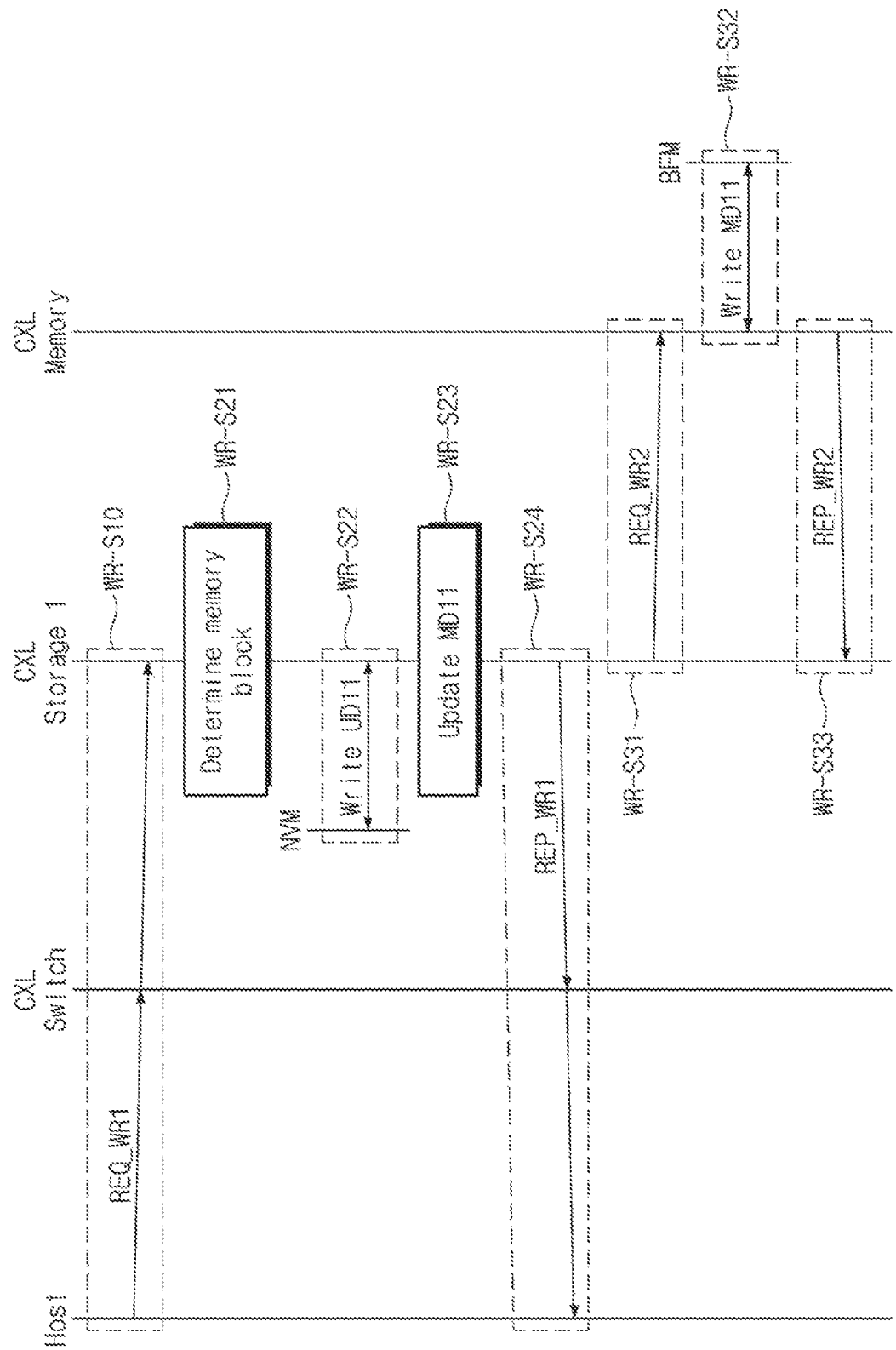
FIG. 8 is a flowchart illustrating a write operation for first CXL storage of FIG. 3A, according to some embodiments.

FIG. 8 is a flowchart illustrating a write operation for first CXL storage of FIG. 3A, according to some embodiments. In an embodiment, the write operation for the first CXL storage 210_1 according to the flowchart of FIG. 8 may be performed after the initialization operation of FIG. 4 is performed (i.e., after the map data MD1 of the first CXL storage 210_1 are stored in the dedicated area of the CXL memory 220). Below, for brevity of drawing and for convenience of description, components (e.g., the second CXL storage 210_2) that are unnecessary to describe the operation of the first CXL storage 210_1 are omitted.

Referring to FIGS. 3A, 3B, and 8, in operation WR-S10, the host 201 may output a first write request REQ_WR1 through the CXL host interface circuit 201a. The host 201 may send the first write request REQ_WR1 to the first CXL storage 210_1 through the first interface IF1. The CXL switch SW_CXL may transfer the first write request REQ_WR1 to the first CXL storage 210_1. The first CXL storage 210_1 may receive the first write request REQ_WR1 through the first CXL storage interface circuit 211_1a (or the first port PT11). In an embodiment, the first write request REQ_WR1 may refer to a request for storing the first user data UD11 in the first CXL storage 210_1.

In operation WR-S21, the first CXL storage 210_1 may determine a memory block in which the first user data UD11 are to be written, in response to the first write request REQ_WR1. For example, the FTL 211_1d of the CXL storage controller 211_1 may manage block information about a memory block, which is free, capable of being written, or capable of being allocated, from among memory blocks included in the nonvolatile memory NVM1. The FTL 211_1d may select a memory block, in which the first user data UD11 are to be written, based on the block information.

In operation WR-S22, the first CXL storage 210_1 may write the first user data UD11 in the selected memory block. For example, the CXL storage controller 211_1 may control the nonvolatile memory NVM1 such that the first user data UD11 are written in the selected memory block. In an embodiment, the CXL storage controller 211_1 may write the first user data UD11 in the nonvolatile memory NVM1 by using the NAND interface circuit 211_1f.

When the first user data UD11 are completely written in the nonvolatile memory NVM1 (i.e., when a program operation for the nonvolatile memory NVM1 is passed), in operation WR-S23, the first CXL storage 210_1 may update the first map data MD11 or may generate the first map data MD11. For example, the first map data MD11 may include information indicating that the first user data UD11 corresponding to the first logical block address LBA1 are stored in an area of the nonvolatile memory NVM1, which corresponds to the first physical block address PBA1. That is, the first CXL storage 210_1 may generate the first map data MD11 indicating that the first user data UD11 corresponding to the first logical block address LBA1 are stored in the area corresponding to the first physical block address PBA1.

In operation WR-S24, the first CXL storage 210_1 may output a first write response REP_WR1 corresponding to the first write request REQ_WR1 through the first CXL storage interface circuit 211_1a (or the first port PT11). The first CXL storage 210_1 may send the first write response REP_WR1 to the host 201 through the first interface IF1. The CXL switch SW_CXL may transfer the first write response REP_WR1 to the host 201. In response to the first write response REP_WR1, the host 201 may determine that the first user data UD11 corresponding to the first write request REQ_WR1 are normally stored in the first CXL storage 210_1.

After the write operation for the first CXL storage 210_1 requested by the host 201 is completed, the first CXL storage 210_1 may perform a map data update operation. For example, in operation WR-S31, the first CXL storage 210_1 may output a second write request REQ_WR2 through the second CXL storage interface circuit 211_1g (or the second port PT12). The first CXL storage 210_1 may transfer the second write request REQ_WR2 to the CXL memory 220 through the second interface IF2.

In an embodiment, the second write request REQ_WR2 may refer to a request for writing the first map data MD11, which are updated or generated as the first user data UD11 are stored, in the CXL memory 220. The second write request REQ_WR2 may include a memory address at which the first map data MD11 are to be stored. The memory address included in the second write request REQ_WR2 may indicate the area of the CXL memory 220, which is dedicated for the first CXL storage 210_1.

In operation WR-S32, the CXL memory 220 may store the first map data MD11 in the corresponding area in response to the second write request REQ_WR2. For example, the CXL memory 220 may write the first map data MD11 in the area corresponding to the memory address included in the second write request REQ_WR2.

In operation WR-S33, the CXL memory 220 may output a second write response REP_WR2 to the second write request REQ_WR2 through the CXL memory interface circuit 221a (or the first port PT31). The CXL memory 220 may send the second write response REP_WR2 to the first CXL storage 210_1 through the second interface IF2. The first CXL storage 210_1 may receive the second write response REP_WR2 through the second CXL storage interface circuit 211_1g (or the second port PT12).

In an embodiment, operation WR-S31 to operation WR-S33 (i.e., an operation of storing map data in the CXL memory 220 or an operation of updating map data) may be performed whenever the write operation for the first CXL storage 210_1 is completed. In some embodiments, operation WR-S31 to operation WR-S33 may be performed when the size of map data updated or newly generated reaches a given value. In some embodiments, operation WR-S31 to operation WR-S33 may be performed periodically. However, the present disclosure is not limited thereto. For example, map data that are generated or updated during the operation of the first CXL storage 210_1 may be stored in the CXL memory 220 depending on various operation policies.

The above embodiments are described based on the first CXL storage 210_1, but the present disclosure is not limited thereto. For example, the second CXL storage 210_2 may perform the write operation in a manner that is identical or similar to the manner described with reference to FIG. 8.

Figure 9A:
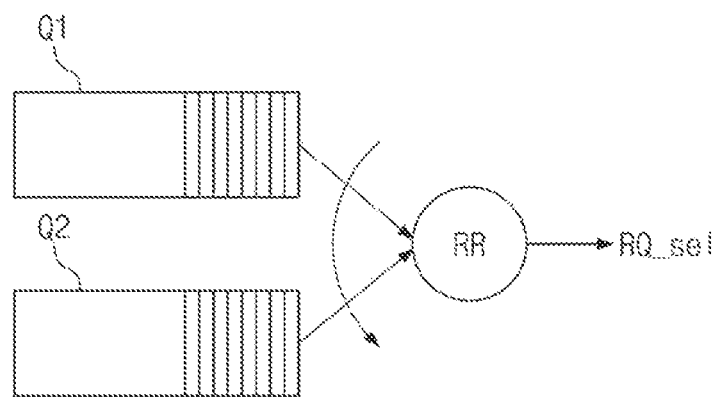
FIGS. 9A to 9C are diagrams for describing a request processing order of a CXL memory of FIG. 3A, according to some embodiments.
Figure 9B:
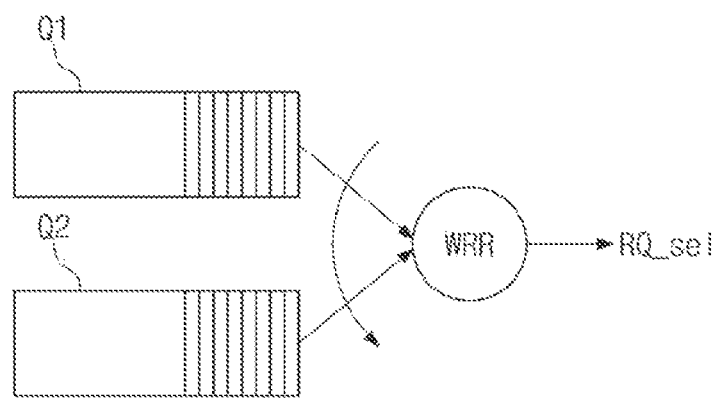
Figure 9C:
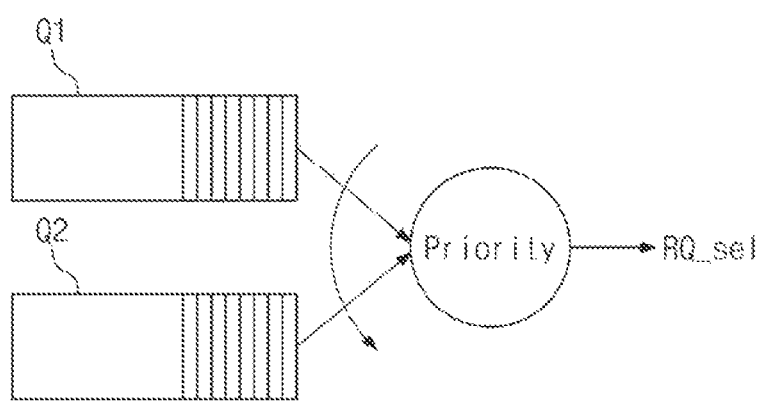

FIGS. 9A to 9C are diagrams for describing a request processing order of a CXL memory of FIG. 3A, according to some embodiments. Referring to FIGS. 3A and 9A, the CXL memory 220 may manage a first queue Q1 and a second queue Q2. For example, the first queue Q1 and the second queue Q2 may be stored in the buffer memory BFM. The first queue Q1 may store requests of the first CXL storage 210_1. The second queue Q2 may store requests of the second CXL storage 210_2.

The CXL memory controller 221 may select one of requests included in the plurality of queues Q1 and Q2 based on a round robin (RR) manner and may process a selected request RQ_sel.

Referring to FIG. 9B, the CXL memory 220 may manage the first queue Q1 and the second queue Q2. The CXL memory controller 221 may select one of requests included in the plurality of queues Q1 and Q2 based on a weighted round robin (WRR) manner and may process the selected request RQ_sel. In an embodiment, each of the plurality of queues Q1 and Q2 may be a weight. The weight may include an urgent weight, a high weight, a medium weight, and a low weight. For example, the first queue Q1 may be set to have the low weight, and the second queue Q2 may be set to have the medium weight. The weights of the plurality of queues Q1 and Q2 may be determined in advance. In some embodiments, the weights of the plurality of queues Q1 and Q2 may be determined by the CXL memory 220 or may be managed by the CXL memory 220 (e.g., values of the weights may be changed by the CXL memory 220 during an operation).

Referring to FIG. 9C, the CXL memory 220 may manage the first queue Q1 and the second queue Q2. The CXL memory controller 221 may select one of requests included in the plurality of queues Q1 and Q2 based on a priority manner and may process the selected request RQ_sel. For example, the CXL memory controller 221 may first process requests included in the second queue Q2 prior to requests included in the first queue Q1.

Figure 10:
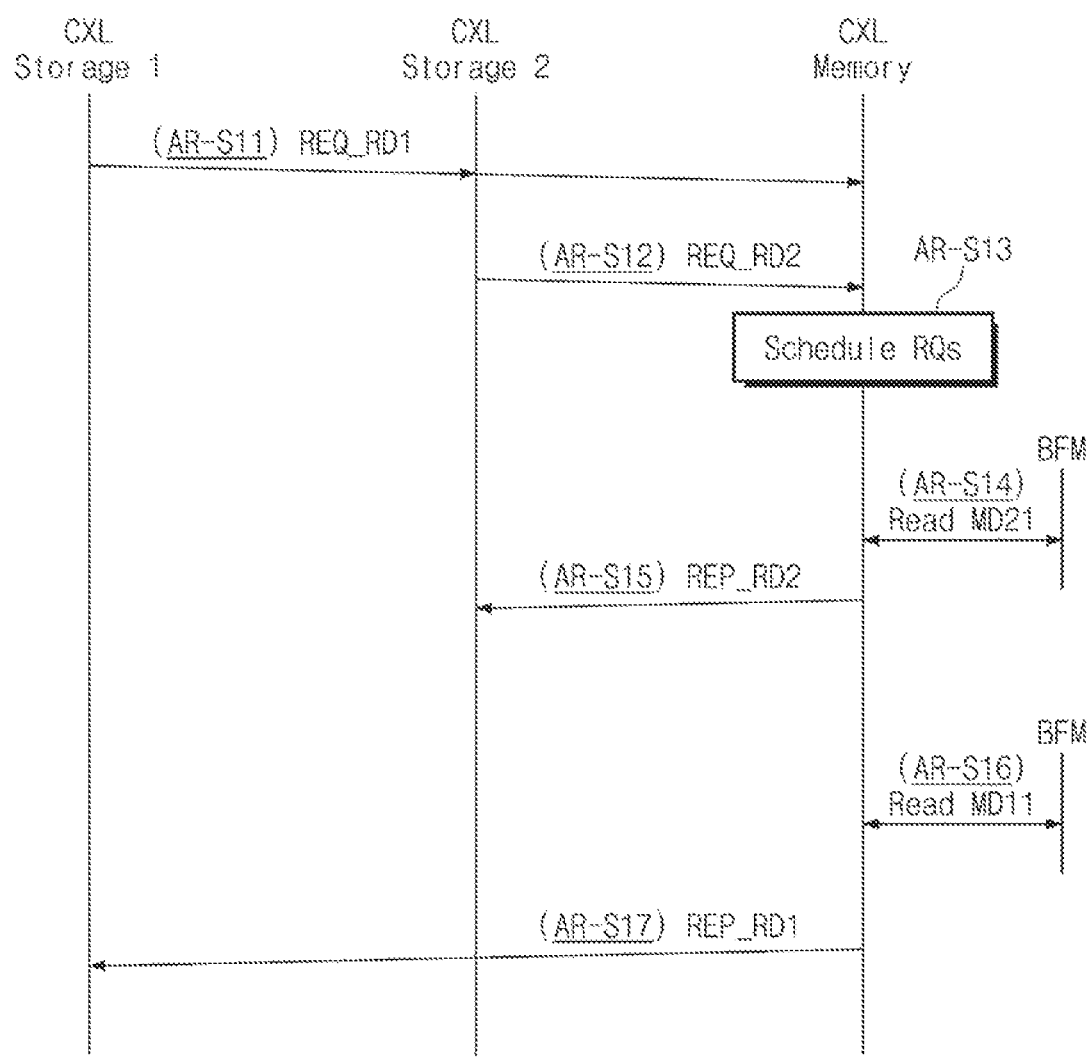
FIG. 10 is a diagram for describing a request processing order of a CXL memory of FIG. 3A, according to some embodiments.

FIG. 10 is a diagram for describing a request processing order of a CXL memory of FIG. 3A, according to some embodiments. The description will be given with reference to FIGS. 3A, 9C, and 10 under the assumption that the CXL memory 220 selects one of requests included in the plurality of queues Q1 and Q2 based on the priority manner and processes the selected request RQ_sel, and that the second queue Q2 has the high priority and the first queue Q1 has the medium priority. That is, the CXL memory controller 221 may first process the requests received from the second CXL storage 210_2 prior to the requests received from the first CXL storage 210_1.

In operation AR-S11, the first CXL storage 210_1 may output the first read request REQ_RD1. The first CXL storage 210_1 may send the first read request REQ_RD1 to the CXL memory 220 through the second interface IF2. In an embodiment, the first read request REQ_RD1 may refer to a request for reading the first map data MD11 corresponding to the first logical block address LBA1.

In operation AR-S12, the second CXL storage 210_2 may output the second read request REQ_RD2. The second CXL storage 210_2 may send the second read request REQ_RD2 to the CXL memory 220 through the third interface IF3. In an embodiment, the second read request REQ_RD2 may refer to a request for reading second map data MD21 corresponding to a second logical block address LBA2.

In operation AR-S13, the CXL memory 220 may schedule the requests based on the priority. For example, because the first queue Q1 has the medium priority and the second queue Q2 has the high priority, the CXL memory controller 221 may perform scheduling such that the second read request REQ_RD2 is processed prior to the first read request REQ_RD1.

In operation AR-S14, the CXL memory 220 may read the second map data MD21 in response to the second read request REQ_RD2. For example, the CXL memory 220 may process the requests based on a scheduling result. Even in the case where the second read request REQ_RD2 is received after the first read request REQ_RD1 is received, because the second queue Q2 has the high priority, the CXL memory 220 may first process the second read request REQ_RD2.

In operation AR-S15, the CXL memory 220 may output the second read response REP_RD2 including the second map data MD21 through the second CXL memory interface circuit 221e (or the second port PT32). The CXL memory 220 may send the second read response REP_RD2 to the second CXL storage 210_2 through the third interface IF3. The second CXL storage 210_2 may receive the second read response REP_RD2 through the second CXL storage interface circuit 211_2g (or the second port PT22).

In operation AR-S16, the CXL memory 220 may read the first map data MD11 in response to the first read request REQ_RD1. In operation AR-S17, the CXL memory 220 may output the first read response REP_RD1 including the first map data MD11 through the first CXL memory interface circuit 221a (or the first port PT31). The CXL memory 220 may send the first read response REP_RD1 to the first CXL storage 210_1 through the second interface IF2. The first CXL storage 210_1 may receive the first read response REP_RD1 through the second CXL storage interface circuit 211_1g (or the second port PT12).

The above embodiments are described based on the read request input to the CXL memory 220, but the present disclosure is not limited thereto. For example, the CXL memory 220 may process the write request based on the priority manner and thus a repeated description thereof is omitted for conciseness.

Figure 11:
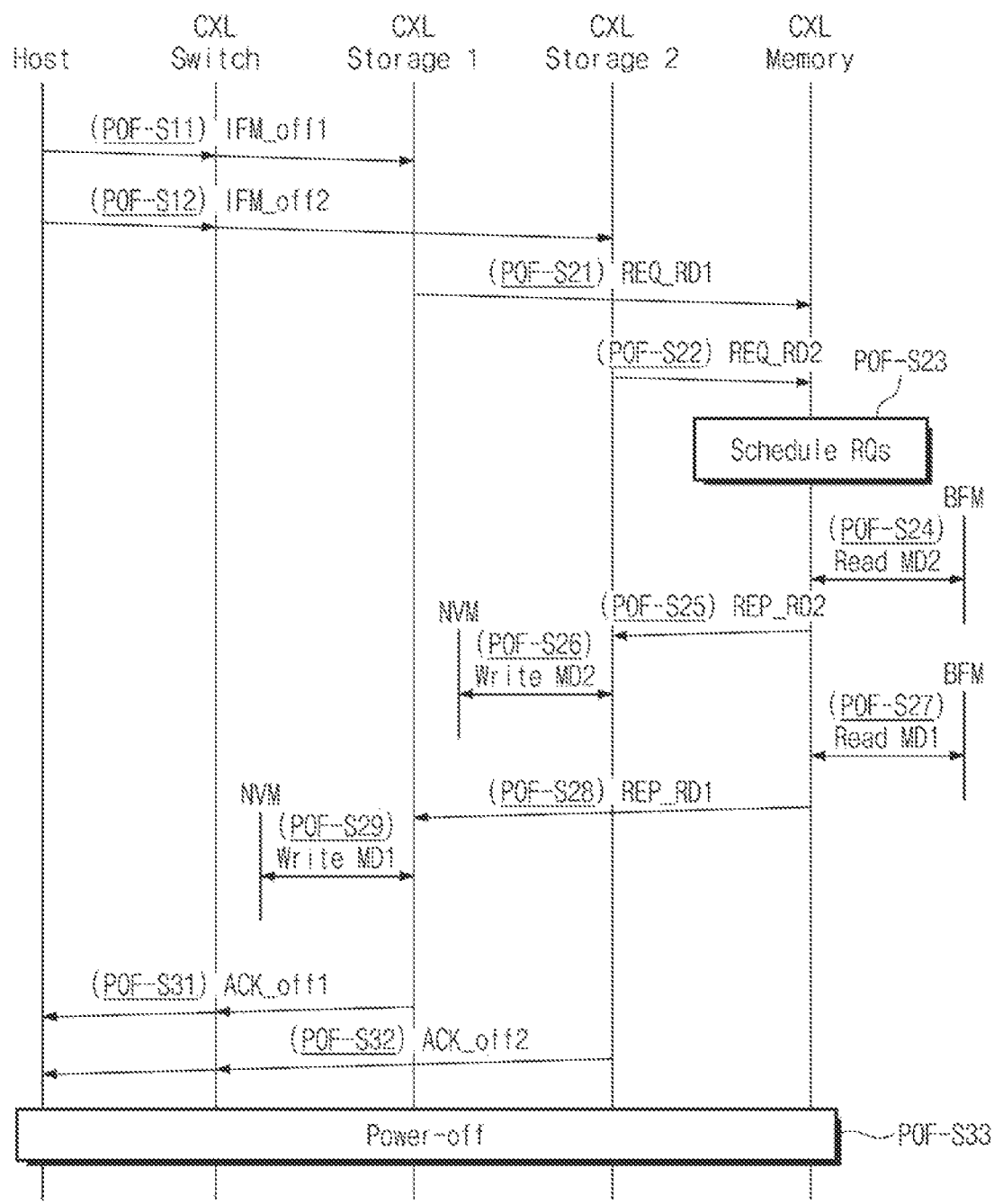
FIG. 11 is a flowchart illustrating a power-off operation of a computing system of FIG. 3A, according to some embodiments.

FIG. 11 is a flowchart illustrating a power-off operation of a computing system of FIG. 3A, according to some embodiments. In an embodiment, a power-off operation of a computing system will be described with reference to FIG. 11, but the present disclosure is not limited thereto. For example, it may be understood that the operating method of FIG. 11 is applicable to the power-off operation or reset operation of each of various components (e.g., a host, first and second CXL storages, a CXL memory, and a CXL switch) included in the computing system. With regard to the order where requests are processed in the power-off operation, it is assumed that the second CXL storage 210_2 has the high priority and the first CXL storage 210_1 has the medium priority.

Referring to FIGS. 3A and 11, in operation POF-S11, the host 201 may output first power-off information IFM_off1 through the CXL host interface 201a. The host 201 may send the first power-off information IFM_off1 to the first CXL storage 210_1 through the first interface IF1. The CXL switch SW_CXL may transfer the first power-off information IFM_off1 to the first CXL storage 210_1. For example, the host 201 may recognize or detect information about power-off of the computing system 200. The first CXL storage 210_1 may receive the first power-off information IFM_off1, which allows the first CXL storage 210_1 to perform the power-off operation, through the first CXL storage interface circuit 211_1a (or the first port PT11).

In operation POF-S12, the host 201 may output second power-off information IFM_off2 through the CXL host interface 201a. The host 201 may send the second power-off information IFM_off2 to the second CXL storage 210_2 through the first interface IF1. The CXL switch SW_CXL may transfer the second power-off information IFM_off2 to the second CXL storage 210_2. The second CXL storage 210_2 may receive the second power-off information IFM_off2, which allows the second CXL storage 210_2 to perform the power-off operation, through the first CXL storage interface circuit 211_2a (or the first port PT21).

In operation POF-S21, the first CXL storage 210_1 may output the first read request REQ_RD1 through the second CXL storage interface circuit 211_1g (or the second port PT12) in response to the first power-off information IFM_off1. The first CXL storage 210_1 may send the first read request REQ_RD1 to the CXL memory 220 through the second interface IF2. In an embodiment, the first read request REQ_RD1 in operation POF-S21 may refer to a request for reading the entire map data MD1 stored in the CXL memory 220. The first read request REQ_RD1 may include a memory address of an area where the first map data MD1 are stored.

In operation POF-S22, the second CXL storage 210_2 may output the second read request REQ_RD2 through the second CXL storage interface circuit 211_2g (or the second port PT22) in response to the second power-off information IFM_off2. The second CXL storage 210_2 may send the second read request REQ_RD2 to the CXL memory 220 through the third interface IF3. In an embodiment, the second read request REQ_RD2 in operation POF-S22 may refer to a request for reading the entire map data MD2 stored in the CXL memory 220. The second read request REQ_RD2 may include a memory address of an area where the second map data MD2 are stored.

In operation POF-S23, the CXL memory 220 may schedule the requests based on the priority. For example, because the first CXL storage 210_1 has the medium priority and the second CXL storage 210_2 has the high priority, the CXL memory controller 221 may perform scheduling such that the second read request REQ_RD2 is processed prior to the first read request REQ_RD1.

In an embodiment, in the case where the priority associated with the read request of the power-off operation is not determined in advance, the CXL memory 220 may determine the priority associated with the read request of the power-off operation. The CXL memory 220 may schedule read requests based on the determined priority.

In operation POF-S24, the CXL memory 220 may read the map data MD2 in response to the second read request REQ_RD2. For example, the CXL memory 220 may process the second read request REQ_RD2 prior to the first read request REQ_RD1 based on a scheduling result. The CXL memory 220 may read the map data MD2 from the buffer memory BFM based on the memory address included in the second read request REQ_RD2.

In operation POF-S25, the CXL memory 220 may output the second read response REP_RD2 to the second read request REQ_RD2 through the second CXL memory interface circuit 221e (or the second port PT32). The CXL memory 220 may send the second read response REP_RD2 to the second CXL storage 210_2 through the third interface IF3. The second CXL storage 210_2 may receive the second read response REP_RD2 through the second CXL storage interface circuit 211_2g (or the second port PT22).

In operation POF-S26, the second CXL storage 210_2 may write the map data MD2 included in the second read response REP_RD2 in the nonvolatile memory NVM2. In an embodiment, the second CXL storage 210_2 may store the map data MD2 in a given area of the nonvolatile memory NVM2.

In operation POF-S27, the CXL memory 220 may read the map data MD1 in response to the first read request REQ_RD1. For example, the CXL memory 220 may read the map data MD1 from the buffer memory BFM based on the memory address included in the first read request REQ_RD1.

In operation POF-S28, the CXL memory 220 may output the first read response REP_RD1 to the first read request REQ_RD1 through the first CXL memory interface circuit 221a (or the first port PT31). The CXL memory 220 may send the first read response REP_RD1 to the first CXL storage 210_1 through the second interface IF2. The first CXL storage 210_1 may receive the first read response REP_RD1 through the second CXL storage interface circuit 211_1g (or the second port PT12).

In operation POF-S29, the first CXL storage 210_1 may write the map data MD1 included in the first read response REP_RD1 in the nonvolatile memory NVM1. In an embodiment, the first CXL storage 210_1 may store the map data MD1 in a given area of the nonvolatile memory NVM1.

After the entire map data MD1 of the first CXL storage 210_1 are stored in the nonvolatile memory NVM1, in operation POF-S31, the first CXL storage 210_1 may output a first response ACK_off1 to the first power-off information IFM_off1 through the first CXL storage interface circuit 211_1a (or the first port PT11). The first CXL storage 210_1 may send the first response ACK_off1 to the host 201 through the first interface IF1. The CXL switch SW_CXL may transfer the first response ACK_off1 to the host 201. The host 201 may recognize that the map data MD1 present in the CXL memory 220 are normally stored in the first CXL storage 210_1, based on the first response ACK_off1.

After the entire map data MD2 of the second CXL storage 210_2 are stored in the nonvolatile memory NVM2, in operation POF-S32, the second CXL storage 210_2 may output a second response ACK_off2 to the second power-off information IFM_off2 through the first CXL storage interface circuit 211_2a (or the first port PT21). The second CXL storage 210_2 may send the second response ACK_off2 to the host 201 through the first interface IF1. The CXL switch SW_CXL may transfer the second response ACK_off2 to the host 201. The host 201 may recognize that the map data MD2 present in the CXL memory 220 are normally stored in the second CXL storage 210_2, based on the second response ACK_off2.

Afterwards, in operation POF-S33, the host 201, the first CXL storage 210_1, the second CXL storage 210_2, and the CXL memory 220 may be powered off. For example, the host 201 may block the power that is supplied to the first CXL storage 210_1, the second CXL storage 210_2, and the CXL memory 220.

As described above, before the power-off operation, the computing system 200 may store (or back up) the map data MD1 and MD2 present in the CXL memory 220 in the nonvolatile memories NVM1 and NVM2. The CXL memory 220 may process the read request of the power-off operation based on the priority determined in advance.

For brevity of drawing and for convenience of description, an example in which operation POF-S11 is performed prior to operation POF-S12, operation POF-S21 is performed prior to operation POF-S22, and operation POF-S31 is performed prior to operation POF-S32 is illustrated, but the present disclosure is not limited thereto. For example, operation POF-S11 and operation POF-S12 may be simultaneously performed, operation POF-S21 and operation POF-S22 may be simultaneously performed, and operation POF-S31 and operation POF-S32 may be simultaneously performed. In addition, the order of performing operations may be changed.

The power-off operation described with reference to FIG. 11 is provided as an example, and the present disclosure is not limited thereto. For example, in the embodiment of FIG. 11, after the first CXL storage 210_1 stores the map data MD1 present in the CXL memory 220 in the nonvolatile memory NVM1, the first CXL storage 210_1 may provide notification that the map data MD1 are completely backed up, by sending the first response ACK_off1 to the host 201. In some embodiments, the first CXL storage 210_1 may store the map data MD1 present in the CXL memory 220 in the nonvolatile memory NVM1 and may then set a value of a specific register to a given value. The host 201 may determine whether the map data MD1 are completely backed up, by periodically checking the value of the specific register of the first CXL storage 210_1 (i.e., a polling manner). In some embodiments, the first CXL storage 210_1 may be configured to complete the backup operation for the map data MD1 within a given time from a point in time when the power-off information IFM_off1 is received from the host 201 (i.e., a time-out manner). As described above, the first CXL storage 210_1 may transfer information, which indicates that the map data MD1 are completely backed up, to the host 201 through at least one of the above manners. Also, to be identical or similar to the above description, the second CXL storage 210_2 may transfer information about backup completion of the map data MD2 to the host 201 through at least one of various manners.

The above embodiments are described based on the power-off operation for the plurality of CXL storages 210_1 and 210_2, but the present disclosure is not limited thereto. For example, the host 201 may send reset information for performing the reset operation only to the first CXL storage 210_1 of the plurality of CXL storages 210_1 and 210_2. In this case, the first CXL storage 210_1 may send the read request for reading the entire map data MD1 present in the CXL memory 220 to the CXL memory 220 in response to the reset information. The CXL memory 220 may send the read response including the map data MD1 to the first CXL storage 210_1 in response to the read request. The first CXL storage 210_1 may store the map data MD1 included in the read response in the nonvolatile memory NVM1 and may then send a reset response to the host 201. Afterwards, the first CXL storage 210_1 may perform the reset operation.

In an embodiment, the power-off operation may be changed depending on an operation manner of the plurality of CXL storages 210_1 and 210_2. For example, in the write operation of the plurality of CXL storages 210_1 and 210_2, the plurality of CXL storages 210_1 and 210_2 may perform the program operation on the nonvolatile memories NVM1 and NVM2 and may update the map data MD1 and MD2.

In an embodiment, the operation of updating the map data MD1 and MD2 may be performed only on the CXL memory 220. In this case, the map data MD1 and MD2 present in the CXL memory 220 may be up-to-date information, and the map data MD1 and MD2 present in the nonvolatile memories NVM1 and NVM2 may not be up-to-date information. That is, when the operation of updating the map data MD1 and MD2 is performed only on the CXL memory 220, up-to-date information about the map data MD1 and MD2 is maintained only in the CXL memory 220; for this reason, when the plurality of CXL storages 210_1 and 210_2, the CXL memory 220, or the computing system 200 is powered off, an operation of flushing, backing up, or dumping the map data MD1 and MD2 from the CXL memory 220 is required. In an embodiment, the map data update operation may be first performed with respect to the map data MD1 and MD2 stored in the nonvolatile memories NVM1 and NVM2 and may then be performed with respect to the map data MD1 and MD2 stored in the CXL memory 220 through the background operation. In this case, because the map data MD1 and MD2 stored in the nonvolatile memories NVM1 and NVM2 are guaranteed to be up-to-date information, the operation of flushing, dumping, or backing up the map data MD1 and MD2 from the CXL memory 220 may be unnecessary when the plurality of CXL storages 210_1 and 210_2, the CXL memory 220, or the computing system 200 is powered off.

In an embodiment, the map data update operation may be first performed with respect to the map data MD1 and MD2 present in the CXL memory 220 and may then be performed with respect to the map data MD1 and MD2 present in the nonvolatile memories NVM1 and NVM2 through the background operation. In this case, the map data MD1 and MD2 present in the CXL memory 220 may be up-to-date information, and the map data MD1 and MD2 present in the nonvolatile memories NVM1 and NVM2 may not be up-to-date information. As such, when the plurality of CXL storages 210_1 and 210_2, the CXL memory 220, or the computing system 200 is powered off, at least a portion of the map data MD1 and MD2 of the CXL memory 220 has to be backed up to the nonvolatile memories NVM1 and NVM2 of the plurality of CXL storages 210_1 and 210_2. In an embodiment, at least a portion of the map data MD1 and MD2 to be backed up to the nonvolatile memories NVM1 and NVM2 may be the up-to-date map data MD1 and MD2 that are not stored in the nonvolatile memories NVM1 and NVM2. In an embodiment, the plurality of CXL storages 210_1 and 210_2 may manage or store flag information or table information indicating that the map data MD1 and MD2 stored in the nonvolatile memories NVM1 and NVM2 are up-to-date information.

As described above, when the plurality of CXL storages 210_1 and 210_2, the CXL memory 220, or the computing system 200 is powered off, depending on a way to manage the map data MD1 and MD2 (i.e., depending on a place where up-to-date information is managed), the map data MD1 and MD2 may be selectively flushed, backed up, or dumped to the plurality of CXL storages 210_1 and 210_2 from the CXL memory 220.

Figure 12A:
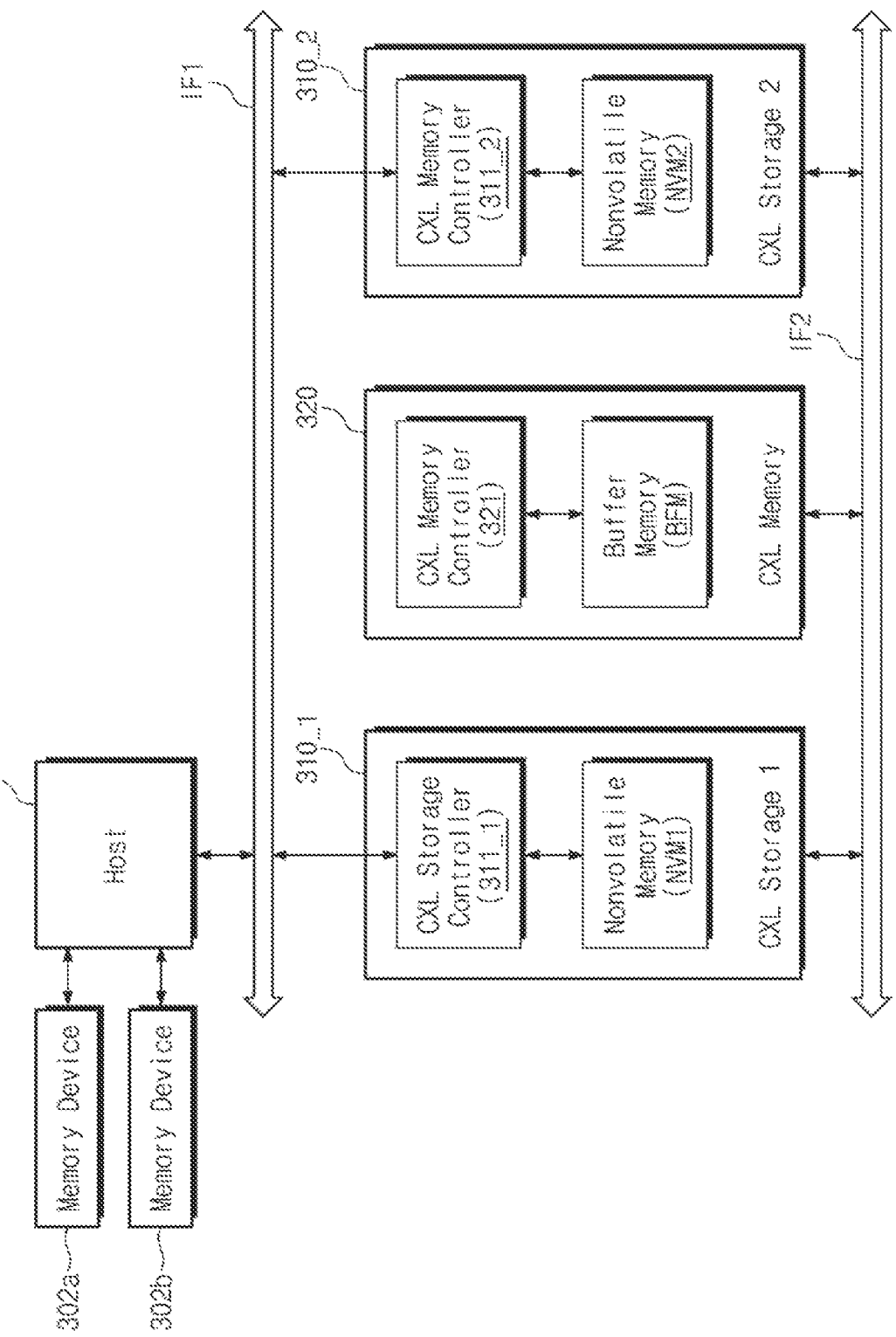
FIG. 12A is a block diagram illustrating a computing system to which a storage system according to some embodiments is applied.

FIG. 12A is a block diagram illustrating a computing system to which a storage system according to some embodiments is applied. Referring to FIG. 12A, a computing system 300 may include a host 301, a plurality of memory devices 302a and 302b, a first CXL storage 310_1, a second CXL storage 310_2, and a CXL memory 320. The host 301, the plurality of memory devices 302a and 302b, the first CXL storage 310_1, the second CXL storage 310_2, and the CXL memory 320 illustrated in FIG. 12A are similar or identical to the host 201, the plurality of memory devices 202a and 202b, the first CXL storage 210_1, the second CXL storage 210_2, and the CXL memory 220 illustrated in FIG. 3A, and thus, repeated description will be omitted to avoid redundancy.

The first CXL storage 310_1 may include a CXL storage controller 311_1 and the nonvolatile memory NVM1. The CXL storage controller 311_1 and the nonvolatile memory NVM1 illustrated in FIG. 12A are similar or identical to the CXL storage controller 211_1 and the nonvolatile memory NVM1 illustrated in FIG. 3A, and thus, repeated description will be omitted to avoid redundancy.

The second CXL storage 310_2 may include a CXL storage controller 311_2 and the nonvolatile memory NVM2. The CXL storage controller 311_2 and the nonvolatile memory NVM2 illustrated in FIG. 12A are similar or identical to the CXL storage controller 211_2 and the nonvolatile memory NVM2 illustrated in FIG. 3A, and thus, repeated description will be omitted to avoid redundancy.

The CXL memory 320 may include a CXL memory controller 321 and the buffer memory BFM. The CXL memory controller 321 and the buffer memory BFM illustrated in FIG. 12A are similar or identical with the CXL memory controller 221 and the buffer memory BFM illustrated in FIG. 3A, and thus, repeated description will be omitted to avoid redundancy.

In an embodiment, all of the host 301, the first CXL storage 310_1, the second CXL storage 310_2, and the CXL memory 320 may be configured not to share the same interface. The host 301, the first CXL storage 310_1, and the second CXL storage 310_2 may be configured to share the same interface. For example, the host 301, the first CXL storage 310_1, and the second CXL storage 310_2 may communicate with each other through a first interface IF1. However, the first and second CXL storages 310_1 and 310_2 may not access the CXL memory 320 through the first interface IF1.

In an embodiment, the CXL memory 320, the first CXL storage 310_1, and the second CXL storage 310_2 may be configured to share the same interface. For example, the CXL memory 320, the first CXL storage 310_1, and the second CXL storage 310_2 may communicate with each other through a second interface IF2. However, the first and second CXL storages 310_1 and 310_2 may not access the host 301 through the second interface IF2.

The communication between each of the first and second CXL storages 310_1 and 310_2 and the host 301 and the communication between each of the first and second CXL storages 310_1 and 310_2 and the CXL memory 320 may be separated from each other. The communication between the first CXL storage 310_1 and the host 301 and the communication between the second CXL storage 310_2 and the host 301 may not be separated from each other. The communication between the first CXL storage 310_1 and the CXL memory 320 and the communication between the second CXL storage 310_2 and the CXL memory 320 may not be separated from each other. However, the communication between the first CXL storage 310_1 and the host 301 and the communication between the first CXL storage 310_1 and the CXL memory 320 may be separated from each other. The communication between the second CXL storage 310_2 and the host 301 and the communication between the second CXL storage 310_2 and the CXL memory 320 may be separated from each other. The communication between the first CXL storage 310_1 and the host 301 and the communication between the second CXL storage 310_2 and the CXL memory 320 may be separated from each other. The communication between the second CXL storage 310_2 and the host 301 and the communication between the first CXL storage 310_1 and the CXL memory 320 may be separated from each other.

As such, the communications between the first CXL storage 310_1, the second CXL storage 310_2, and the CXL memory 320 may not affect the communications between the first CXL storage 310_1, the second CXL storage 310_2, and the host 301. The communications between the first CXL storage 310_1, the second CXL storage 310_2, and the CXL memory 320 may be performed to be independent of the communications between the first CXL storage 310_1, the second CXL storage 310_2, and the host 301. As the independent link is used between the first CXL storage 310_1, the second CXL storage 310_2, and the CXL memory 320, the computing system with improved performance is provided.

The first and second interfaces IF1 and IF2 may be physically separated from each other. All the first and second interfaces IF1 and IF2 may be implemented with the CXL interface. The first CXL storage 310_1 may access the CXL memory 320 through the second interface IF2. The second CXL storage 310_2 may access the CXL memory 320 through the second interface IF2.

According to an embodiment of the present disclosure, the CXL storage controllers 311_1 and 311_2 of the first and second CXL storages 310_1 and 310_2 may communicate with the host 301 through the first interface IF1 and may communicate with the CXL memory 320 (i.e., a buffer memory) through the second interface IF2. In other words, the CXL storage controllers 311_1 and 311_2 of the first and second CXL storages 310_1 and 310_2 may communicate with the host 301 and the CXL memory 320 based on the homogeneous or common CXL protocol and may use a partial area or the entire area of the CXL memory 320 as a buffer memory. However, different interfaces (or links) may be used such that the communications between the first CXL storage 310_1, the second CXL storage 310_2, and the host 301 do not conflict with the communications between the first CXL storage 310_1, the second CXL storage 310_2, and the CXL memory 320. As such, the communications between the first CXL storage 310_1, the second CXL storage 310_2, and the CXL memory 320 may not affect the communications between the first CXL storage 310_1, the second CXL storage 310_2, and the host 301.

As described above, the host 301 may not directly recognize the CXL memory 320. The host 301 may not directly access the CXL memory 320. The host 301 may not control or manage the CXL memory 320. Instead, the first and second CXL storages 310_1 and 310_2 may control or manage the CXL memory 320. Each of the first and second CXL storages 310_1 and 310_2 may be configured to control an overall operation of the CXL memory 320. For example, the first and second CXL storages 310_1 and 310_2 may direct the CXL memory 320 to perform the initialization operation or the power-off operation.

Figure 12B:
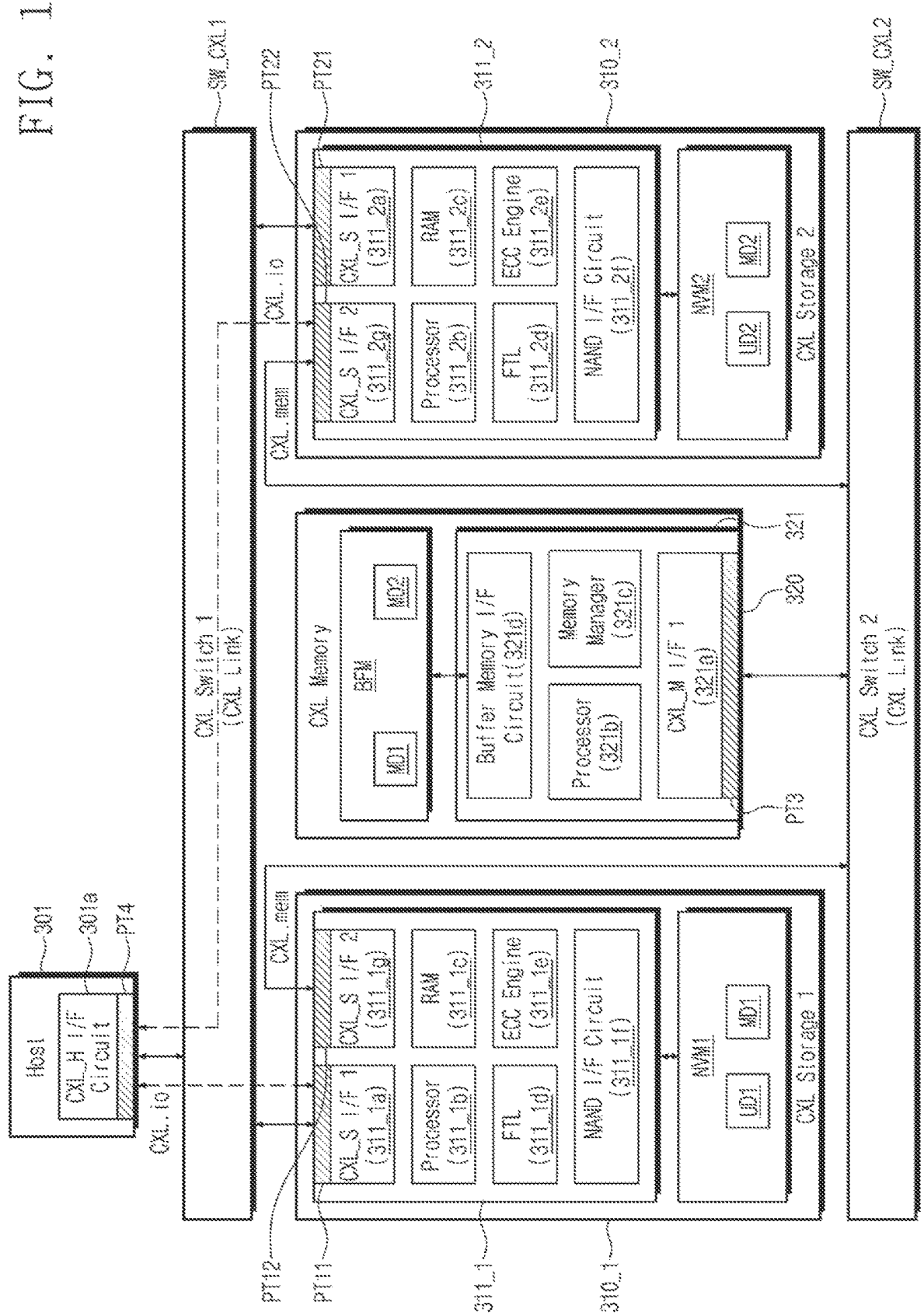
FIG. 12B is a block diagram illustrating components of a computing system of FIG. 12A in detail, according to some embodiments.

FIG. 12B is a block diagram illustrating components of a computing system of FIG. 12A in detail, according to some embodiments. Referring to FIGS. 12A and 12B, the computing system 300 may include a first CXL switch SW_CXL1, a second CXL switch SW_CXL2, the host 301, the first CXL storage 310_1, the second CXL storage 310_2, and the CXL memory 320.

In an embodiment, as in the description given with reference to FIG. 3B, the host 301, the first CXL storage 310_1, the second CXL storage 310_2, and the CXL memory 320 may be configured not to share the same interface. For example, the host 301, the first CXL storage 310_1, and the second CXL storage 310_2 may communicate with each other through the first interface IF1, and the first CXL storage 310_1, the second CXL storage 310_2, and the CXL memory 320 communicate with each other through the second interface IF2. The first interface IF1 and the second interface IF2 may be physically separated from each. All the first and second interfaces IF1 and IF2 may be implemented with the CXL interface.

The first CXL switch SW_CXL1 may be a component included in the first interface IF1. The first CXL switch SW_CXL1 may be configured to arbitrate the communications between the host 301, the first CXL storage 310_1, and the second CXL storage 310_2. For example, when the host 301, the first CXL storage 310_1, and the second CXL storage 310_2 communicate with each other, the first CXL switch SW_CXL1 may be configured to transfer information, which is transferred from the host 301, the first CXL storage 310_1, and the second CXL storage 310_2, such as a request, data, a response, or a signal to the first CXL storage 310_1, the second CXL storage 310_2, or the host 301.

The second CXL switch SW_CXL2 may be a component included in the second interface IF2. The second CXL switch SW_CXL2 may be configured to arbitrate the communications between the CXL memory 320, the first CXL storage 310_1, and the second CXL storage 310_2. For example, when the CXL memory 320, the first CXL storage 310_1, and the second CXL storage 310_2 communicate with each other, the second CXL switch SW_CXL2 may be configured to transfer information, which is transferred from the CXL memory 320, the first CXL storage 310_1, and the second CXL storage 310_2, such as a request, data, a response, or a signal to the first CXL storage 310_1, the second CXL storage 310_2, or the CXL memory 320.

The host 301 may include a CXL host interface (I/F) circuit 301a. The CXL host interface circuit 301a may include a port PT4. The CXL host interface circuit 301a may communicate with the first and second CXL storages 310_1 and 310_2 through the first CXL switch SW_CXL1.

The first CXL storage 310_1 may include the CXL storage controller 311_1 and the nonvolatile memory NVM1. The CXL storage controller 311_1 may include a first CXL storage interface (I/F) circuit 311_1a, a processor 311_1b, a RAM 311_1c, an FTL 311_1d, an ECC engine 311_1e, a NAND interface (I/F) circuit 311_1f, and a second CXL storage interface (I/F) circuit 311_1g. The first CXL storage interface circuit 311_1a may include a first port PT11. The second CXL storage interface circuit 311_1g may include a second port PT12. The first CXL storage interface circuit 311_1a, the processor 311_1b, the RAM 311_1c, the FTL 311_1d, the ECC engine 311_1e, the NAND interface circuit 311_1f, and the second CXL storage interface circuit 311_1g illustrated in FIG. 12B are similar or identical to the first CXL storage interface circuit 211_1a, the processor 211_1b, the RAM 211_1c, the FTL 211_1d, the ECC engine 211_1e, the NAND interface circuit 211_1f, and the second CXL storage interface circuit 211_1g illustrated in FIG. 3B, and thus, additional description will be omitted to avoid redundancy.

The first CXL storage interface circuit 311_1a may be connected with the first CXL switch SW_CXL1. The first CXL storage interface circuit 311_1a may communicate with the host 301 through the first CXL switch SW_CXL1. The second CXL storage interface circuit 311_1g may be connected with the second CXL switch SW_CXL2. The second CXL storage interface circuit 311_1g may communicate with the CXL memory 320 through the second CXL switch SW_CXL2.

The second CXL storage 310_2 may include the CXL storage controller 311_2 and the nonvolatile memory NVM2. The CXL storage controller 311_1 may include a first CXL storage interface (I/F) circuit 311_2a, a processor 311_2b, a RAM 311_2c, an FTL 311_2d, an ECC engine 311_2e, a NAND interface (I/F) circuit 311_2f, and a second CXL storage interface (I/F) circuit 311_2g. The first CXL storage interface circuit 311_2a may include a first port PT21. The second CXL storage interface circuit 311_2g may include a second port PT22. The first CXL storage interface circuit 311_2a, the processor 311_2b, the RAM 311_2c, the FTL 311_2d, the ECC engine 311_2e, the NAND interface circuit 311_2f, and the second CXL storage interface circuit 311_2g illustrated in FIG. 12B are similar or identical to the first CXL storage interface circuit 211_2a, the processor 211_2b, the RAM 211_2c, the FTL 211_2d, the ECC engine 211_2e, the NAND interface circuit 211_2f, and the second CXL storage interface circuit 211_2g illustrated in FIG. 3B, and thus, additional description will be omitted to avoid redundancy.

The first CXL storage interface circuit 311_2a may be connected with the first CXL switch SW_CXL1. The first CXL storage interface circuit 311_2a may communicate with the host 301 through the first CXL switch SW_CXL1. The second CXL storage interface circuit 311_2g may be connected with the second CXL switch SW_CXL2. The second CXL storage interface circuit 311_2g may communicate with the CXL memory 320 through the second CXL switch SW_CXL2.

The CXL memory 320 may include the CXL memory controller 321 and the buffer memory BFM. The CXL memory controller 321 may include a CXL memory interface (I/F) circuit 321a, a processor 321b, a memory manager 321c, and a buffer memory interface (I/F) circuit 321d. The CXL memory interface circuit 321a may include a port PT3. The processor 321b, the memory manager 321c, and the buffer memory interface circuit 321d illustrated in FIG. 12B are similar or identical to the processor 221b, the memory manager 221c, and the buffer memory interface circuit 221d illustrated in FIG. 3B, and thus, additional description will be omitted to may be omitted redundancy.

The CXL memory interface circuit 321a may be connected with the second CXL switch SW_CXL2. The CXL memory interface circuit 321a may communicate with the first and second CXL storages 310_1 and 310_2 through the second CXL switch SW_CXL2. The CXL memory interface circuit 321a may include the port PT3. The port PT3 may be a dedicated port for the communication with the second CXL switch SW_CXL2.

In an embodiment, the host 301 and the first CXL storage 310_1 may communicate with each other by using the CXL.io, and the host 301 and the second CXL storage 310_2 may communicate with each other by using the CXL.io being the input/output protocol. The host 301, the first CXL storage 310_1, and the second CXL storage 310_2 may exchange user data or a variety of information with each other by using the CXL.io.

In an embodiment, the first CXL storage 310_1 and the CXL memory 320 may communicate with each other by using the CXL.mem, and the second CXL storage 310_2 and the CXL memory 320 may communicate with each other by using the CXL.mem. The first and second CXL storages 310_1 and 310_2 may access a partial area (e.g., an area where the map data MD1 and MD2 are stored or a CXL storage-dedicated area) of the CXL memory 320 by using the CXL.mem. For example, in the read operation of FIG. 7 or the write operation of FIG. 8, the first and second CXL storages 310_1 and 310_2 may send and receive the map data MD1 and MD2 to and from the CXL memory 320 by using the CXL.mem. However, the present disclosure is not limited thereto.

In an embodiment, in the initialization operation of FIG. 4 or the power-off operation of FIG. 11, the first and second CXL storages 310_1 and 310_2 may send and receive the map data MD1 and MD2 to and from the CXL memory 320 by using the CXL.mem. However, the present disclosure is not limited thereto.

In an embodiment, because the CXL memory 320 is not connected with the first CXL switch SW_CXL1 and is connected with the second CXL switch SW_CXL2, the host 301 and the CXL memory 320 may not communicate with each other. The host 301 may not access the entire area of the CXL memory 320.

As described above, compared to the computing system 200 of FIG. 3B, the computing system 300 of FIG. 12B may further include the second CXL switch SW_CXL2. The computing system 300 may perform the initialization operation, the read operation, the write operation, and the power-off operation based on the manners described with reference to FIGS. 4 to 11 but modified to take into account communication through the first CXL switch SW_CXL1 and second CXL switch SW_CXL2, and a repeated description thereof is omitted for conciseness.

Figure 13:
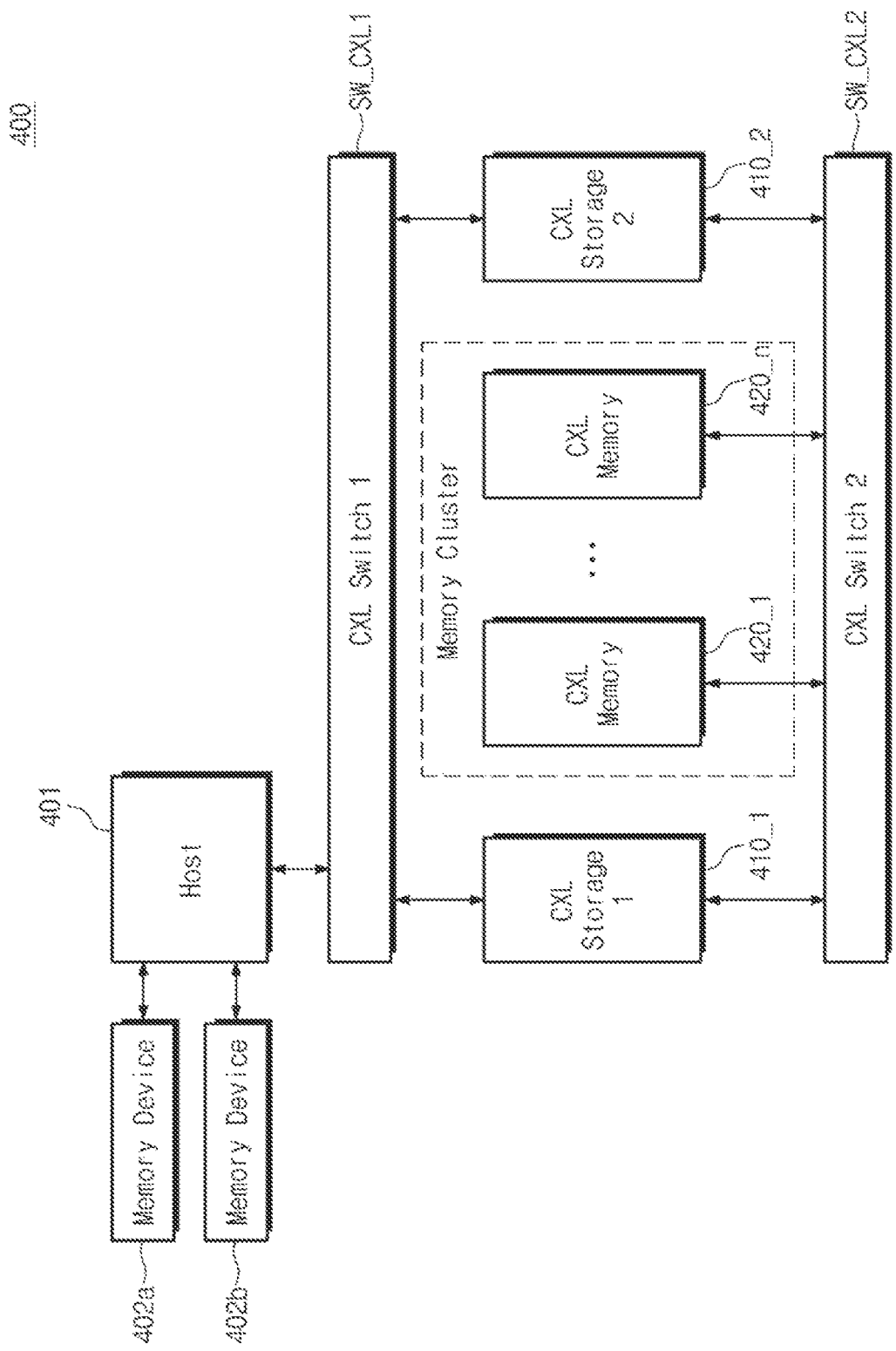
FIG. 13 is a block diagram illustrating a computing system according to some embodiments.

FIG. 13 is a block diagram illustrating a computing system according to some embodiments. Below, for convenience of description, repeated description associated with the components described above will be omitted to avoid redundancy. Referring to FIG. 13, a computing system 400 may include a host 401, a plurality of memory devices 402a and 402b, the first CXL switch SW_CXL1, the second CXL switch SW_CXL2, a first CXL storage 410_1, a second CXL storage 410_2, and a plurality of CXL memories 420_1 to 420_n.

The host 401 may be directly connected with the plurality of memory devices 402a and 402b. The host 401, the first CXL storage 410_1, and the second CXL storage 410_2 may be connected with the first CXL switch SW_CXL1. The host 401 and the first CXL storage 410_1 may communicate with each other through the first CXL switch SW_CXL1, and the host 401 and the second CXL storage 410_2 may communicate with each other through the first CXL switch SW_CXL1.

The first CXL storage 410_1, the second CXL storage 410_2, and the plurality of CXL memories 420_1 to 420_n may be connected with the second CXL switch SW_CXL2. The first CXL storage 410_1 and the plurality of CXL memories 420_1 to 420_n may communicate with each other through the second CXL switch SW_CXL2, and the second CXL storage 410_2 and the plurality of CXL memories 420_1 to 420_n may communicate with each other through the second CXL switch SW_CXL2.

In an embodiment, each of the plurality of CXL memories 420_1 to 420_n may have a structure similar to that of the CXL memories 220 and 320 described with reference to FIGS. 3A to 12B. That is, each of the plurality of CXL memories 420_1 to 420_n may be implemented with an individual memory device or memory module, and the plurality of CXL memories 420_1 to 420_n may be connected with the second CXL switch SW_CXL2 through different physical ports. That is, as the plurality of CXL memories 420_1 to 420_n are connected with the second CXL switch SW_CXL2, a high-capacity memory area that is managed by the first and second CXL storages 410_1 and 410_2 may be implemented.

In an embodiment, the first and second CXL storages 410_1 and 410_2 may manage the plurality of CXL memories 420_1 to 420_n as one memory cluster. In an embodiment, the first and second CXL storages 410_1 and 410_2 may allocate at least a partial area of the plurality of CXL memories 420_1 to 420_n as a dedicated memory of the first and second CXL storages 410_1 and 410_2. In some embodiments, the first and second CXL storages 410_1 and 410_2 may allocate at least a partial area of each of the plurality of CXL memories 420_1 to 420_n as a dedicated memory of the first and second CXL storages 410_1 and 410_2.

In an embodiment, the plurality of CXL memories 420_1 to 420_n connected with the second CXL switch SW_CXL2 may have various capacities. For example, in some embodiments, to implement a 1 TB memory cluster, two 512 GB CXL memories may be connected with the second CXL switch SW_CXL2, or four 256 GB CXL memories may be connected with the second CXL switch SW_CXL2. As the memory cluster is implemented with the plurality of CXL memories 420_1 to 420_n, capacities of the CXL memories may be determined and/or selected to reduce costs.

In an embodiment, the capacities of the plurality of CXL memories 420_1 to 420_n may be different from each other or may be identical to each other. For example, the capacity of the first CXL memory 420_1 may be identical to the capacity of the second CXL memory 420_2, and the capacity of the first CXL memory 420_1 may be greater than the capacity of a third CXL memory 420_3 of the plurality of CXL memories 420_1 to 420_n.

Figure 14:
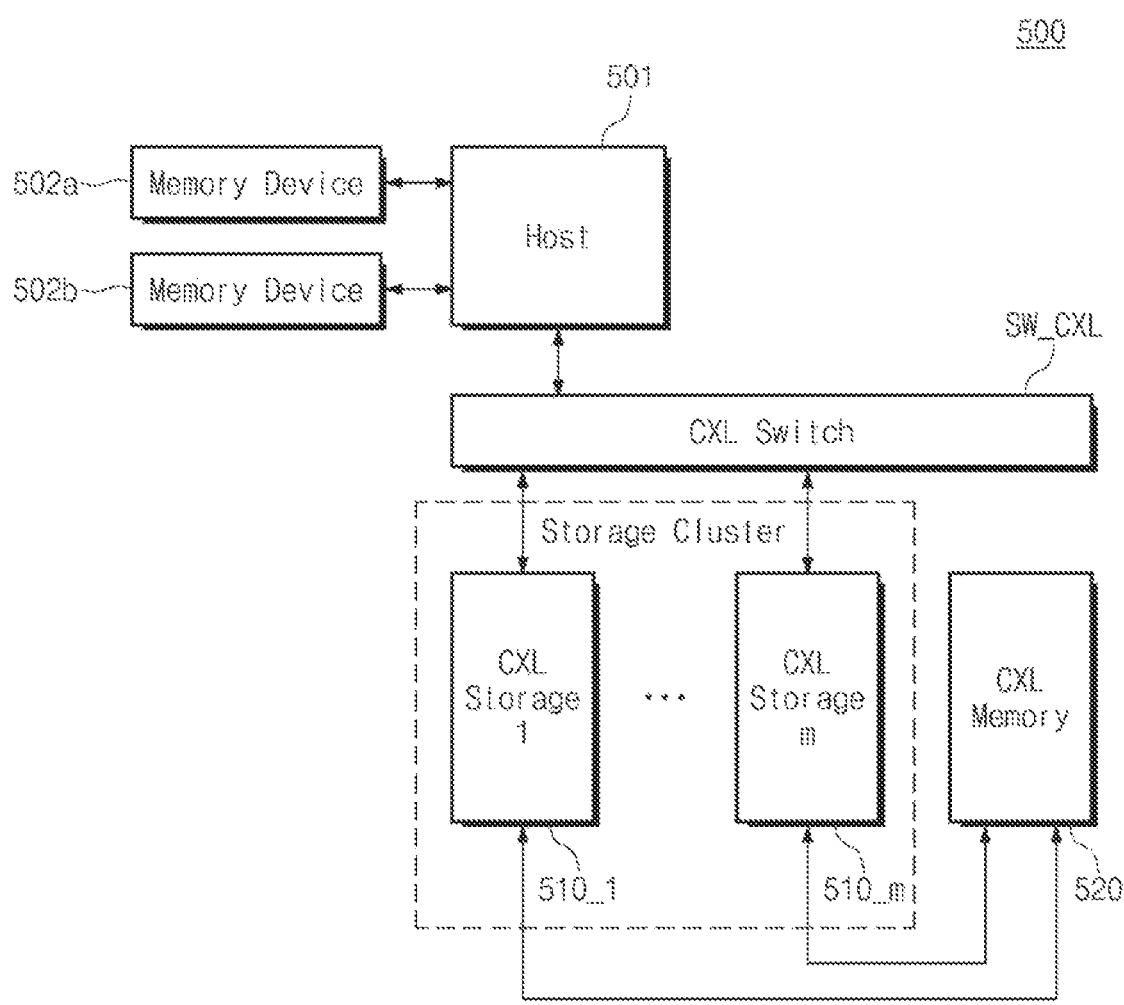
FIG. 14 is a block diagram illustrating a computing system according to some embodiments.

FIG. 14 is a block diagram illustrating a computing system according to some embodiments. Below, for convenience of description, repeated description associated with the components described above will be omitted to avoid redundancy. Referring to FIG. 14, a computing system 500 may include a host 501, a plurality of memory devices 502a and 502b, the CXL switch SW_CXL, a plurality of CXL storages 510_1 to 510_m, and a CXL memory 520.

The host 501 may be directly connected with the plurality of memory devices 502a and 502b. The host 201 and the plurality of CXL storages 510_1 to 510_m may be connected with the CXL switch SW_CXL and may communicate with each other through the CXL switch SW_CXL. Each of the plurality of CXL storages 510_1 to 510_m may be directly connected with the CXL memory 520. In an embodiment, the CXL memory 520 may include physical ports as much as the number of CXL storages 510_1 to 510_m.

In an embodiment, each of the plurality of CXL storages 510_1 to 510_m may have a structure similar to that of the CXL storages 210_1, 210_2, 310_1, and 310_2 described with reference to FIGS. 3A to 12B. That is, each of the plurality of CXL storages 510_1 to 510_m may be implemented with an individual storage device or storage module, the plurality of CXL storages 510_1 to 510_m may be connected with the CXL switch SW_CXL through different physical ports, and may be connected with the CXL memory 520 through the different physical ports. That is, since the plurality of CXL storages 510_1 to 510_m are connected with the CXL switch SW_CXL, a high-capacity storage area that is available by the host 501 may be implemented.

In an embodiment, at least a partial area of the CXL memory 520 may be allocated for an area dedicated for the plurality of CXL storages 510_1 to 510_m. For example, the host 201 may manage the plurality of CXL storages 510_1 to 510_m as one storage cluster. In some embodiments, a partial area of the CXL memory 520 may be allocated for a dedicated area of the storage cluster. In some embodiments, as illustrated in FIG. 14, partial areas of the CXL memory 520 may be respectively allocated for dedicated areas of the plurality of CXL storages 510_1 to 510_m.

Figure 15:
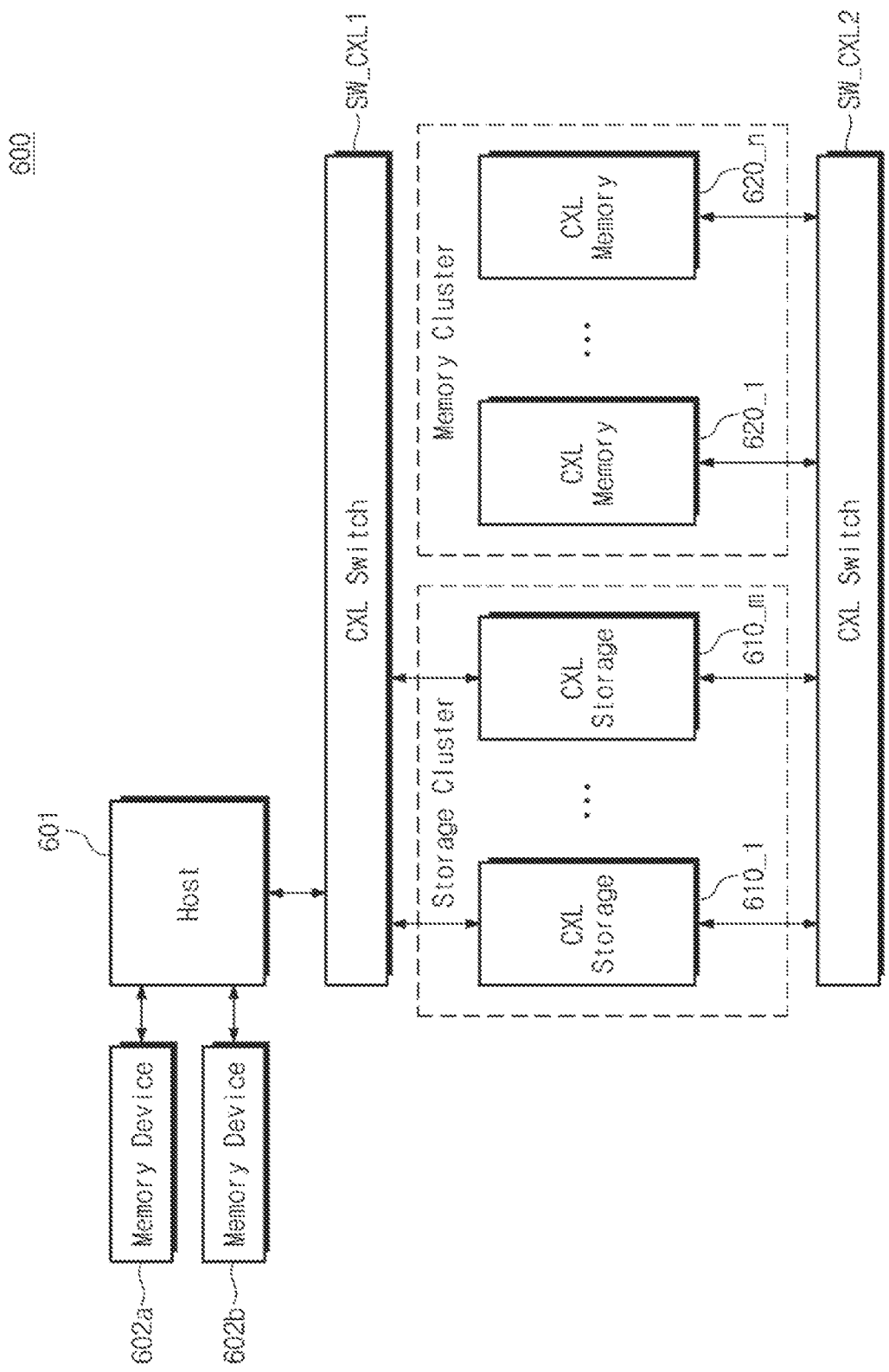
FIG. 15 is a block diagram illustrating a computing system according to some embodiments.

FIG. 15 is a block diagram illustrating a computing system according to some embodiments. Below, for convenience of description, repeated description associated with the components described above will be omitted to avoid redundancy. Referring to FIG. 15, a computing system 600 may include a host 601, a plurality of memory devices 602a and 602b, the first CXL switch SW_CXL1, the second CXL switch SW_CXL2, a plurality of CXL storages 610_1 to 610_m, and a plurality of CXL memories 620_1 to 620_n.

The host 601 may be directly connected with the plurality of memory devices 602a and 602b. The host 201 and the plurality of CXL storages 610_1 to 610_m may be connected with the first CXL switch SW_CXL1 and may communicate with each other through the first CXL switch SW_CXL1. The plurality CXL storages 610_1 to 610_m and the plurality of CXL memories 620_1 to 620_n may be connected with the second CXL switch SW_CXL2 and may communicate with each other through the second CXL switch SW_CXL2.

In an embodiment, the host 601 may manage the plurality of CXL storages 610_1 to 610_m as one storage cluster, and may mange the plurality of CXL memories 620_1 to 620_n as one memory cluster. In some embodiments, a partial area of the memory cluster may be allocated for a dedicated area of the storage cluster (i.e., an area for storing map data of the storage cluster). In some embodiments, areas of the plurality of CXL memories 620_1 to 620_n may be respectively allocated for dedicated areas of the plurality of CXL storages 610_1 to 610_m.

Figure 16:
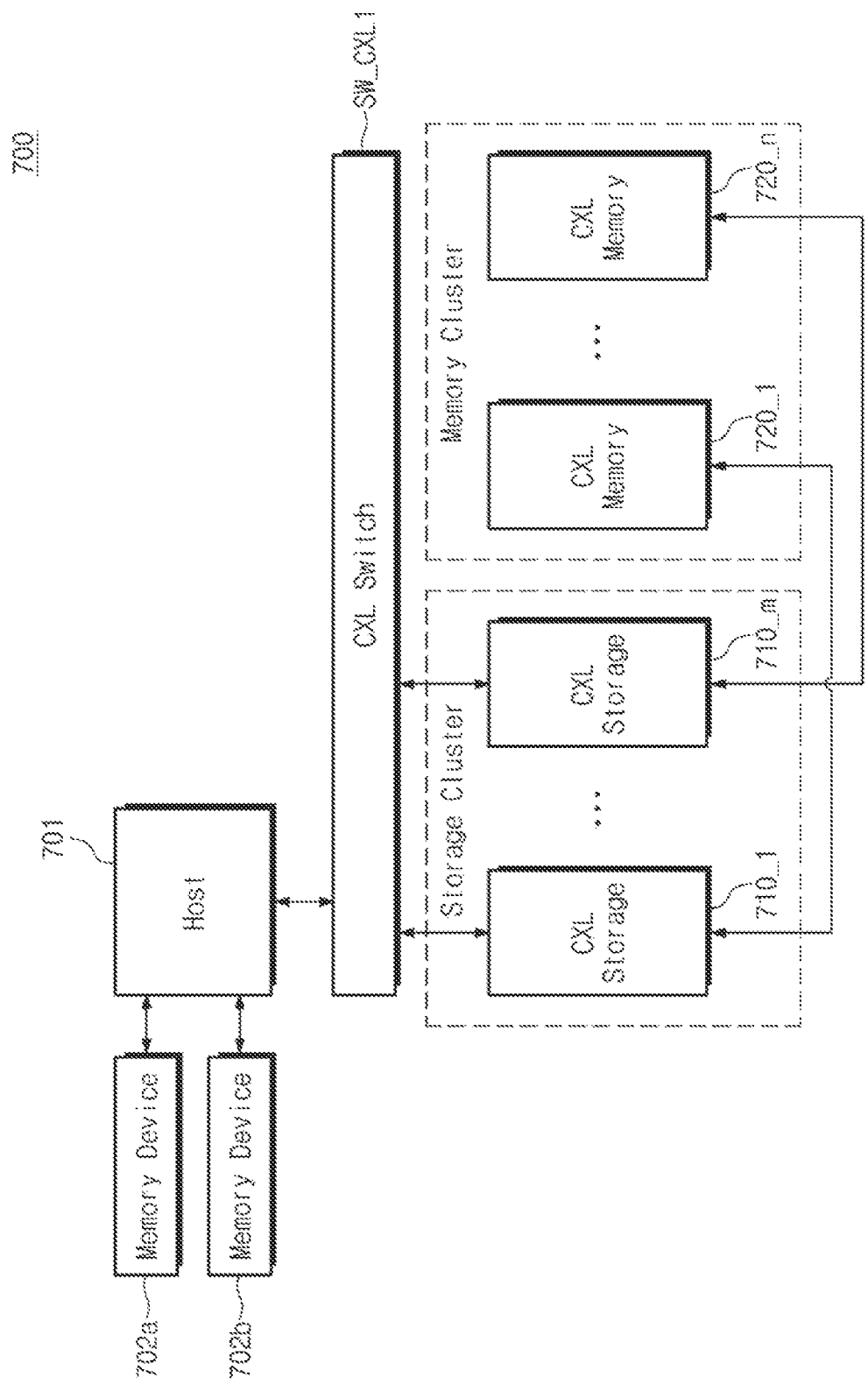
FIG. 16 is a block diagram illustrating a computing system according to some embodiments.

FIG. 16 is a block diagram illustrating a computing system according to some embodiments. Below, for convenience of description, repeated description associated with the components described above will be omitted to avoid redundancy. Referring to FIG. 16, a computing system 700 may include a host 701, a plurality of memory devices 702a and 702b, the CXL switch SW_CXL, a plurality of CXL storages 710_1 to 710_m, and a plurality of CXL memories 720_1 to 720_n.

The host 701 may be directly connected with the plurality of memory devices 702a and 702b. The host 201 and the plurality of CXL storages 710_1 to 710_m may be connected with the CXL switch SW_CXL and may communicate with each other through the CXL switch SW_CXL. The plurality of CXL storages 710_1 to 710_m may be directly connected with the plurality of CXL memories 720_1 to 720_n, that is, the plurality of CXL storages 710_1 to 710_m may perform the direct communication with the plurality of CXL memories 720_1 to 720_n. For example, the first CXL storage 710_1 may be directly connected with the first CXL memory 720_1, and the m-th CXL storage 710_m may be directly connected with the n-th CXL memory 720_n, as illustrated in FIG. 16.

In an embodiment, the number of physical ports of CXL memories 720_1 to 720_n may be changed depending on configurations of the storage cluster and the memory cluster. For example, it is assumed that m is 8 and n is 4. In this case, the plurality of CXL storages 710_1 to 710_m may include first through eighth CXL storages 710_1 to 710_8, and the plurality of CXL memories 720_1 to 720_n may include first through fourth CXL memories 720_1 to 720_4. The first and second CXL storages 710_1 and 710_2 may be directly connected with the first CXL memory 720_1; the third and fourth CXL storages 710_3 and 710_4 may be directly connected with the second CXL memory 720_2; the fifth and sixth CXL storages 710_5 and 710_6 may be directly connected with the third CXL memory 720_3; the seventh and eighth CXL storages 710_7 and 710_8 may be directly connected with the fourth CXL memory 720_4. In this case, each of the plurality of CXL memories 720_1 to 720_n may include two physical ports. For example, a first port of the first CXL memory 720_1 may be connected with the first CXL storage 720_1, and a second port of the first CXL memory 720_1 may be connected with a second CXL storage 720_2 of the plurality of CXL storages 720_1 to 720_n, and so on.

For example, it is assumed that m is 8 and n is 2. In this case, the plurality of CXL storages 710_1 to 710_m may include first through eights CXL storages 710_1 to 710_8, and the plurality of CXL memories 720_1 to 720_n may include first and second CXL storages 710_1 and 710_2. The first to fourth CXL storages 710_1 to 710_4 may be directly connected with the first CXL memory 720_1, and the fifth to eighth CXL storages 710_5 to 710_8 may be directly connected with the second CXL memory 720_2. In this case, each of the plurality of CXL memories 720_1 and 720_2 may include four physical ports. For example, a first port of the first CXL memory 720_1 may be connected with the first CXL storage 720_1; a second port of the first CXL memory 720_1 may be connected with the second CXL storage 720_2; a third port of the first CXL memory 720_1 may be connected with the third CXL storage 720_3; a fourth port of the first CXL memory 720_1 may be connected with the fourth CXL storage 720_4.

In an embodiment, the host 701 may manage the plurality of CXL storages 710_1 to 710_m as one storage cluster, and may mange the plurality of CXL memories 720_1 to 720_n as one memory cluster. A partial area of the memory cluster may be allocated for a dedicated area of the storage cluster (i.e., an area for storing map data of the storage cluster). In some embodiments, areas of the plurality of CXL memories 720_1 to 720_n may be respectively allocated for dedicated areas of the plurality of CXL storages 710_1 to 710_m.

Figure 17:
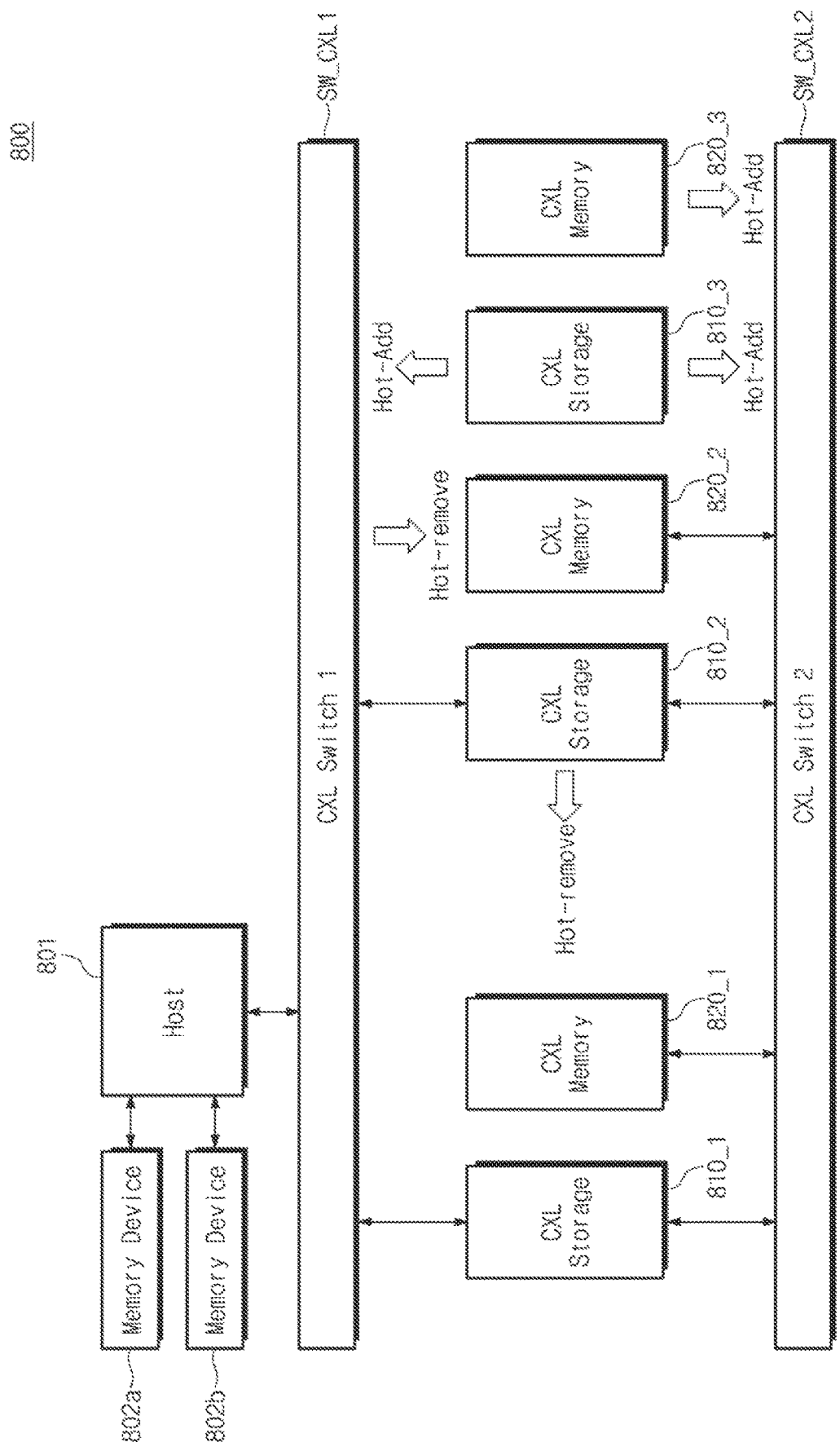
FIG. 17 is a block diagram illustrating a computing system according to some embodiments.

FIG. 17 is a block diagram illustrating a computing system according to some embodiments. Below, for convenience of description, repeated description associated with the components described above will be omitted to avoid redundancy. Referring to FIG. 17, a computing system 800 may include a host 801, a plurality of memory devices 802a and 802b, the first CXL switch SW_CXL1, the second CXL switch SW_CXL2, a plurality of CXL storages 810_1, 810_2, and 810_3, and a plurality of CXL memories 820_1, 820_2, and 820_3.

The host 801 may be directly connected with the plurality of memory devices 802a and 802b. The host 801 and the plurality of CXL storages 810_1 and 810_2 may be connected with the first CXL switch SW_CXL1 and may communicate with each other through the first CXL switch SW_CXL1. The plurality of CXL storages 810_1 and 810_2 and the plurality of CXL memories 820_1 and 820_2 may be connected with the second CXL switch SW_CXL2 and may communicate with each other through the second CXL switch SW_CXL2. As in the above description, a least partial area of the CXL memories 820_1 and 820_2 may be allocated for a dedicated area of the CXL storages 810_1 and 810_2.

In an embodiment, while the computing system 800 is being driven, some of the CXL storages 810_1 and 810_2 or some of the CXL memories 820_1 and 820_2 may be hot-removed (e.g., disconnected) from the first and second CXL switches SW_CXL1 and SW_CXL2. In some embodiments, while the computing system 800 is being driven, the CXL storage 810_3 or the CXL memory 820_3 may be hot-added (e.g., connected) to the first and second CXL switches SW_CXL1 and SW_CXL2. In this case, the host 801 may again perform memory allocation by again performing the initialization operation on devices connected with the first and second CXL switches SW_CXL1 and SW_CXL2 through the reset operation or the hot-plug operation. That is, CXL storage and a CXL memory according to an embodiment of the present disclosure may support the hot-plug function and may expand a storage capacity and a memory capacity of a computing system through various connections.

Figure 18:
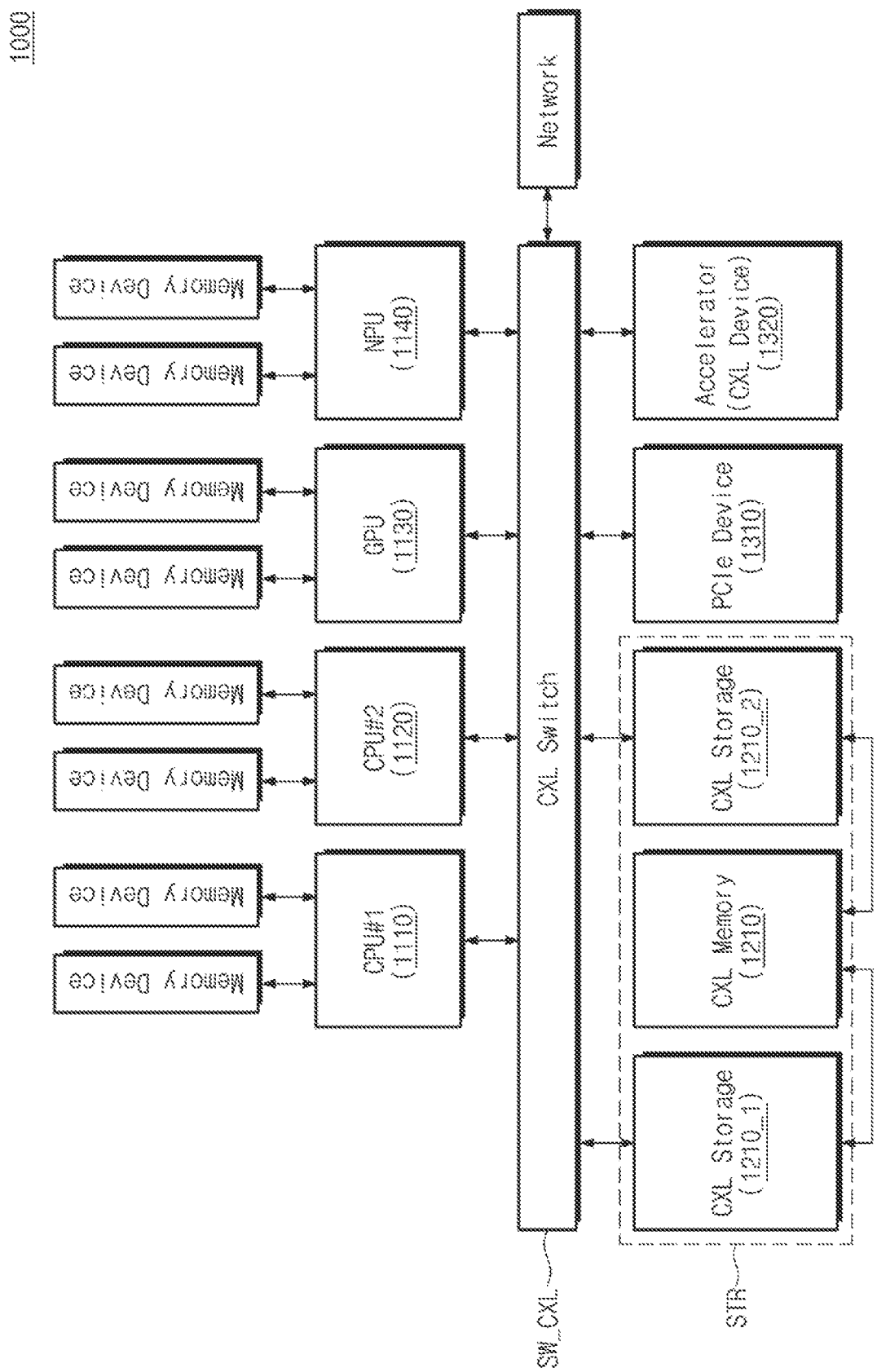
FIG. 18 is a block diagram illustrating a computing system according to some embodiments.

FIG. 18 is a block diagram illustrating a computing system according to some embodiments. For convenience of description, repeated description associated with the components described above will be omitted to avoid redundancy. Referring to FIG. 18, a computing system 1000 may include a first CPU 1110, a second CPU 1120, a GPU 1130, an NPU 1140, the CXL switch SW_CXL, a first CXL storage 1210_1, a second CXL storage 1210_2, a CXL memory 1220, a PCIe device 1310, and an accelerator (CXL device) 1320.

The first CPU 1110, the second CPU 1120, the GPU 1130, the NPU 1140, the first CXL storage 1210_1, the second CXL storage 1210_2, the PCIe device 1310, and the accelerator (CXL device) 1320 may be connected in common with the CXL switch SW_CXL and may communicate with each other through the CXL switch SW_CXL. The first CXL storage 1210_1 may be directly connected with the CXL memory 1220. The second CXL storage 1210_2 may be directly connected with the CXL memory 1220.

In an embodiment, each of the first CPU 1110, the second CPU 1120, the GPU 1130, and the NPU 1140 may be the host described with reference to FIGS. 1 to 17 and may be directly connected with individual memory devices.

In an embodiment, the first CXL storage 1210_1, the second CXL storage 1210_2, and the CXL memory 1220 may respectively correspond to the first CXL storage, the second CXL storage, and the CXL memory described with reference to FIGS. 3A to 17. At least a partial area of the CXL memory 1220 may be allocated for a dedicated area of the first and second CXL storages 1210_1 and 1210_2. That is, the first CXL storage 1210_1, the second CXL storage 1210_2, and the CXL memory 1220 may be used as a storage space STR.

In an embodiment, the CXL switch SW_CXL may be connected with the PCIe device 1310 or the accelerator 1320 configured to support various functions, and the PCIe device 1310 or the accelerator 1320 may communicate with each of the first CPU 1110, the second CPU 1120, the GPU 1130, and the NPU 1140 through the CXL switch SW_CXL or may access the storage space STR including the first CXL storage 1210_1, the second CXL storage 1210_2, and the CXL memory 1220 through the CXL switch SW_CXL.

In an embodiment, the CXL switch SW_CXL may be connected with an external network (Network) or Fabric and may be configured to communicate with an external server through the external network or Fabric.

Figure 19:
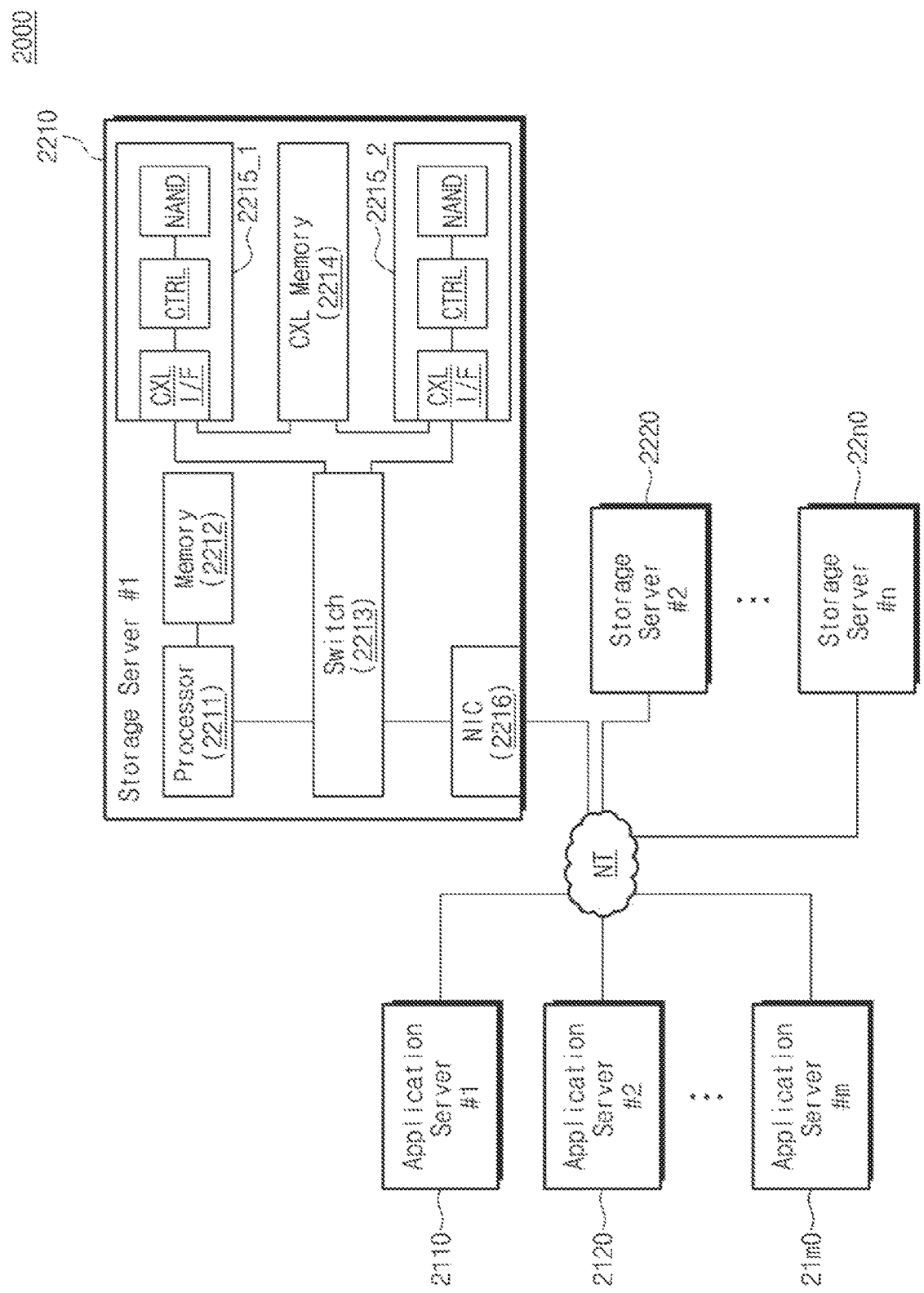
FIG. 19 is a block diagram illustrating a data center to which a computing system according to some embodiments is applied.

FIG. 19 is a block diagram illustrating a data center to which a computing system according to some embodiments is applied. Referring to FIG. 19, a data center 2000 that is a facility collecting various data and providing services may be referred to as a "data storage center". The data center 2000 may be a system for operating a search engine and a database, and may be a computing system used in a business such as a bank or in a government institution. The data center 2000 may include application servers 2110 to 21m0 and storage servers 2210 to 22n0. The number of application servers and the number of storage servers may be variously selected depending on an embodiment, and the number of application servers and the number of storage servers may be different from each other.

Below, a configuration of the first storage server 2210 will be mainly described. The application servers 2110 to 21m0 may have similar structures, the storage servers 2210 to 22n0 may have similar structures, and the application servers 2110 to 21m0 and the storage servers 2210 to 22n0 may communicate with each other over a network NT.

The first storage server 2210 may include a processor 2211, a memory 2212, a switch 2213, a first storage device 2215_1, a second storage device 2215_2, a CXL memory 2214, and a network interface card (NIC) 2216. The processor 2211 may control an overall operation of the first storage server 2210 and may access the memory 2212 to execute an instruction loaded onto the memory 2212 or to process data. The memory 2212 may be implemented with a DDR SDRAM (Double Data Rate Synchronous DRAM), an HBM (High Bandwidth Memory), an HMC (Hybrid Memory Cube), a DIMM (Dual In-line Memory Module), an Optane DIMM, and/or an NVMDIMM (Non-Volatile DIMM). The processor 2211 and the memory 2212 may be directly connected, and the numbers of processors 2211 and memories 2212 included in one storage server 2210 may be variously selected.

In an embodiment, the processor 2211 and the memory 2212 may provide a processor-memory pair. In an embodiment, the number of processors 2211 and the number of memories 2212 may be different from each other. The processor 2211 may include a single core processor or a multi-core processor. The detailed description of the storage server 2210 may be similarly applied to the application servers 2110 to 21m0.

The switch 2213 may be configured to arbitrate or route the communications between various components included in the first storage server 2210. In an embodiment, the switch 2213 may be implemented with the CXL switch SW_CXL described with reference to FIGS. 3A to 18. That is, the switch 2213 may be a switch implemented based on the CXL protocol.

The CXL memory 2214 may be directly connected with the first and second storage devices 2215_1 and 2215_2. In an embodiment, the CXL memory 2214 may be accessed only by the first and second storage devices 2215_1 and 2215_2, and the processor 2211 may not access the CXL memory 2214. As described with reference to FIGS. 3A to 18, the CXL memory 2214 may be allocated for a dedicated memory or a buffer memory of the first and second storage devices 2215_1 and 2215_2.

Each of the first and second storage devices 2215_1 and 2215_2 may include a CXL interface circuit CXL IF, a controller CTRL, and a NAND flash NAND. Depending on a request of the processor 2211, each of the first and second storage devices 2215_1 and 2215_2 may store data or may output the stored data. In an embodiment, each of the first and second storage devices 2215_1 and 2215_2 may be first and second CXL storages described with reference to FIGS. 3A to 18. In an embodiment, as in the description given with reference to FIGS. 3A to 18, at least a partial area or the entire area of the CXL memory 2214 may be allocated for a dedicated area, and the dedicated area may be used as a buffer memory (i.e., may be used to store map data in the CXL memory 2214).

In an embodiment, the application servers 2110 to 21m0 may not include the first and second storage devices 2215_1 and 2215_2. The storage server 2210 may include at least two or more storage devices. The number of storage devices included in the storage server 2210 may be variously selected depending on an embodiment.

The NIC 2216 may be connected with the switch 2213 implemented as the CXL switch SW_CXL. The NIC 2216 may communicate with the remaining storage servers 2220 to 22n0 or the application servers 2110 to 21m0 over the network NT.

In an embodiment, the NIC 2216 may include a network interface card, a network adapter, etc. The NIC 2216 may be connected with the network NT by a wired interface, a wireless interface, a Bluetooth interface, an optical interface, etc. The NIC 2216 may include an internal memory, a digital signal processor (DSP), a host bus interface, etc. and may be connected with the processor 2211 and/or the switch 2213 through the host bus interface. In an embodiment, the NIC 2216 may be integrated with at least one of the processor 2211, the switch 2213, and the first and second storage devices 2215_1 and 2215_2.

In an embodiment, the network NT may be implemented by using a Fibre channel (FC) or an Ethernet. In this case, the FC may be a medium that is used in high-speed data transmission and may use an optical switch that provides high performance/high availability. Storage servers may be provided as file storage, block storage, and/or object storage depending on an access manner of the network NT.

In an embodiment, the network NT may be a storage-dedicated network such as a storage area network (SAN). For example, the SAN may be a FC-SAN that uses a FC network and is implemented depending on a FC protocol (FCP). For another example, the SAN may be an IP-SAN that uses a TCP/IP network and is implemented depending on an iSCSI (SCSI over TCP/IP or Internet SCSI). In an embodiment, the network NT may be a legacy network such as a TCP/IP network. For example, the network NT may be implemented depending on the following protocol: FCoE (FC over Ethernet), NAS (Network Attached Storage), or NVMe-oF (NVMe over Fabrics).

In an embodiment, at least one of the application servers 2110 to 21m0 may store data, which are store-requested by a user or a client, in one of the storage servers 2210 to 22n0 over the network NT. At least one of the application servers 2110 to 21m0 may obtain data, which are read-requested by the user or the client, from one of the storage servers 2210 to 22n0 over the network NT. For example, at least one of the application servers 2110 to 21m0 may be implemented with a web server, a database management system (DBMS), etc.

In an embodiment, at least one of the application servers 2110 to 21m0 may access a memory, a CXL memory, or a storage device included in any other application server over the network NT or may access memories, CXL memory, or storage devices included in the storage servers 2210 to 22n0 over the network NT. However, because the CXL memory 2214 is not directly connected with the switch 2213, at least one of the application servers 2110 to 21m0 may not access the CXL memory 2214 included in the first storage server 2210 over the network NT.

As such, at least one of the application servers 2110 to 21m0 may perform various operations on data stored in the remaining application servers and/or storage servers. For example, at least one of the application servers 2110 to 21m0 may execute an instruction for moving or copying data between the remaining application servers and/or storage servers. In this case, the data may be moved from storage devices of storage servers to memories or CXL memories of application servers through memories or CXL memories of the storage servers or directly. The data that are transferred over a network may be data that are encrypted for security or privacy.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments of the present disclosure are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to an embodiment of the present disclosure, a host may communicate with a first storage device and a second storage device through a first interface, the first storage device and a memory device may communicate with each other through a second interface, and the second storage device and the memory device may communicate with each other through a third interface. Accordingly, a computing system with improved performance is provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A computing system comprising:
a first storage device;
a second storage device;
a memory device comprising a processor, a buffer memory interface circuit and a buffer memory, the processor of the memory device being configured to store first map data of the first storage device and second map data of the second storage device; and
a compute express link (CXL) switch connected with the first storage device, the second storage device, and an external host through a first interface, and configured to arbitrate communications between the first storage device, the second storage device, and the external host,
wherein the first storage device is connected with the memory device through a second interface,
wherein the second storage device is connected with the memory device through a third interface,
wherein the first interface, the second interface, and the third interface are physically separated from each other,
wherein, in an initialization operation, the processor of the memory device allocates at least a first partial area of the buffer memory as a first dedicated area for storing the first map data of the first storage device, and
wherein, in the initialization operation, the processor of the memory device allocates at least a second partial area of the buffer memory as a second dedicated area for storing the second map data of the second storage device.

2. The computing system of claim 1, wherein each of the first interface, the second interface, and the third interface is based on a CXL protocol.

3. The computing system of claim 1, wherein the memory device is accessible only by the first storage device and the second storage device.

4. The computing system of claim 1, wherein the first storage device includes:
a first port configured to send and receive a physical signal to and from the CXL switch; and
a second port configured to send and receive a physical signal to and from the memory device,
wherein the second storage device includes:
a third port configured to send and receive a physical signal to and from the CXL switch; and
a fourth port configured to send and receive a physical signal to and from the memory device, and
wherein the memory device includes:
a fifth port configured to send and receive a physical signal to and from the first storage device; and
a sixth port configured to send and receive a physical signal to and from the second storage device.

5. The computing system of claim 1, wherein the first storage device is configured to send a first read request to the memory device through the second interface in response to first power-off information received through the first interface,
wherein the second storage device is configured to send a second read request to the memory device through the third interface in response to second power-off information received through the first interface, and
wherein the memory device configured to:
schedule the first read request and the second read request based on pre-determined priorities, and
process the first read request and the second read request based on a scheduling result.

6. The computing system of claim 1, wherein the first dedicated area is accessible only by the first storage device, and the second dedicated area is accessible only by the second storage device.

7. The computing system of claim 1, wherein the memory device includes:
a first port configured to send and receive a physical signal to and from the first storage device; and
a second port configured to send and receive a physical signal to and from the second storage device, and
wherein the memory device assigns a first address range corresponding to the first dedicated area to the first port, and assigns a second address range corresponding to the second dedicated area to the second port.

8. The computing system of claim 1, wherein, based on pre-determined priorities, the memory device allocates the first dedicated area and then allocates the second dedicated area.

9. The computing system of claim 1, wherein the memory device determines priorities of the first storage device and the second storage device and processes requests received from the first storage device and the second storage device based on the determined priorities.

10. The computing system of claim 1, wherein, in a power-off operation, based on pre-determined priorities, the memory device schedules requests received from the first storage device and the second storage device.

11. An operating method of a computing system which includes a first storage device, a second storage device, a compute express link (CXL) switch, and a memory device, the first storage device and the memory device being connected through a second interface, and the second storage device and the memory device being connected through a third interface, the operating method comprising:
receiving, by the first storage device, a first read request from an external host;

sending, by the first storage device, a second read request to the memory device through the second interface based on the first read request;
sending, by the memory device, a second read response including first partial map data to the first storage device through the second interface based on the second read request;
reading, by the first storage device, first user data from a nonvolatile memory of the first storage device based on the first partial map data;
sending, by the first storage device, a first read response including the first user data to the external host through a first interface;
sending, by the first storage device, the first read request to the memory device through the second interface based on first power-off information received through the first interface;
sending, by the second storage device, the second read request to the memory device through the third interface based on second power-off information received through the first interface;
scheduling, by the memory device, the first read request and the second read request based on pre-determined priorities; and
processing, by the memory device, the first read request and the second read request based on a scheduling result, by the memory device,
wherein the CXL switch is connected with the first storage device and the second storage device and the external host through the first interface and arbitrates communications between the first storage device and the second storage device and the external host, and
wherein the first interface, the second interface, and the third interface are based on a CXL protocol and are physically separated from each other.

12. The operating method of claim 11, further comprising:
receiving, by the second storage device, a third read request from the external host;
sending, by the second storage device, a fourth read request to the memory device through the third interface based on the third read request
sending, by the memory device, a fourth read response including second partial map data to the second storage device through the third interface based on the fourth read request;
reading, by the second storage device, second user data from a nonvolatile memory of the second storage device based on the second partial map data; and
sending, by the second storage device, a third read response including the second user data to the external host through the first interface.

13. The operating method of claim 12, further comprising:
after receiving the second read request and the fourth read request, scheduling, by the memory device, the fourth read request based on pre-determined priorities so that the fourth read request is processed prior to the second read request.

14. The operating method of claim 11, further comprising:
in an initialization operation, sending, by the first storage device, a first memory allocation request for a first dedicated area of the memory device, to the memory device through the second interface, by the first storage device;
in the initialization operation, sending, by the second storage device to the memory device through the third interface, a second memory allocation request for a second dedicated area of the memory device; and
allocating, by the memory device, areas of the memory device as the first dedicated area and the second dedicated area, based on pre-determined priorities and based on the first memory allocation request and the second memory allocation request,
wherein the first dedicated area stores first map data of the first storage device,
wherein the second dedicated area stores second map data of the second storage device.

15. The operating method of claim 14, wherein the allocating includes:
allocating at least a partial area of the memory device as the first dedicated area based on the first memory allocation request; and
after allocating the first dedicated area, allocating at least a partial area of the memory device as the second dedicated area based on the second memory allocation request,
wherein the first storage device has a high priority, and the second storage device has a medium priority.

16. The operating method of claim 11, further comprising:
in an initialization operation, sending, by the first storage device to the memory device, a first memory allocation request including first characteristic information indicating a type or importance of data stored in the first storage device;
in the initialization operation, sending, by the second storage device to the memory device, a second memory allocation request including second characteristic information indicating a type or importance of data stored in the second storage device; and
determining, by the memory device, priorities of the first storage device and the second storage device based on the first characteristic information and the second characteristic information.

17. A computing system comprising:
a first storage device;
a second storage device;
a memory device configured to store first map data of the first storage device and second map data of the second storage device and communicate with the first storage device and the second storage device using at least two different protocols;
a first compute express link (CXL) switch connected with the first storage device and the second storage device and an external host through a first interface such that the first storage device, the second storage device, and the external host communicate by a CXL.io protocol over the first interface, the first CXL switch being configured to arbitrate communications between the first storage device and the second storage device and the external host; and
a second CXL switch connected with the first storage device and the second storage device and the memory device through a second interface such that the first storage device, the second storage device and the memory device communication by a CXL.mem protocol over the second interface, the second CXL switch being configured to arbitrate communications between the first storage device and the second storage device and the memory device.

18. The computing system of claim 17, wherein the external host and the first storage device and the second storage device communicate with each other only using the CXL.io protocol.

19. The computing system of claim 17, wherein the first storage device and the second storage device support a hot-plug function in which the first storage device and the second storage device are each capable of being installed in or removed from the first CXL switch and the second CXL switch, and the memory device supports a hot-plug function in which the memory device is capable of being installed in or removed from the second CXL switch.

20. The computing system of claim 18, wherein the first storage device and the second storage device and the memory device communicate with each other only using the CXL.mem protocol.

* * * * *